US010785683B2

(12) United States Patent
Zaks et al.

(10) Patent No.: US 10,785,683 B2
(45) Date of Patent: Sep. 22, 2020

(54) NATIVE FRAGMENTATION IN WIFI PROTECTED ACCESS 2 (WPA2) PASS-THROUGH VIRTUALIZATION PROTOCOL

(71) Applicant: Intel Corporation, Santa Clara, CA (US)

(72) Inventors: Artur Zaks, Modiin (IL); Sergejs Hatinecs, Riga (LV); Eriks Ezerins, Riga (LV); Michael O'Hanlon, Clare (IE); Brendan Ryan, Limerick (IE); Jurijs Soloveckis, Riga (LV); David Coyle, Limerick (IE)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 16/235,000

(22) Filed: Dec. 28, 2018

(65) Prior Publication Data

US 2019/0141572 A1  May 9, 2019

Related U.S. Application Data

(63) Continuation-in-part of application No. 15/684,311, filed on Aug. 23, 2017, which is a (Continued)

(51) Int. Cl.
*G06F 7/04* (2006.01)
*H04W 28/06* (2009.01)
(Continued)

(52) U.S. Cl.
CPC ......... *H04W 28/065* (2013.01); *H04L 9/3242* (2013.01); *H04L 47/365* (2013.01);
(Continued)

(58) Field of Classification Search
None
See application file for complete search history.

(56) References Cited

U.S. PATENT DOCUMENTS

2005/0223111 A1* 10/2005 Bhandaru ........... H04L 12/4604
709/236
2006/0165103 A1  7/2006 Trudeau et al.
(Continued)

FOREIGN PATENT DOCUMENTS

WO       2016/089267 A1    6/2016
WO   WO-2016089267 A1 *   6/2016  ......... H04L 12/4633
WO       2016/193823 A1   12/2016

OTHER PUBLICATIONS

Notice of Allowance dated Sep. 27, 2019 for U.S. Appl. No. 15/684,311.
(Continued)

*Primary Examiner* — Brandon S Hoffman
(74) *Attorney, Agent, or Firm* — Maschoff Brennan

(57) ABSTRACT

A service provider (SP) network device or system can enable a WiFi protected access 2 (WPA2) pass-through with a user equipment (UE) and define various partitions between a physical access point (pAP) and a virtual AP (vAP) based on virtual network function(s) (VNFs). The WPA2 pass-through can be an interface connection that passes through a computer premise equipment (CPE) or wireless residential gateway (GW) without modifying the data traffic and also enable different packet sizes, even if the vAP or data VNF at the SP network device is not configured to process the size, by fragmenting and defragmenting at least one of: a packet frame from the UE to the vAP, or from the vAP to the UE based on fragmentation criteria.

22 Claims, 34 Drawing Sheets

Related U.S. Application Data continuation-in-part of application No. PCT/US2017/024956, filed on Mar. 30, 2017.

(51) Int. Cl.
| | |
|---|---|
| *H04W 12/10* | (2009.01) |
| *H04L 29/06* | (2006.01) |
| *H04W 76/12* | (2018.01) |
| *H04L 12/805* | (2013.01) |
| *H04L 9/32* | (2006.01) |
| *H04W 84/12* | (2009.01) |

(52) U.S. Cl.
CPC ........ *H04L 63/0272* (2013.01); *H04L 69/166* (2013.01); *H04W 12/1006* (2019.01); *H04W 76/12* (2018.02); *H04W 84/12* (2013.01)

(56) References Cited

U.S. PATENT DOCUMENTS

| | | |
|---|---|---|
| 2011/0051698 A1 | 3/2011 | Verma |
| 2015/0327052 A1 | 11/2015 | Ghai |
| 2018/0288614 A1 | 10/2018 | Zaks et al. |
| 2019/0058543 A1* | 2/2019 | Stephenson .......... H04B 7/0897 |

OTHER PUBLICATIONS

International Preliminary Report on Patentability dated Oct. 1, 2019 for International Application No. PCT/US2017/024956.
International Search Report and Written Opinion dated Sep. 29, 2017 for International Application PCT/US2017/024956.
Non-Final Office Action dated Apr. 24, 2019 for U.S. Appl. No. 15/684,311.

* cited by examiner

Control VNF- Data VNF Interface

```
/* Messages sent between VNF Control and VNF Data servers */
typedef enum {
    vnf_id_msg_status = 0,
    vnf_id_bss_add,
    vnf_id_sta_add,
    vnf_id_bss_del,
    vnf_id_sta_del,
    vnf_id_key_set,
    vnf_id_key_get,
    vnf_id_frame_tx,
    vnf_id_frame_rx,
} e_hauth_vnf_msg_id_t;

/* Message STATUS (vnf_id_msg_status)
 * Direction: hostapd AUTH to VNF, VNF to hostapd AUTH
 * Description: This message confirms execution status of
 previously issued message.
 */
typedef struct {
    uint8  msg_id;    /* vnf_id_msg_status */
    uint8  msg_cnf;   /* id of the message confirmed with
status */
    uint16 padding;
    uint32 error_code; /* 0: OK, NOK otherwise (TBD) */
} __MTLK_PACKED vnf_msg_vap_add_t;
```

Control VNF - Data VNF Interface

/* Message ADD BSS
* Direction: hostapd AUTH to VNF
* Description: This message informs VNF about new guest BSS addition.
*/
typedef struct {
    uint8   msg_id;                    /* vnf_id_bss_add */
    uint8   bssid[ETH_ALEN];  /* BSS MAC address */
} __MTLK_PACKED vnf_msg_bss_add_t;

/* Message ADD STA
* Direction: hostapd AUTH to VNF
* Description: This message informs VNF about new STA is connected to guest BSS.
*/
typedef struct {
    uint8   msg_id;                    /* vnf_id_sta_add */
    uint8   bssid[ETH_ALEN];  /* BSS MAC address */
    uint8   sta_addr[ETH_ALEN]; /* STA MAC address */
} __MTLK_PACKED vnf_msg_sta_add_t;

/* Message DEL BSS
* Direction: hostapd AUTH to VNF
* Description: This message informs VNF about guest BSS deletion.
*/
typedef struct {
    uint8   msg_id;                    /* vnf_id_bss_del */
    uint8   bssid[ETH_ALEN];  /* BSS MAC address to delete */
} __MTLK_PACKED vnf_msg_bss_del_t;

/* Message DEL STA
* Direction: hostapd AUTH to VNF
* Description: This message informs VNF about STA is disconnected from the guest BSS.
*/
typedef struct {
    uint8   msg_id;                    /* vnf_id_sta_del */
    uint8   bssid[ETH_ALEN];  /* BSS MAC address the station belongs to */
    uint8   sta_addr[ETH_ALEN]; /* STA MAC address to delete */
} __MTLK_PACKED vnf_msg_sta_del_t;

Control VNF - Data VNF Interface

```
/* Message SET KEY
 * Direction: hostapd AUTH to VNF
 * Description: This message sets a key, sequence
 counter and cipher suite for a STA
 */
typedef enum {
    vnf_cs_tkip = 0,
    vnf_cs_ccmp,
    vnf_cs_aes_cmac
} e_vnf_cipher_suite_t;

typedef struct {
    uint8  msg_id;                    /* vnf_id_key_set */
    uint8  sta_addr[ETH_ALEN];        /* STA MAC address */
    uint8  bssid[ETH_ALEN];           /* BSS MAC address */
    uint8  key_id;                    /* 0: PTK; 1,2: GTK; 3,4: IGTK */
    uint8  cipher_suite;              /* cipher suite type */
    uint8  padding[3];
    uint64 seq;                       /* sequence counter(IV/PN) for TKIP and CCMP keys*/
    uint16 key_len;                   /* key length */
    uint8  key[0];                    /* the key itself (variable length) */
} __MTLK_PACKED vnf_msg_key_set_t;
```

Control VNF – Data VNF Interface

```
/* Message "TX 802.11 frame"
 * Direction: hostapd AUTH to VNF
 * Description: This message transmits 802.11 frame from hostapd AUTH to VNF.
 */
typedef struct {
    uint8  msg_id;                    /* vnf_id_frame_tx */
    uint8  sta_addr[ETH_ALEN];        /* STA MAC address */
    uint8  padding;
    uint16 frame_len;                 /* length of 802.11 frame */
    uint8  frame[0];                  /* 802.11 frame (variable length) */
} __MTLK_PACKED vnf_msg_frame_tx_t;

/* Message "RX 802.11 frame"
 * Direction: VNF to hostapd AUTH
 * Description: This message informs hostapd AUTH for the new 802.11 frame
 reception.
 */
typedef struct {
    uint8  msg_id;                    /* vnf_id_frame_rx */
    uint8  sta_addr[ETH_ALEN];        /* STA MAC address */
    uint8  padding;
    uint16 frame_len;                 /* length of 802.11 frame */
    uint8  frame[0];                  /* 802.11 frame (variable length) */
} __MTLK_PACKED vnf_msg_frame_rx_t;
```

FIG. 26

NATIVE FRAGMENTATION IN WIFI PROTECTED ACCESS 2 (WPA2) PASS-THROUGH VIRTUALIZATION PROTOCOL

CROSS REFERENCE TO RELATED APPLICATIONS

This application is a continuation-in-part of U.S. application Ser. No. 15/684,311, filed on Aug. 23, 2017, entitled "WIFI PROTECTED ACCESS 2 (WPA2) PASS-THROUGH VIRTUALIZATION PARTITION", patented on Feb. 4, 2020 as U.S. Pat. No. 10,555,171, that is a continuation-in-part of International Application No. PCT/US2017024956, filed on Mar. 30, 2017, entitled "WIFI PROTECTED ACCESS 2 (WPA2) PASS-THROUGH VIRTUALIZATION" claiming the benefit of provisional application of U.S. Provisional Application No. 62/525,933 filed Jun. 28, 2017, entitled "WiFi PROTECTED ACCESS 2 (WPA2) PASS-THROUGH VIRTUALIZATION PARTITION", the contents all of which are herein incorporated by reference in their entirety.

FIELD

The present disclosure is in the field of security, and more specifically, pertains to a WiFi Protected Access 2 (WPA2) pass-through interface and techniques for virtualization related to the WPA2 pass-through such as various partitioning and related data/control flows.

BACKGROUND

Network Function Virtualization (NFV) involves the replacement of physical network nodes with Virtual Network Functions (VNFs) implemented via Virtualization Resources (VRs) that perform the same function as the physical node, or the physical Access Point (pAP). Community Wi-Fi service provides a guest Internet access over residential gateways (GWs) (e.g., a customer premise equipment (CPE), an access point (AP) of a CPE, a residential Access Node, residential gateway (GW), or the like) for customers of communication services provider (CoSP) when they are out of their home and within range of the residential gateway. Community Wi-Fi is enabled as an additional Wi-Fi network, which can be on top-of or in addition to other networks such as a residential home network for Internet access at the home, which can be provisioned over the residential gateway by the CoSP or service provider (SP) network.

BRIEF DESCRIPTION OF THE DRAWINGS

FIGS. 23-26 illustrate data sets with message data for a control VNF/data VNF interface in accordance with one or more aspects or embodiments described herein.

DETAILED DESCRIPTION

Figure 1:
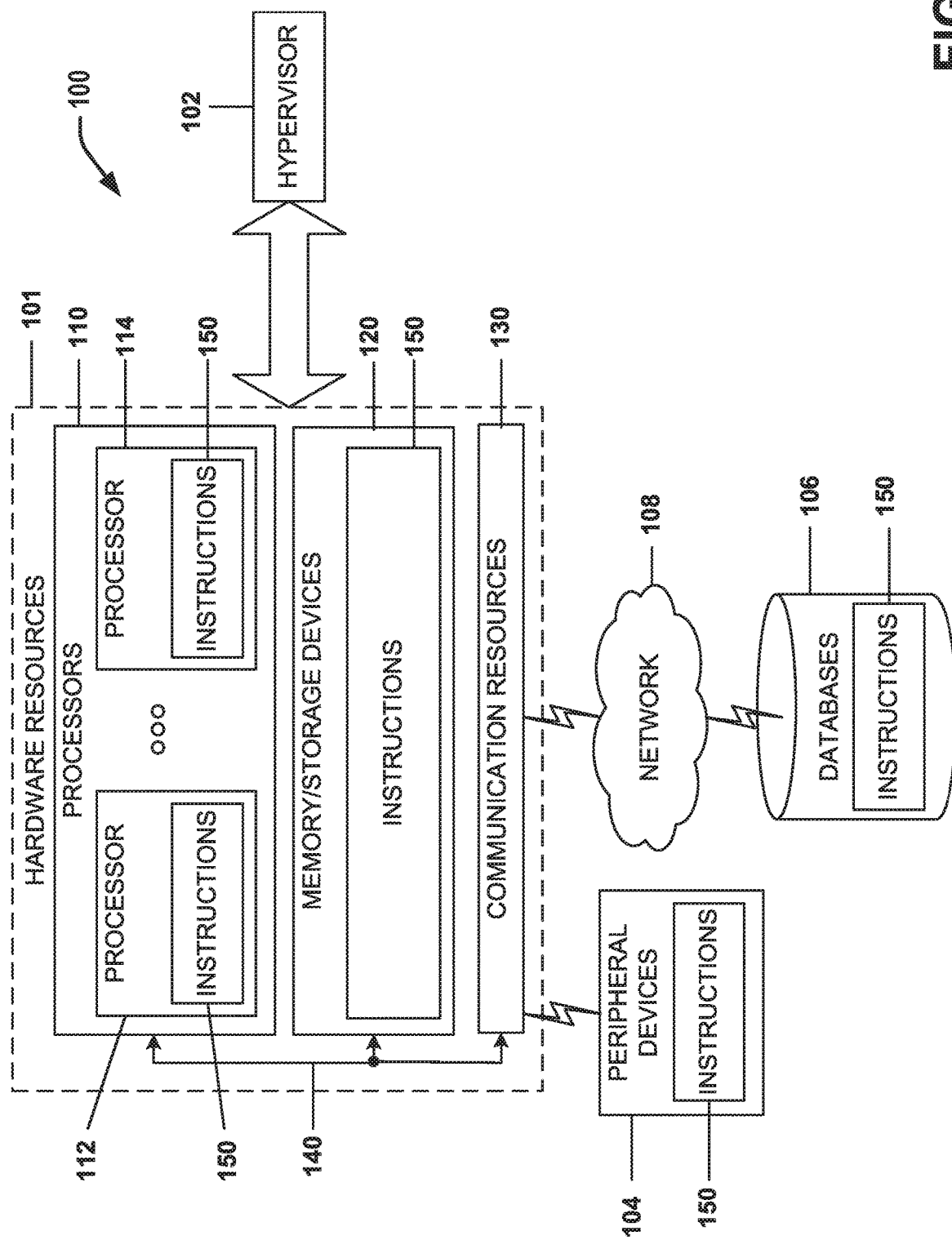
FIG. 1 is a diagram illustrating components of a network in accordance with one or more aspects or embodiments described herein.

The present disclosure will now be described with reference to the attached drawing figures, wherein like reference numerals are used to refer to like elements throughout, and wherein the illustrated structures and devices are not necessarily drawn to scale. This includes reference numerals ending in the same number or numerals referencing blocks as components with the same name. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In WiFi protected access 2 (WPA2) pass-through from a service provider (SP) network to a client device (e.g., a user equipment (UE)), the packet frame length can overly increase by applying tunneling and vAP protocol overheads to the 802.11 frame; making the resulting frame longer than a default maximum transmission unit (MTU) size (e.g., about 1500 bytes, or other size) potentially causing it to be dropped by network nodes (e.g., the customer premise equipment (CPE), the physical Access Point (pAP), a virtual AP (vAP), data virtualized network function (D-VNF), or other SP network node). As such, security can suffer as well as data flow and integrity.

In consideration of deficiencies of radio frequency communications and authentication operations, various aspects for enabling a community Wi-Fi AP VNF with WPA2 pass-through interface from the SP network to a client device (e.g., a UE, a mobile device, a wireless device, such as a wireless laptop or other wireless device, or other network device) are disclosed. Data traffic over a community Wi-Fi network can pass between mobile devices (or UEs) of a guest subscriber to an SP (e.g., a network provider of a cable, digital subscriber line (DSL), passive optic network (PON), or satellite network service) and to the SP network (a wide area network (WAN), or access to a WAN such as for an access to the Internet) via the community Wi-Fi pass-through, which means through or by the community Wi-Fi network at a home or residential gateway device (e.g., a customer premise equipment (CPE), physical AP, home/residential/business entity access node). The residential gateway (GW) can transparently pass data traffic of the community Wi-Fi network from the UE/wireless client to the SP network device of an SP network by means of, via, through, or by the WPA2 pass-through.

The passage of data can be referred to as transparent in this case because the data traffic can be passed by the hosting wireless residential GW without modification, alteration, decryption or change by the associated home/residential GW to the SP network at an SP access point or virtual AP (vAP) of the SP network, for example. In this sense the data traffic can pass transparently through (or via) a secured WPA2 pass-through as a connection interface (or WPA2 pass-through interface) from the UE to the SP network without the residential GW (or CPE) device/component being enabled to change, decrypt or modify the data traffic of the community WiFi network. The data traffic can be sent or received by the UE or by the SP network device of an SP network as authenticated, protected and secure, using a Wi-Fi protected access 2 (WPA2) security in a secure connection, as the WPA2 pass-through interface.

Presently, when connected to the residential gateway, the clear text or unsecured traffic community Wi-Fi traffic can be tunneled and forwarded to the SP network over the WAN after an authenticated and secured connection is established with the residential GW. However, this can represent a vulnerability where a hosting user (or owner) of the residential GW could tap into the community Wi-Fi traffic and spoof communications from a guest subscriber using a UE or client of the SP network with the residential GW as a Hotspot, for example, or a pass-point in accordance with Wi-Fi Alliance standards. This vulnerability can be aggravated when a hosting home has a home network range extender connected to the residential GW using Ethernet or an Ethernet connection there-between. In this case, the data traffic could be sent in clear text over the Ethernet to the home residential GW and become even easier to spoof, even after authentication or security protocols are established between the range extender and the UE, for example.

Further, the packet frames configured for communication through the WPA2 pass-through interface could exceed a packet size threshold (e.g., about 1314 bytes, 1500 bytes, 1600 bytes, or other size). In this case, to avoid the packets being dropped, a fragmentation component and a defragmentation component in either the receive path or the transmit path located at the CPE, the data VNF, at both can operate to re-assemble (defragment) or fragment the packet frames as each are received for processing.

In one example, an apparatus or system (e.g., an SP network device/component) of the SP network can be configured to be employed in/with a service provider (SP) network device/component (e.g., a processing device of a network server/a rack server or the like network device) with one or more processors, coupled to a memory that includes instructions to execute operations of the one or more processors. The SP network device, for example, can be configured to generate a WPA2 pass-through from the SP network to the UE or mobile device (user) without providing an opportunity for external breach or tampering at the ranger extender or the wireless residential GW at a home/entity hot spot or other CPE.

The SP network device, for example, can initiate (or instantiate) the WPA2 pass-through as an interface that tunnels or flows from the SP network, through the CPE, and to a UE, as an end-to-end interface between the UE and the SP network device. As such, the SP network device can receive, via the WPA2 pass-through, a set of traffic data in packet frames from the UE, wherein the set of traffic data is unmodified by the CPE; unmodified referring to not being decrypted, changed, or initially altered by the CPE/residential GW. The data traffic (or packet frames) can be associated, in particular, with a community WiFi network of the CPE, which is separate from a residential network of the home or home owner that could be operational with other UEs at the wireless residential GW with a different basic service set identifier (BSSID) for example.

Some aspects/embodiments disclosed herein are directed to particular data protocol details, data flows, how or when the components fragment or defragment packet frames for one or more VNFs from the physical AP to a virtual AP, and at the physical AP (e.g., BSS management, or one or more related functions), as well as related functionality.

In particular, a major technical problem being addressed concerns operation in the remote WPA2 mode (a WPA2 pass-through being instantiated for an identified client) where the frame size can be increased because of the addition of structure to packet frames, thereby increasing the overhead, such as with a virtual AP structure, GRE overhead, Outer IP overhead, an Outer MAC or the like to the packet frame. So it may happen that the resulting frame could be longer than the default maximum transmit unit size for Ethernet or for Docsys (e.g., about 1500 bytes, 1600 bytes, or other size threshold), in which without further treatment the frames could be dropped.

As such, various aspects and embodiments relate to fragmentation and defragmentation as well as the associated structures and criteria for each to prevent such packet frames from being dropped. Additional aspects, embodiments or details of the disclosure are further described below with detail in reference to figures.

FIG. 1 is a block diagram illustrating components of a system or network device 100, according to some example embodiments, able to read instructions from a machine-readable or computer-readable medium (e.g., a machine-readable storage medium) and perform any one or more of the functions, operations, processes or methodologies discussed herein. One or more components of the system or device 100 can be employed or utilized with, in or as a part of a user equipment (UE) (e.g., a mobile device, wireless device, or the like), a server provider network device/component (e.g., a network access node, network orchestrator, network server, rack server, network controller/processor, network data base, or the like), a computer premise equipment (CPE) (e.g., a router, residential/entity GW, access node, AP, base station, evolved Node (eNB), or the like). Specifically, FIG. 1 illustrates a diagrammatic representation of hardware resources 101 that can be configured for use within the network device or system 100 including one or more processors (or processor cores) 110, one or more memory/storage devices 110, and one or more communication resources 130, each of which can be communicatively coupled via a communication link (e.g., a bus 140) or other connection (e.g., an optical link, wireless connection, wired connection, or other like communication connection).

For embodiments where node virtualization (can be utilized, as in a network function virtualization (NFV)) operation, a hypervisor 102 can be executed to provide an execution environment for one or more network slices/sub-slices to utilize the hardware resources 101. Such hypervisor 102, for example, can comprise a virtual machine monitor (VMM) that comprises a computer software, firmware or hardware resources, which create or execute on virtual machines to operate on a computer/processing device. Virtualization, as referred to herein, can be referred to as the removal of a function from a device (e.g., a CPE) and assigning or relocating the function to another device on a network either as software, firmware, specialized hardware or a combination thereof on the SP network for performing the similar or same function instead.

The processors 110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) can include, for example, a processor 112 and a processor 114. The memory/storage devices 110 can include main memory, disk storage, or any combination thereof.

The communication resources 130 can include interconnection and/or network interface components or other suitable devices to communicate with one or more peripheral devices 104 or one or more databases 106 via a network 108. For example, the communication resources 130 can include wired communication components (e.g., for coupling via a Universal Serial Bus (USB)), cellular communication components, Near Field Communication (NFC) components, Bluetooth® components (e.g., Bluetooth® Low Energy), Wi-Fi® (Wi-Fi/WiFi) components, and other communication components.

Instructions 150 can comprise software, a program, an application, an applet, an app, or other executable code for causing at least any of the processors 110 to perform any one or more of the methodologies discussed herein. The instructions 150 can reside, completely or partially, within at least one of the processors 110 (e.g., within the processor's cache memory), the memory/storage devices 110, or any suitable combination thereof. Furthermore, any portion of the instructions 150 can be transferred to the hardware resources 101 from any combination of the peripheral devices 104 and/or the databases 106. Accordingly, the memory of processors 110, the memory/storage devices 110, the peripheral devices 104, and the databases 106 are examples of computer-readable and machine-readable media.

In various embodiments, techniques/processes described herein can be employed to create, delete, or determine threshold(s) or parameters (e.g., latency, power, load, etc.) in connection with a VNF related virtualization resource (VR) performance measurement (PM), or to generate a notification of a crossing of such threshold(s) by one or more related parameters (e.g., latency, power, load, or other related parameters of a Wi-Fi standard such as an IEEE standard, Wi-Fi Alliance standard, 3GPP, or other standard). To enable security for UEs, provide flexibility for SP subscribers (UEs or users paying for SP internet or WAN access) operating among different Wi-Fi networks, including a community Wi-Fi network (e.g., a hotspot, hotspot 2.0, Wi-Fi passpoint, or other public community WiFi network) throughout residential or business entities, eliminate vulnerabilities, and optimize load balancing, between a residential (home/business/or other entity) gateway (GW) and an SP network, a WPA2 pass-through can be generated or enabled by an SP network device or SP network component with various components or elements as described herein. The WPA2 pass-through can be a communication link, interface, tunnel or other connection that passes through the wireless residential GW or CPE to a UE or wireless subscriber device with WPA2 encryption security and as an end-to-end point connection, for example.

In various embodiments discussed herein, an SP network component (e.g., the SP network device/component 200 of FIG. 2) of a service provider (e.g., a cable provider, DSL, PON or other network provider operable to provide a network or network service to a WAN/the Internet) can enable different/various home networks of a residential/entity GW or CPE, for example, including a community WiFi network with data traffic associated with a particular Basic Service Set (BSS) with layer 2 privacy through (via or by) the GW or CPE. In addition, the networks configured at the CPE, for example, can comprise different types/classes of networks enabling users access to the Internet. These networks that can be configured or enabled at the CPE (e.g., with a network router, ranger extender or other associated network devices/components in a home) and include networks such as a home access network (e.g., a personal area network (PAN)), a community Wi-Fi network that is managed by the SP (e.g., a hot spot (1.0/2.0) or passpoint with a wireless local area network (WLAN)), a local area network (LAN) or the like, in which each network can be associated with or correspond to a different BSSID, for example. Each network, for example, can comprise a pAP or a CPE (e.g., residential GW 240 of FIG. 2) dedicated to the residential/entity location for providing one or more networks at a single location/CPE/wireless residential GW or physical AP. One or more SP network devices or components (e.g., SP network device 202) can enable or facilitate virtualization of the Wi-Fi AP or the pAP, in which virtualization can be performed by means of NFV, which can refer to or mean taking a function typically associated with the hardware residential GW, CPE or pAP and moving this functionality away from the hardware to another location (e.g., away from the residential GW to the SP network). This affords an advantage of being able to provide better security and broader usage for users.

In one embodiment, an SP network device/component, for example, can virtualize the encryption for WPA2 security from the pAP to an SP network component of the SP network and enable the WPA2 pass-through to one or more UEs. Each UE, for example can be independently established with a connection/access at the home pAP as part of or independently with the SP network as a guest of the home pAP. For example, a home/residential network can be different from a community Wi-Fi network or hot spot at the pAP. Both network can be access by the UE, but the community WiFi network can be independently accessed from the pAP to the SP network over a secure WPA2 pass-through from the UE to the SP network, in which the SP network operates a WAN that can further access the Internet, for example, and the home a network that access a network at the home to the SP network and to the Internet, for example.

Additionally, one or more SP network components can operate to partition or configure partitions as a partition configuration for NFV in a virtual access point (vAP) at the SP network from the pAP of the CPE. Various partitions can include different functionalities or VNFs that operate in the CPE and are virtualized to a point in the SP network so this point or vAP controls, manages and takes over these functions, as will be described in more detail below.

Figure 2:
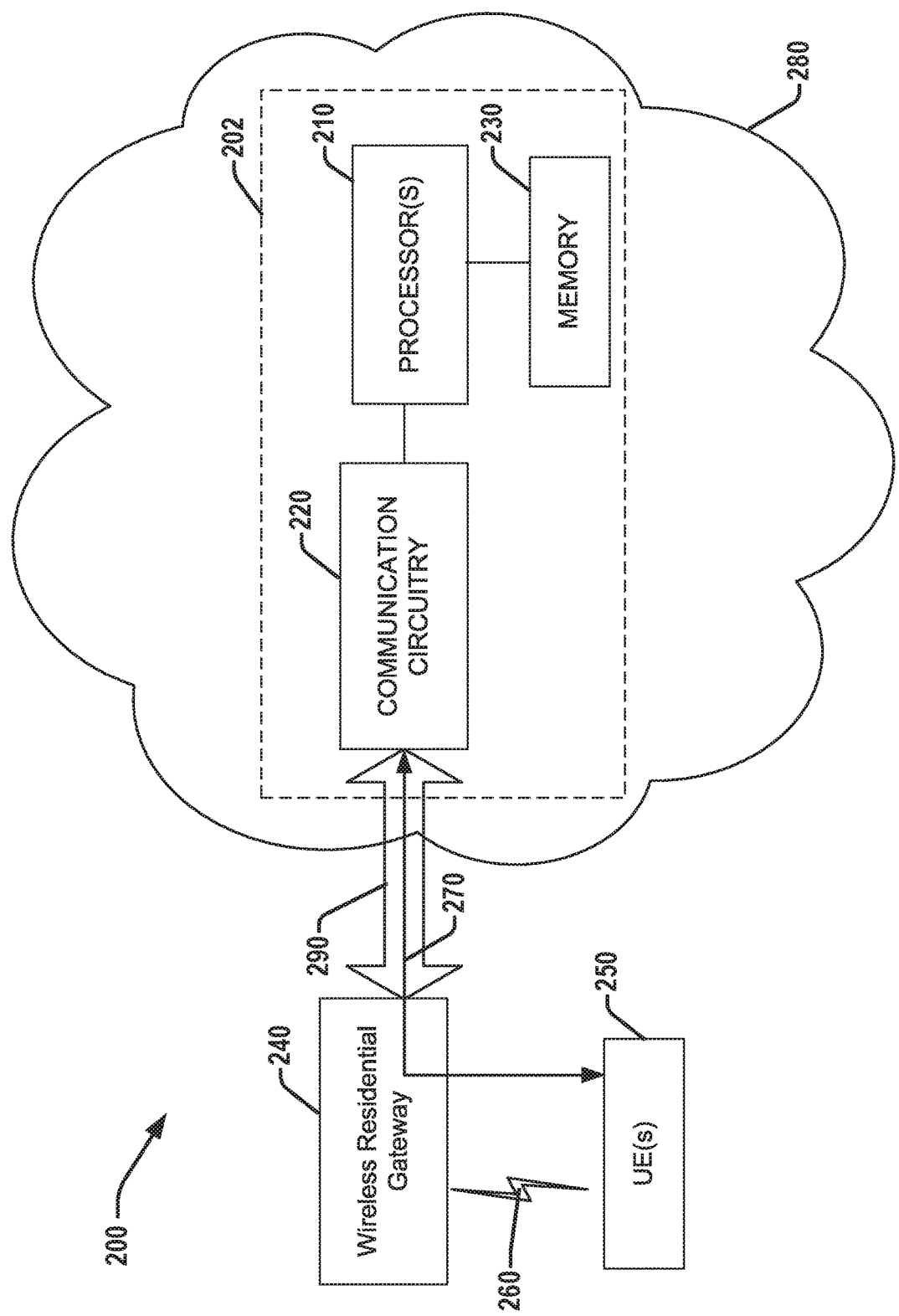
FIG. 2 is a block diagram illustrating components, according to some example embodiments, able to read instructions from a machine-readable or computer-readable medium (e.g., a machine-readable storage medium) and perform any one or more of the methodologies discussed herein.

Referring to FIG. 2, illustrated is a block diagram of a network system 200 or network environment with an SP network device 202 that can facilitate/enable generation, management, processing or termination of a WPA2 passthrough with a VNF based vAP of a community Wi-Fi network as a virtual WPA2, according to various aspects described herein. Depending on the embodiment, the SP network device 202 can be employed in connection with or comprise one or more of a network manager (NM), an element manager (EM), a virtual network function orchestrator (VNFO), a virtual network function manager (VNFM), a Virtualized Infrastructure Manager (VIM), a WiFi access point management (WAPM), a Radius Client, an authenticator, a Basic Service Set (BSS) management component, a Home Subscriber Server (HSS)/a Mobility Management Entity (MME)/a Serving GateWay (SGW)/a Packet Data Network (PDN) GateWay (PGW)/a Policy and Charging Rules Function (PCRF), which can be associated with a Third Generation Partnership Project (3GPP) standard, a WiFi Alliance standard, a European Telecommunication Standards Institute (ETSI) standard (such as NVF Management and Orchestration (MANO) standard), or other such standard, for example.

In one or more embodiments, the networks herein (e.g., network system 200) could operate in compliance with a 3GPP standard to provide a 3GPP management framework or with European Telecommunication Standards Institute (ETSI) standard such as NVF Management and Orchestration (MANO) standard to support lifecycle management to instantiate, terminate, scale in, scale out, scale up, or scale down one or more VNF instances dynamically according to demand, security or load balancing. As discussed herein, an "instance", instantiating or an instantiation can refer to starting (initiating) or executing (running) a virtual machine that is capable of implementing a VNF such as a VNF related to establishing (generating) or managing (controlling) a WPA2 pass-through of an SP network 280 that extends from an SP network device/component of the SP network to a UE (e.g., a mobile phone, laptop, personal computer, personal digital assistant, or other wireless device capable of connection to the SP network or the Internet). Termination can refer to closing or stopping the execution/running such a virtual machine/component.

System 200 can comprise the SP network device/component 202 that can operate to instantiate or generate a WPA2 pass-through that virtualizes the security (e.g., authentication and security/privacy) of the wireless residential GW 240. The SP network device 202 can further enable an SP network that can provide WAN access (e.g., Internet access) to one or more subscribers/clients/client devices/UEs, for example. The SP network device 202 can include one or more processors 210 (e.g., processors 112, 114 or other examples herein), communication circuitry 220 (which can facilitate communication of data via/by/through one or more reference points, networks, APs, nodes, etc., and can comprise communication resource(s) 130, etc., of FIG. 1), and memory 230 (which can comprise any of a variety of storage mediums and can store instructions and/or data associated with at least one of the one or more processors 210 or communication circuitry 220, and can comprise memory/storage device(s) and/or cache memory of processor(s) 210, etc.).

In some aspects, the one or more processors 210, the communication circuitry 220, and the memory 230 can be included in a single device, (e.g., the SP network device 202) being collocated or non-collocated, for example, while in other aspects, they can be included in different devices, such as part of a distributed network architecture/environment. As described in greater detail below, system 200 can enable the generation of a WPA2 pass-through 270 as an interface, tunnel or link between one or more UEs 250 and a vAP of an SP network component 202 of an SP network 280. The vAP, for example, can be an instantiated partition or proportion of resources located on the SP network 280 that is configured to perform one or more functions of the wireless residential GW/CPE 240 or a component thereof in lieu of or instead of the CPE 240.

The WPA2 pass-through 270, as generated by the SP network component 202, can virtualize the authentication or encryption that is associated with WPA2 security from the residential GW/CPE 240 to the SP network component 202, and further enable the WPA2 pass-through secure communications to one or more UEs through the residential GW 240 without modification of the associated data traffic by the wireless residential GW 240. Wi-Fi Protected Access (WPA) and Wi-Fi Protected Access II (WPA2) are two security protocols and security certification programs developed by the Wi-Fi Alliance to secure wireless computer networks. The Wi-Fi Alliance and standard body defined these in response to serious weaknesses researchers had found in the previous system, Wired Equivalent Privacy (WEP). WPA2 became available in 2004 and can be a shorthand for the full IEEE 802.11i (or IEEE 802.11i-2004) standard. WPA2 replaced WPA. WPA2, which demands testing and certification by the Wi-Fi Alliance, implements the mandatory elements of IEEE 802.11i. In particular, it includes mandatory support for Counter mode with cipher block chaining message authentication code (CBC-MAC) protocol (CCMP), an advanced encryption standard (AES)-based encryption mode with strong security.

A WPA2 pass-through 270 can be an interface or connection through or via the CPE 240 from the SP network to a UE detected by the CPE 240 that is a secure connection/tunnel based on WPA2 security. The WPA2 pass-through can enable/manage an authentication or security protocol with the UE 250 based on a VNF of a physical access point (pAP) associated with the community WiFi network for a virtual access point (vAP) of the SP network 280 of the SP network device/component 202. An access point can be a Service Access Point (SAP), which can be an identifying label for network endpoints used in Open Systems Interconnection (OSI) networking. The SAP can be a conceptual/physical location at which one OSI layer can request the services of another OSI layer at different "endpoints". As an example, PD-SAP or PLME-SAP in IEEE 802.15.4 can be mentioned, where the Media Access Control (MAC) layer requests certain services from the Physical Layer. Service access points are also used in IEEE 802.2 Logical Link Control in Ethernet and similar Data Link Layer protocols, for example. When using the OSI Network Layer (connection-oriented network service (CONS) or connection-mode network service (CLNS)), the base for constructing an address for a network element can be a network service access point (NSAP) address, similar in concept to an IP address. OSI Application Layer protocols as well as Asynchronous Transfer Mode (ATM) can use Transport (TSAP), Session (SSAP) or Presentation (PSAP) Service Access Points to specify a destination address for a connection. These SAPs consist of NSAP addresses combined with optional transport, session and presentation selectors, which can differentiate at any of the three layers between multiple services at that layer provided by a network element.

A physical AP, or pAP can be established within a CPE, and be a part of the CPE/GW 240, for example. A VNF of a pAP associated with a community WiFi network can be a function that is associated normally with the physical AP (e.g., a physical SAP or physical location of an SAP/AP) and the community WiFi network (e.g., a hot spot network or passpoint), and further replaced or taken over in lieu thereof by another component; in one case, for example, this can be at the SP network 280 outside of the CPE 240 or home network environment, for example. For example, security, authentication or initiation of an instance of a WPA2 pass-through or a partition can be associated with the community WiFi network over other networks that could be generate simultaneously or concurrently through the CPE 240.

A partition can be referred to as a process that divides network functions by a partition configuration between the CPE 240 and the SP network component 202 of an SP network 280. A partition configuration of VNFs can be a division of functions between two components such as a pAP and a vAP, in which the vAP is associated with the functions of the pAP at a different location, such as on or a part of the SP network device/component 202 in the SP network 280. In one example, a server chip or processing device at a server or other network device of the SP network 280 can be comprise operations, instructions or software associated with the function that is replacing or being re-located from the pAP and the community WiFi network associated.

As such, the WPA2 pass-through 270 can enable/manage an authentication or security protocol with the UE 250 based on a VNF of a pAP associated with the community WiFi network for (e.g., the creation of) a vAP of the SP network 280 of the SP network device/component 202. The vAP, thus, can be a creation or instance of a set of functions that have been virtualized from the pAP in relation to a community WiFi network. The community WiFi network can be a hot spot, or other pass point or network configured to be enabled at the CPE 240 for guest, subscribers of the SP (e.g., Com cast), or the home with a UE 250 that recognizes the community WiFi network by a BSSID, for example, and initiates connection with it. In return, an authentication/security protocol can be exchanged without interference, tampering, modification or concern of breach by or through the CPE 240.

The residential GW or CPE 240 in conjunction with the SP network system 200 can operate to support different types of authentication of wireless clients 250, or authentication standard protocols that can dictate how the client/UE 250 or mobile phone connects to the community WiFi network and how it authenticates to the SP network 280. For example, Wireless Internet Service Provider version 1.0, or WISPr 1.0, could be one such authentication protocol found in the airplane portal, or in public spaces when a public WiFi network without security could connect a UE 250 to the GW or CPE 240 according to one or more credentials (email, address, etc.) that could be similarly associated with an SP, for example, to further enable a WAN or Internet access based on browser-based login at a captive portal hotspot. Another example authentication protocol can be 802.1x or other IEEE standard 802.1, where a specific procedure/protocol with (e.g., 0.1x) can be with/without extensions such as EAP-TTLs, PEAP, EAP-SIM, EAP-AKA, for example, which are associated with different mechanisms that use different credentials/processes. Once access to a network such as the SP network 280 establishes connection to the internet or other network, for example, data traffic is encrypted (e.g., via WPA2) for security/privacy, or is left unencrypted. The WPA2 pass-through operates to provide such security as an end-to-end connection through a CPE 240 without modification by the CPE 240, as such the WPA2 pass-through can be said to be transparent to the CPE 240.

In one embodiment, the SP network component 202 can operate to virtualize authentication and encryption protocols over the WPA2 pass-through to ascertain one or more credentials to be filled in by the UE 250, or client by maintaining/controlling/operating functions that would otherwise be associated with the residential GW/CPE 240 at the SP network 280. The authentication protocols can include, for example, WISPr 1.0, or 802.1x protocol where a specific procedure/protocol with 0.1x can be with/without extensions such as EAP-TTLs, PEAP, EAP-SIM, EAP-AKA, for example.

As such, the SP network component 202, for example, can create a virtual network function for a pAP to form an instance of a vAP based on one or more VNFs, depending on the partition configuration. A home gateway—the wireless residential GW—can be connected to the SP network 280 over a cable/digital subscriber line (DSL)/passive optical network (PON) 290 with the data traffic or packets flowing through a GRE tunnel to the Wireless Access GW 240. The UE 250 is then connected over a WiFi link 260 to the residential GW 240. Privacy can be ensured via WPA 2 privacy on the wireless link 260 between the UE 250 and the residential GW device 240 or CPE. As such, the encryption key for such privacy would normally reside in the GW 240 (or in the AP) and in the UE devices 250. As such, all the data traffic or packets can be encrypted using WPA 2 or WISPr link, between the UE 250 and the GW 240. However, opportunities for spoofing from the home can still exist within the connection between the CPE 240 or pAP, for example, and the SP network, in which the cable, DSL, PON or other connection is existing (as traffic data can be in clear text). This can be especially true where the CPE 240 includes a range extender. From the CPE, data can then be further encrypted over the broadband link/cable DSL/PON L2 privacy on a communication link between the CPE 240 and the SP network 280 in the WLAN access GW network. As such, two links co-exist with different securities and in the middle there can be the opportunity for no security/privacy.

The WPA2 pass-through 270 from end-to-end ensures such security all the way through the CPE to the SP network and ensures that modification, tampering or breach of privacy does not provide opportunity otherwise, in association with a community WiFi network. The WPA2 pass-through 270 can be instantiated or generated by the SP network device 202 when there is a configuration at the CPE 240 where all the traffic for a specific network (e.g., community WiFi network) is passed transparently through the residential GW 240 without the residential GW 240 touching any of the bits on this traffic, and through the cable/DSL/PON access to the SP network 280 at one or more components/devices thereat (e.g. the SP network device 202).

Authentication or security protocol(s) can then be facilitated through the WPA2 pass-through 270 connection/interface. An encryption key is then communicated (shared) between the UE 250 and some function or component in the SP network 280 as part of such protocol. In this situation, all the data traffic from the connecting UE 250 can flow transparently through the home network CPE 240, gets to the SP network 280, and there it is encrypted/decrypted. With this approach utilizing or generating the WPA2 pass-through 270 by the SP network device/component, there is no security at home or at a home CPE, in the middle between the UE and the SP network, where the traffic is not encrypted and someone can hack into this home GW 240 and get an access to it. This is the traffic that does not belong to the home network, it's the traffic of the community WiFi, and thus belongs to the SP, but happens to pass through the home network via the WPA2 pass-through.

Figure 3:
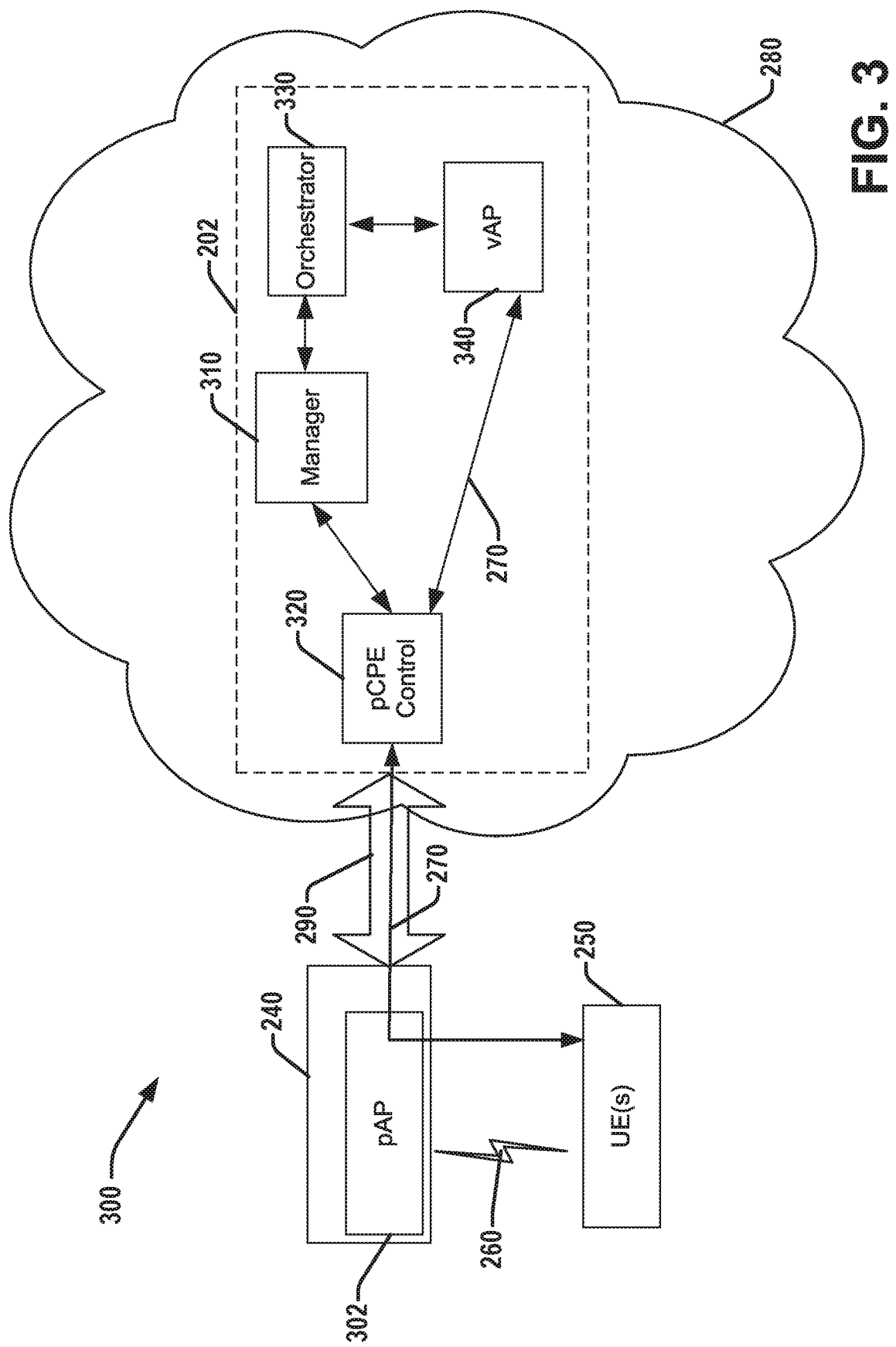
FIG. 3 is a block diagram of a network system that facilitates/enables operations in connection with a virtualized network function (VNF) related networking components and WPA2 pass-through operations, according to various aspects or embodiments described herein.

Referring now to FIG. 3, illustrated is another example of an SP network that can configure a WPA2 pass-through 270 in accordance with various aspects or embodiments described in this disclosure. In order to generate or instantiate the WPA2 pass-through 270 from the SP network 280 to the UE 250, the WiFi access point as a pAP 302 of the CPE 240 can be configured to operate in the WPA2 pass-through mode where the WPA2 pass-through 270 is functionally active for a virtual community WiFi access point or vAP 340 of the SP network 280. The pCPE control 320 can configure the CPE 240 to not interfere with data traffic associated particularly with a community Wi-Fi network and over or in conjunction with any home network or other LAN configuration the CPE 240 could also be configured to manage independently/separately alongside the community Wi-Fi network. In a WPA2 pass-through mode, for example, the CPE 240 simply passes data traffic associated with the community WiFi network along or through it on a WPA2 pass-through 270 communication interface, link or tunnel, for example.

In another embodiment, once the pAP 302 of the CPE 240 is configured to bypass any function associated with initializing a network (e.g., authentication, security encryption/decryption, etc.), a WiFi access port function including the functionality to derive one or more of these functions with an encryption key can be instantiated or moved from the pAP 302 to the SP network 280 to the vAP 340. The vAP 340 could operate all functions partitioned from the pAP 302 and to the vAP 340 as part of communication through an access GW controller or pCPE controller 320 at the SP network 280. The SP network 280 then can include therefore the access GW or pCPE control/controller 320, where, for example, the broadband from a home/residence/entity GW 240 can be connected. The connection from the pCPE control 320 to the CPE or residential GW 240, for example, could be over top of cable, DSL or PON, wireless or other connection 290 as a communication link or as part of the WPA2 pass-through 270.

Community WiFi Access GW or pCPE control 320 can be a component controls communication and flow of the BSS related to the community WiFi network and link VNFs with a corresponding instance of one or more vAPs 340, in which the data traffic for an associated BSS for community WiFi flows through. For example, the pCPE control/controller 320 could control the authentication protocol flow through the WPA2 pass-through 270 from the vAP 340 that initiates the flow per one or more request/inquiry/decryption operations, as well enable actions/operations related to virtualizing the functions, such as VNFs, from the pAP 302 to an instance of the vAP 340 associated with a community WiFi network. These devices or components can remain in the SP network.

In another embodiment, the manager component 310 and the orchestrator 330 can be a VNF orchestrator configured to enable virtualization of network functions from the CPE 240 based on a partition configuration of the VNFs. For example, the orchestrator 330 can be configured to facilitate/enable/control on-boarding of network services (NS) and VNF packages, NS lifecycle management, global resource management, validation and authorization of network functions virtualization infrastructure (NFVI) resource requests, and the like. The orchestrator 330 can be coupled to the manger 310 as well as the vAP (or virtualized network element) 340 as a VNF manager that oversees or controls lifecycle management of VNF instances; coordination and adaptation role for configuration and event reporting, for example. The pCPE can operate also as a virtualized infrastructure manager (VIM) as an entryway or portal to the SP network 280 and the SP network device(s) or components 202, for example, to control and manage the NFVI compute, storage, or network resources, including the WPA2 pass-through and WPA2 protocol process flows. Any one of the orchestrator 330, database or other server component (e.g., authentication, authorization, accounting server, or the like) of a server system, which manages or enables the SP network 280 can further operate to open an access for a specific user/UE 250 (e.g., service set identifier (SSID)) of the SP network 280 to the internet or other WAN.

A remote office or enterprise network such as with a VPN can be a configuration where a residential gateway is changed or configured to connect to the SP network 280 as an intranet of a business or other entity, such as to a corporate network or corporate IT system. The UE 250 (e.g., laptop, PC or other similar processing device) connects to the home and connects to the corporate network. However, disadvantages and potential security issues exists with the encryption, or the secured communication between the UE 250 laptop and the CPE or residential GW 240 in the home, which may use WPA2 security protocols between the UE and the CPE 240, or the UE 250 and a range extender connecting the UE 250 to the residential GW/CPE 240 as an end-to-end connection. In one solution, a second device from an enterprise company like Cisco, for example, (the AP or VPN client) can be provided with the VPN tunnel to connect with or at the CPE. Further, the VPN client additionally creates secured tunnel from the laptop to my corporate network. On top of this VPN link or tunnel, the UE 250 is able to communicate to be in corporate intranet and get access to any corporate services. However, the data traffic of the private network or home network at the CPE 240 is also put onto the VPN link. Essentially, access is provided to the VPN tunnel, which is from the home on the PC and usually adds to the processing frustration of the user experience, resulting in slower UEs often that are putting all home network activity on top of the VPN connection as well usually.

In an aspect, the WPA2 pass-through and virtualization of related functions can be enabled to replace virtual private network (VPN) functions of an enterprise network as the SP network 280, which can also comprise in this case an intranet or WLAN that can further be connected to other networks or the SP network 280 enabling access beyond to the internet or other WAN. The WPA2 pass-through in this case provides the enterprise security and can add to the 802.1x standard or related protocol connection.

For example, an authentication protocol can be 802.1x or other IEEE standard 802.1x, in which x is any integer or other undetermined variable, where a specific procedure/protocol with (e.g., 0.1x) can be with/without extensions such as EAP-TTLs, PEAP, EAP-SIM, EAP-AKA, for example, which are associated with different mechanisms that use different credentials/processes. Once access to a network such as the SP network 280 establishes connection to the internet or other network, for example, data traffic can be encrypted (e.g., via WPA2) for security/privacy, or is left unencrypted. The WPA2 pass-through operates to provide such security as an end-to-end connection through a CPE 240 without modification by the CPE 240, as such the WPA2 pass-through can be said to be transparent to the CPE 240. As such, the WPA2 pass-through creates a tunnel with transparent communication over the CPE 240 such that all the traffic between the UE 250 and the SP network 280 is unchanged and the end-points of the WPA2 pass-through can be fully secure end-points (e.g., layer 2 end-points) in the SP network 280 and in the UE 250.

In another embodiment, the community WiFi network can be a hot spot, or other pass point or network configured to be enabled by the SP network device/system 202 at the CPE 240 so that UEs 250 can that are not necessarily residents or secured for access by other networks managed by the CPE 240 (e.g., a home network or the like) can transparently access a community WiFi network via the WPA2 pass-through connection. A vAP 280 can be instantiated by removing functions of the pAP 302 from the CPE 240, or the home with a UE 250 that recognizes the community WiFi network. In response to a successful authentication from the authentication protocol with the SP network, the PS network device can receive, via the WPA2 pass-through 270, data traffic associated with a particular BSS corresponding to the community WiFi network enabled by the CPE 240 and be transparently passed along to the SP network for a virtual community WiFi network over the WPA2 pass-through as an end-to-end WPA2 connection between the UE 250 and SP network device 202 or one of the corresponding components thereat (e.g., the vAP 340). The BSS can identify or serve as a filter for UEs 250 not belonging or associated with the home network, which is managed by the CPE 240. The BSS of the community WiFi network can be from among multiple other BSSs for other networks managed by the home/residential CPE. However, the community WiFi network over the WPA2 pass-through is managed by the SP network 280 or associated SP network device/component thereof alone with associated VNFs, depending upon a VNF partition configuration, for example. The BSS of the community WiFi network can be one basic service set (BSS) from among a plurality of BSSs with a layer 2 privacy through a residential GW 240, wherein the BSS is based on a BSS identification (BSSID) associated with the community WiFi network. The UE 250 can then receive or initiate with a BSSID, for example, connection or access. In return, an authentication/security protocol can be exchanged without interference, tampering, modification or concern of breach via, by or through the CPE 240 over the WPA2 pass-through 270.

BSS, for example, can provide the basic building-block of an 802.11 wireless LAN. In infrastructure mode, a single access point (AP) together with all associated stations (STAs) can be called a BSS; not to be confused with the coverage of an access point, known as the basic service area (BSA). Every BSS has an id called the BSSID, which is the MAC address of the AP servicing the BSS.

The SP network 280 of the SP network device 202 with the home network of the CPE 240 can be a layer-to-layer network, in which there are multiple BSSs that can be configured in the wireless GW 240, one BSS for home network and another for the community WiFi network, for example. As such, the WPA2 pass-through associated with a community WiFi network can be established with only a specific BSS to bypass associated data traffic without modification. Thus, the majority of home/residential/entity data traffic belonging to the home CPE 240 can remain managed thereat, such as communication between a UE (e.g., a television, phone, etc.) to a phone, or media center to the TV, as well as further to the internet, for example. However, the community WiFi network via the WPA2 pass-through traffic always belongs to the SP network 280 or associated server/device/system of the SP network 280, and this home network of the CPE 240 just provides a means to get the bits from the mobile device to the SP for an end-to-end pass-through interface, namely the WPA2 pass-through itself.

In another aspect/embodiment, there can also be multiple virtual APs 340 that can be defined over a single WiFi access point chip or processing device (e.g., processors 112, 114, or 210), such as the pAP 302. For example, the CPE 240 can define multiple APs through the one pAP, one for home and one for community WiFi. The UE 250, for example, could see/detect multiple WiFi networks, all of which can be enabled/configured in the same piece of hardware or CPE 240. The SP network device 202 of the SP network operates to virtualize one (e.g., the community WiFi network) by taking physical functions and removing them from the pAP 302 to the vAP 340 of SP network 280 as VNFs and leaves the home network with another BSS or BSSID untouched or remaining as configured already at the pAP 302, for example, for a virtualized community WiFi network to be created.

As such, multiple different virtual APs can be defined over a single WiFi access point (e.g., the pAP 302 of the CPE 240). A home AP or home network can operate in conjunction at the CPE, and over single WiFi AP, processing device or CPE, for example, multiple APs (e.g., pAP 302), one for a home network that manages UEs at a residence or entity, and another one for a community WiFi network. The UE 250, thus, would detect or observe the different WiFi networks available the same piece of hardware. However, the SP network device/component 202 could virtualize just the communication WiFi network at the vAP 340, and maintain the others with function at the CPE 240. As such, the home network could still control home traffic for traffic to the general internet as determined in the home at the CPE 240, which is not related to the SP, while control of removing such functions for access from the CPE 240 and to the SP network for the community WiFi network can be done by the network pAP controller 320 and to instantiate the vAP 340.

In one example, two or more virtual APs 340 can be generated with a distinct network names and a MAC address. Additionally, two or more community WiFi networks virtual APs with a distinct network name and MAC address can also be formed/instantiated. As such, multiple virtual APs can be enabled over a single WiFi AP GW/CPE 240 to provide multiples VLANs supported by one or more processors, for example, to provide, for example, 4 to 64 different vAPs 340. One or more virtual APs can have a distinct L2 MAC address (e.g., a BSSID), a distinct network name (e.g., SSID) and maintain a separate protocol identify, for example. From the UE 250's perspective, the virtual APs would appear as several APs that operate on the same radio frequency (RF) channel. WiFi AP firmware and software layers can be designed for common functions (e.g., channel selection, channel access, or the like) and per-virtual AP functions (e.g., data traffic segregation, L2 security or the like).

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 4:
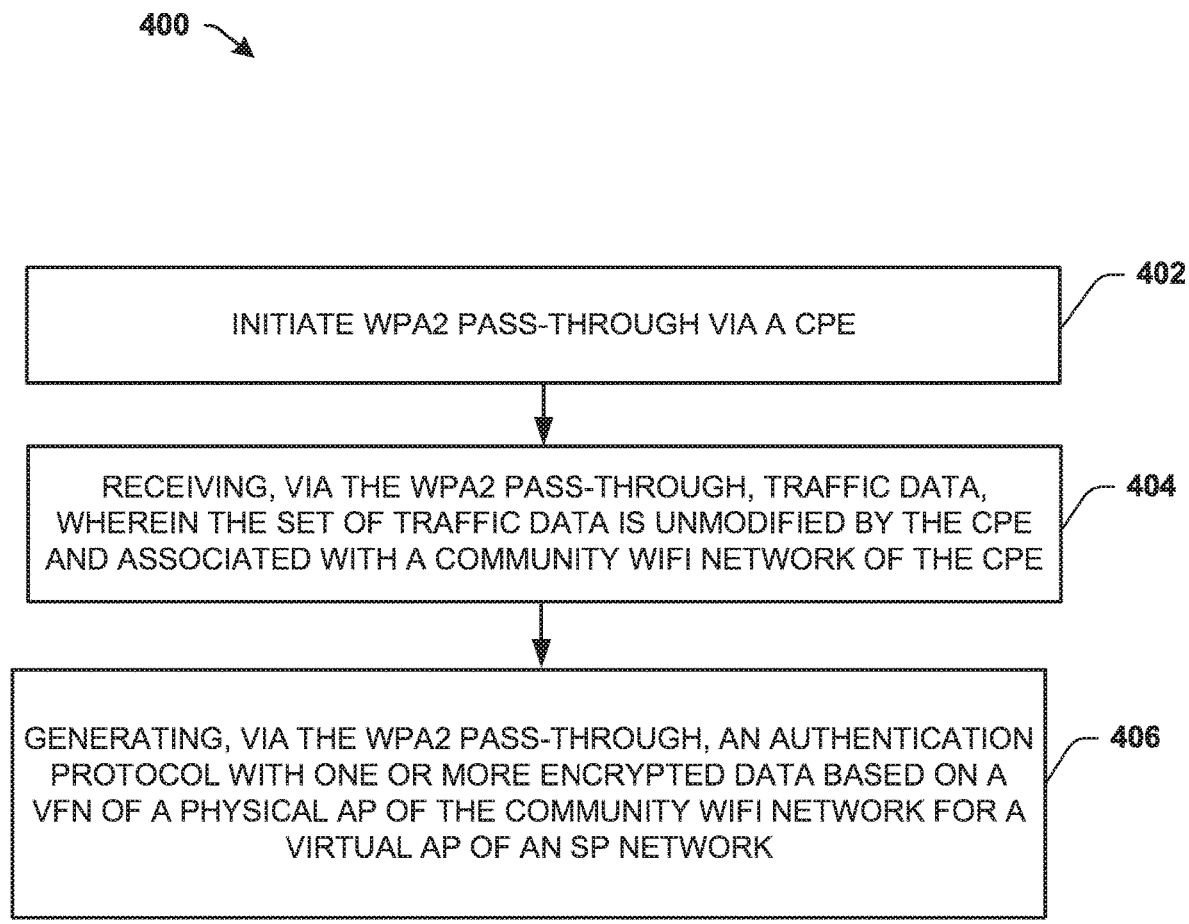
FIG. 4 a block diagram of a process flow for a SP network WPA2 pass-through according to various aspects described.

Referring to FIG. 4, illustrated is a process flow 400 employed within a system or device for enabling a WPA2 pass-through from an SP network. An SP network component can execute one or more operations by a processing device with a memory having executable instructions.

At 402, the operations can include initiating a WiFi protected access 2 (WPA2) pass-through via a CPE 240 to a UE 250. The WPA pass-through 270 can be an end-to-end connection between the UE 250 and a component (e.g., vAP 340) of the SP network 280. The WPA2 pass-through 270 can be a link, tunnel or interface that is secured by a WPA2 security and further passes-through the physical components of a residential GW or CPE 240 to the UE 250 and to the vAP 340, for example, or other SP network component (e.g., pCPE control 320, manager 310, orchestrator 330 or other components of the SP network 280.

At 404, the process flow 400 includes receiving, via the WPA2 pass-through, a set of traffic data from the UE, wherein the set of traffic data is unmodified by the CPE and associated with a community WiFi network of the CPE. The UE 250 can detect a community WiFi network over a residential gateway or CPE 240. The UE 250 can then further initiate the WPA2 pass-through generation via a pAP 302 of the CPE 240 by connecting with the community WiFi network associated with an SP network at the vAP 340. The UE can then communicate transparently via the WPA2 pass-through a set of encrypted data to enable an authentication protocol at the vAP, in which the data is unmodified and decrypted at the vAP where it is received.

At 406, the SP network device can then receive data from the UE over the WPA2 pass-through and be configured to generate, by the wpa2 pass-through, an authentication protocol with encrypted data based on a VNF of the pAP associated with the community WiFi network for a vAP of the SP network. In other words, the vAP can become generated by a NVF of the pAP to the SP network by a virtualization of its functions that replaces them on the SP network.

The SP network device can comprise a WiFi access point management (WAPM)/a Radius Client/an authenticator/a BSS management, for example, that receives UE data over the WPA2 pass-through that is associated with one BSS form among different BSSs with Layer 2 privacy configured at the CPE. The BSS can be associated with the community WiFi network based on a BSS identification (BSSID) at a pAP, which passes any UE data traffic related through the WPA2 pass-through without modification, or transparently.

Figure 5:
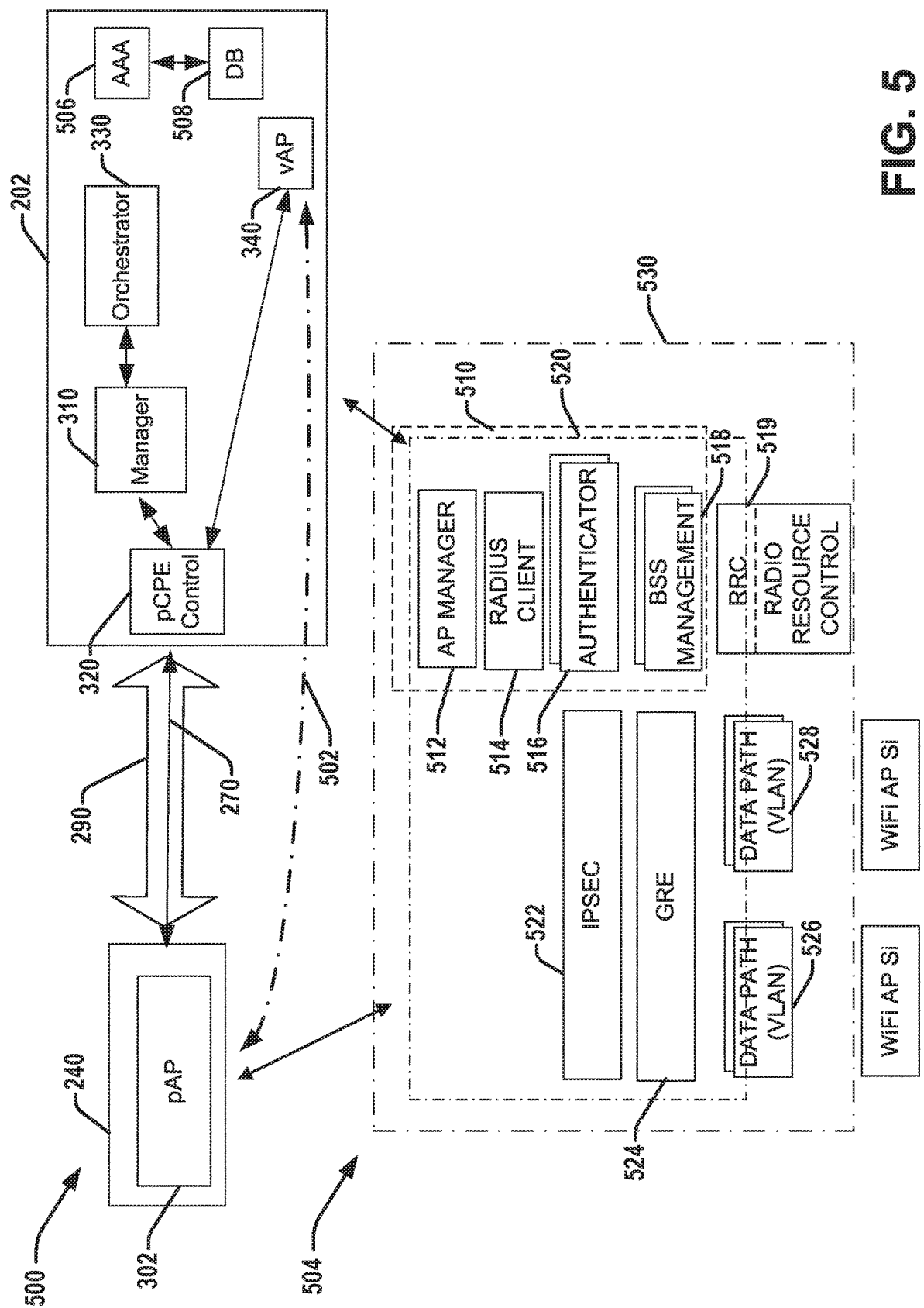
FIG. 5 is another network system that facilitates/enables operations in connection with a VNF related networking components and WPA2 pass-through operations for dynamic partition configuration, according to various aspects or embodiments described herein.

Referring to FIG. 5, illustrated are different partition configurations for virtualizing or generating VNFs from the residential GW to the SP network associated with a community WiFi network system 500 for enabling/supporting a WPA2 pass-through. Reference is also made to the above figures in the description. A partition configuration can refer to the resources, hardware, firmware or software and associated functions that are either removed from the pAP 302 and assigned to the vAP 340, or kept at the pAP 302 in the CPE 240, for example. Each feature or function associated with the community WiFi network at the CPE 240 can be enabled by a change in the partition (or partition configuration), which defines which functions are at the pAP 302 or removed/assigned for operation to the vAP 340. Some of the functions of the CPE 240 can be moved out and put in a data center, server component, or other SP network device/component 202, which further can change the protocol, how the different functions communicate in and out from one another through the WPA2 pass-through.

In one embodiment, a communication link 502 can be provided between the CPE and the vAP 340, which can be controlled by the orchestrator 330, for example, in order to control and measure communication parameters there-between. One such communication parameter, for example, can include a communication latency. Other communication parameters can also be monitored by the orchestrator 330 as well, such as power, signal strength, load, or other communication network parameters in order to dynamically determine the partition configuration of the APs for VNFs associated with the WPA2 pass-through.

The orchestrator 330 can operate in conjunction with the vAP 340 or the control 320 of the SP network in order to generate or configure partition configurations of the VNFs dynamically or on-the-fly based on a communication parameter(s) (e.g., latency) of the communication link 502. The partition configurations 504 can be virtualized (moved from the CPE 240 to the SP network device 202) to the vAP 340 so that any one partition 510-530 can be selected, enabled or dynamically modified from among these functions, which can be removed from the CPE 240 and executed/assigned by the SP network at the vAP 340 or other SP network component, for example, in relation to a community WiFi network.

The orchestrator 330, for example, can measure latency, and then decide by the latency which functions to virtualize or re-assign from the pAP 302 to the vAP 340. Based on this decision, the orchestrator 330 can configure both the virtual network function(s) VNFs 504 and the physical AP 302 to instantiate this specific configuration (or partition configuration). Different configurations can be enabled based on latency. For example, partition configuration one 510 can be enabled as a first partition configuration from among different VNFs when the latency of the link 502 (or 290) is within a first range (e.g., about 100 ms or greater than 100 ms). A second partition can be configured when the latency is determined as being within a second range that is different from the first. The second range can comprise, for example, a latency value that is less than about 100 ms and greater than about 10 ms. A third partition configuration that is different from the first and second partitions can be configured when the latency is in a third range different from the first and second ranges. For example, the third range can be a latency value that is less than about 10 ms.

In another embodiment, the first partition 510 can include the following components along with associated functions or VNFs as they can be referred to herein. For example, a WiFi AP management component 512 can be configured to operate one or more policy settings associated with the vAP 340, such as security policies, security extensions with WPA2 security, group settings of one or more UEs, permissions, relates quality of service parameters (QoS), or other network policies or settings, for example. The first partition 510 can further include a RADIUS client component 514 that is configured to operate one or more authentication processes with an authentication server component 506, such as an authentication, authorization, accounting server as well as an associated database 508, for example. The AAA server component 506 can operate to retrieve/compare/confirm/process one or more keys, or security credentials for authentication or decryption of data traffic, for example. The first partition 510 can further include an authenticator component 516 configured to authenticate a user equipment (UE) with the vAP 340 through the pAP 302 on the WPA2 pass-through 270 based on the one or more authentication processes/protocols. The first partition 510 can further include a basic service set (BSS) management component 518 configured to operate a channel selection associated with a BSS identification (BSSID) of the community WiFi network for a client authentication and a key derivation, for example. The BSS management component 518 can control L2 security (per SSID/BSSID), as well as client connection management, the RADIUS CLIENT, or robust security client/WPA2 authentication/authentication requests. Any one of these components/associated functions by which each is configured can reside within or be controlled by the SP network device 202 or any component (e.g., virtual AP 340) therein, for example, as VNFs associated with the SP network 280 from the pAP 302.

In another embodiment, the first partition configuration of VNFs, including the AP management component 512, the RADIUS client component 514, the authenticator 516, and the BSS management component 518 can be classified as non-real time functions, in which the functions do not necessarily occur immediately in time and even if the function is not successful/complete or fails to meet a parameter or time deadline, possibly more than one (e.g., with multiple requests), the network system 500 is not considered in failure. As such, in some instances the results are not worthless in value for a result after any deadline for requests of the associated function, or is not zero, rather it could degrade over time or be pre-configured without being modified immediately or dynamically upon any modification or change in parameters or partition configuration, for example. These functions (VNFs) can be considered non-real time function with a latency of greater than about 10 ms, for example.

Additionally, the second partition 520 can further include a radio resource control (RRC) component 519 configured to control per client (UE) functionalities and common functions among clients. The per client functionalities can include at least one of: setting a data path, transmit parameters (e.g., transmit power), one or more modulation coding schemes, a channel width, one or more beamforming groups, or client/UE received signal strength indicators, and the like. Common client functionalities can include at least one of: a dynamic frequency selection, a channel load or coexistence. Additionally, the second partition 520 can include an IPSec channeling/tunneling component 522 operations, GRE component 524 operations, as well as data path functions 526 and 528. These functions and components of the second partition configuration 520 can be based on a real-time operation (RRC 519, IPSec 522, GRE 524, data path 526, 528) and a non-real time operation (e.g., the components and related functions of the first partition configuration 510). Real-time operations can include those functions that have a latency (e.g., a round trip packet latency or time for the function to operate) or take between one to ten milliseconds to function, and non-real time functions can be those that have a latency of greater than 10 milliseconds, for example.

The third partition configuration 530 can include components/functions within the first partition configuration 510 and the second partition configuration 520, including related components and functions (or potential VNFs) that operate or demand hard real time operation. For example, the RRC 519 can include partially real-time and partially hard real time functions, in which the hard real time functions can be those functions of an associated component that are performed or utilized resources for any associated function for less than about 1 ms. A hard real time function can require a particular deadline, otherwise failure of the function can occur if success is not achieved on the first endeavor, for example.

The first partition configuration 510 of VNFs, including the AP management component 512, the RADIUS client component 514, the authenticator 516, and the BSS management component 518 can be classified as non-real time functions, in which the functions do not necessarily occur immediately in time and even if the function is not successful/complete or fails to meet a parameter or time deadline, possibly more than one (e.g., with multiple requests), the network system 500 is not considered in failure. As such, in some instances the results are not worthless in value for a result after any deadline for requests of the associated function, or is not zero, rather it could degrade over time or be pre-configured without being modified immediately or dynamically upon any modification or change in parameters or partition configuration, for example. These functions can be considered non-real time function comprising a latency of greater than about 10 ms, for example. The second partition configuration 520 further comprises real-time functions and associated components (RRC 519, IPSec 522, GRE 524, data path 526, 528), in which even if the component or function of the component fails to meet the deadline/time frame, possibly more than once (i.e. for multiple requests), the system is not considered to have failed. The real time functions operate with a latency of between about 1 to 10 ms, for example, while the third partition configuration includes hard real time functions operational at a latency of less than 1 ms.

In another embodiment, a configuration can be based on the type of interface between the CPE 240 and the SP network 280. For example, a cable network access can be selected to operate with the second partition configuration 520, while DSL or PON can differ in partition configuration in order to further enable/support/manage the WPA2 pass-through. The partition configurations however can be modified at any time during communication packet transfer between the UE, through the CPE and to the SP network based on the latency detected. Other parameters can instantiate other partition configurations as well, and the disclosure is not limited to latency as the only parameter(s) that can be used for dynamically enabling/generating a partition configuration from among various different potential partition configurations with or based on one or more VNFs. Further, the first, second, and third partitions 510-530 can be selected with different functions described herein as VNFs in different partitions 510-530. However, these example partition configurations 510-530 are not fixed or static to the given example embodiments described herein for supporting the WPA2 pass-through.

The data path components 526 and 528 can include functionality that at least partially can be moved out, or virtualized from the CPE 240 to the SP network 280 or device 202 as VNFs as well. The data paths or planes 526, 528 can be demonstrated as multiple network interfaces (interfaces per VLAN). Essentially, the network that is particularly being virtualized (i.e., the community WiFi network from the home CPE 240 with one or more related VNFs). One interface can be for the home network that is not virtualized, and the other one can be for the network that is virtualized. The functions managed by each here can include WPA2 privacy WPA2 privacy (e.g., encryption/decryption of the packet). For the non-virtualized network, the privacy encryption/decryption can stay here in the data path locally at the CPE 240, but the other one, for example, can be virtualized to the SP network where the encryption/decryption can be moved out to the SP network as well.

These partition configurations, for example, 510-530 demonstrate what VNFs can stay at the home and what can move out. Thus, each partition configuration with associated components or functions of the components can be virtualized and moved to the SP network 280, the SP network device 202, or an associated component in operation or functional capacity. Essentially, in order for the orchestrator 330 to decide what to move, the latency of the communication (e.g., over link 502 or 290) between the pAP 302 and the SP network is determined. In particular, because if the latency is too large, and some of the protocols/functionality is virtualized or moved out, the protocol itself built on wireless WiFi protocol will fail because it is bound in time.

In another embodiment, in order to define/determine what the latency of the communication is, the latency or link is measured. The orchestrator 330 can measure the latency by using a "ping" procedure. A ping, communication or query can be sent from the SP network 280 to the AP 302, which replies to the PING in response, and then the orchestrator 330 can measure the time it takes to receive the response, which will determine the latency. Then, the SP orchestrator 330 or manager 310 can operate to decide how to configure the partitions as well as the appropriate ranges of any parameters associated with the particular partition configurations 510-530, for example. Then the SP orchestrator 330 can configure the partition configuration 510-530 option with the AP 302 by sending a command to the AP 302 that indicates the partition configuration by which it should function or operate in association with a community WiFi network and one or more connecting UEs thereto. In addition, the orchestrator 330 can configure the appropriate VNFs on the SP network side of the WPA2 pass-through 270.

Figure 6:
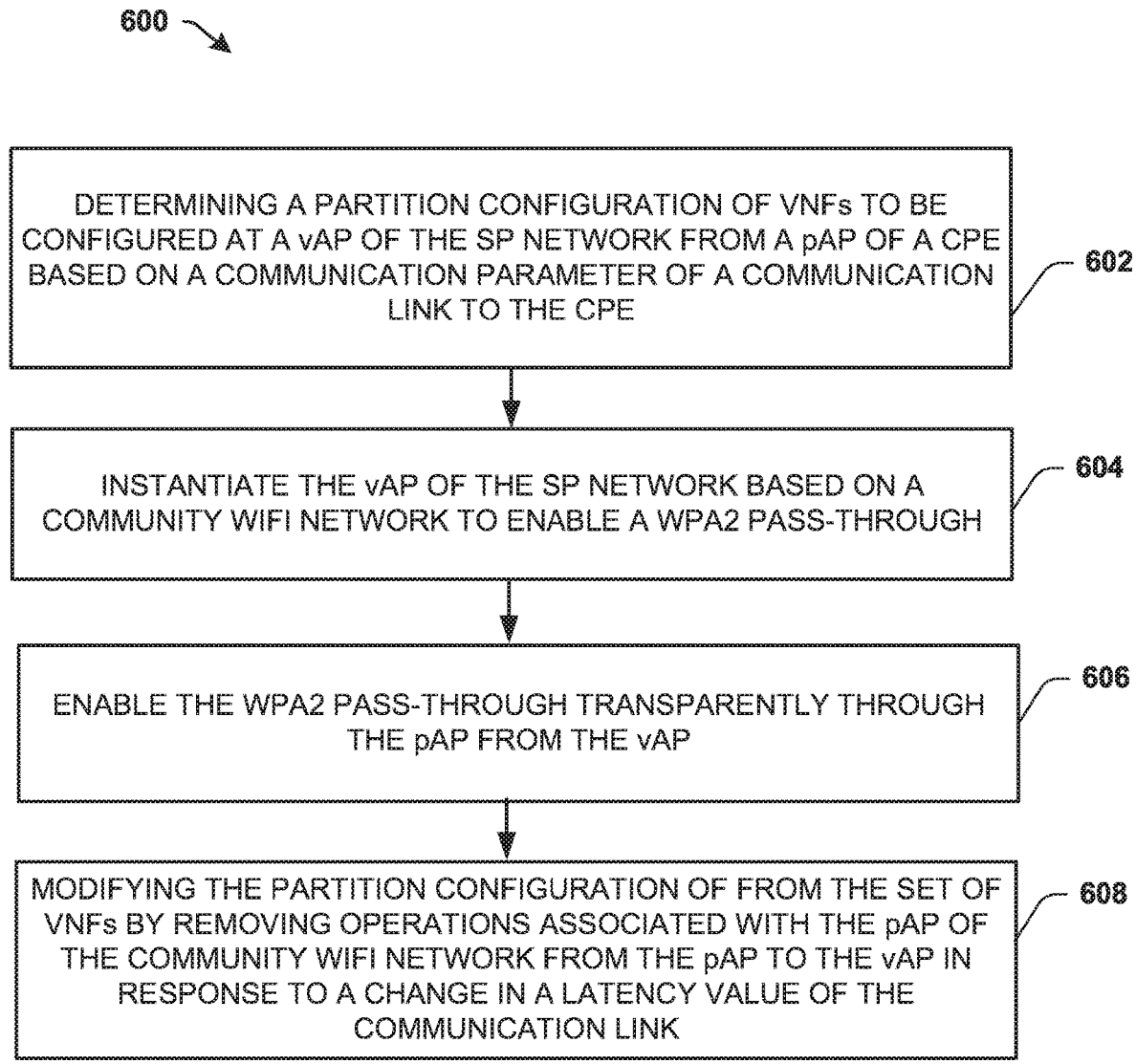
FIG. 6 another block diagram of a process flow for a SP network WPA2 pass-through and associated partition configurations according to various aspects described.

Referring to FIG. 6, illustrated is an example process flow 600 for dynamic partitioning operations associated with FIG. 5 in accordance with the aspects or embodiments being disclosed.

At 602, the process flow 600 initiates with determining a partition configuration of one or more VNFs to be configured at a virtual access point (e.g., vAP 340) of the SP network 280 from a physical access point (e.g., pAP 302) of a customer premise equipment (e.g., CPE 240) based on a communication parameter of a communication interface/link (e.g., link 502) to the CPE 240.

At 604, the flow comprises instantiating the vAP of the SP network based on a community WiFi network to enable a WiFi protected access 2 (WPA2) pass-through. This act can be based on a partition configuration determined by the VNF orchestrator 330, for example. A communication query or PING can be sent to the CPE, a response then received in response to the PING/query, and based on a measurement of a related parameter (e.g., WAN latency, load, etc.) the partition can be selected and configured.

At 606, the flow continues by enabling the WPA2 pass-through transparently through the pAP from the vAP.

At 608, the orchestrator 330, for example, can modify the partition configuration of from the set of VNFs by removing operations associated with the pAP of the community WiFi network from the pAP to the vAP in response to a change in a latency value of the communication link.

The first partition configuration from the set of VNFs can be configured when a link latency is about 100 ms or greater. The second partition configuration from the set of VNFs can be configured when the link latency is less than about 100 ms and greater than about 10 ms. A third partition configuration can be configured from the set of VNFs when the link latency is about 10 ms, or less than about 10 ms, for example. Alternatively, other ranges of parameters can correspond differently to the first, second or third partitions.

As such, the orchestrator component 330, or the SP network device 202 can measure a WAN link latency: GW-to-SP network Access GW, using a PING of communication, for example. Then a decision can be made to enable vAP functions based on measured latency, such as for non-real time control only (e.g., the first partition 510), non-real time control with privacy and a part of real-time control (e.g., the second partition 520), non-real time, real time, hard real-time control, and privacy (e.g., the third partition 530). Then the orchestrator 330 can configure the GW functions and AP VNFs (e.g. as a vWPA2 pass-through operational system). Then AP management and control is located on the virtual WPA control VNF, the AP data plane is in the virtual plane.

Figure 7:
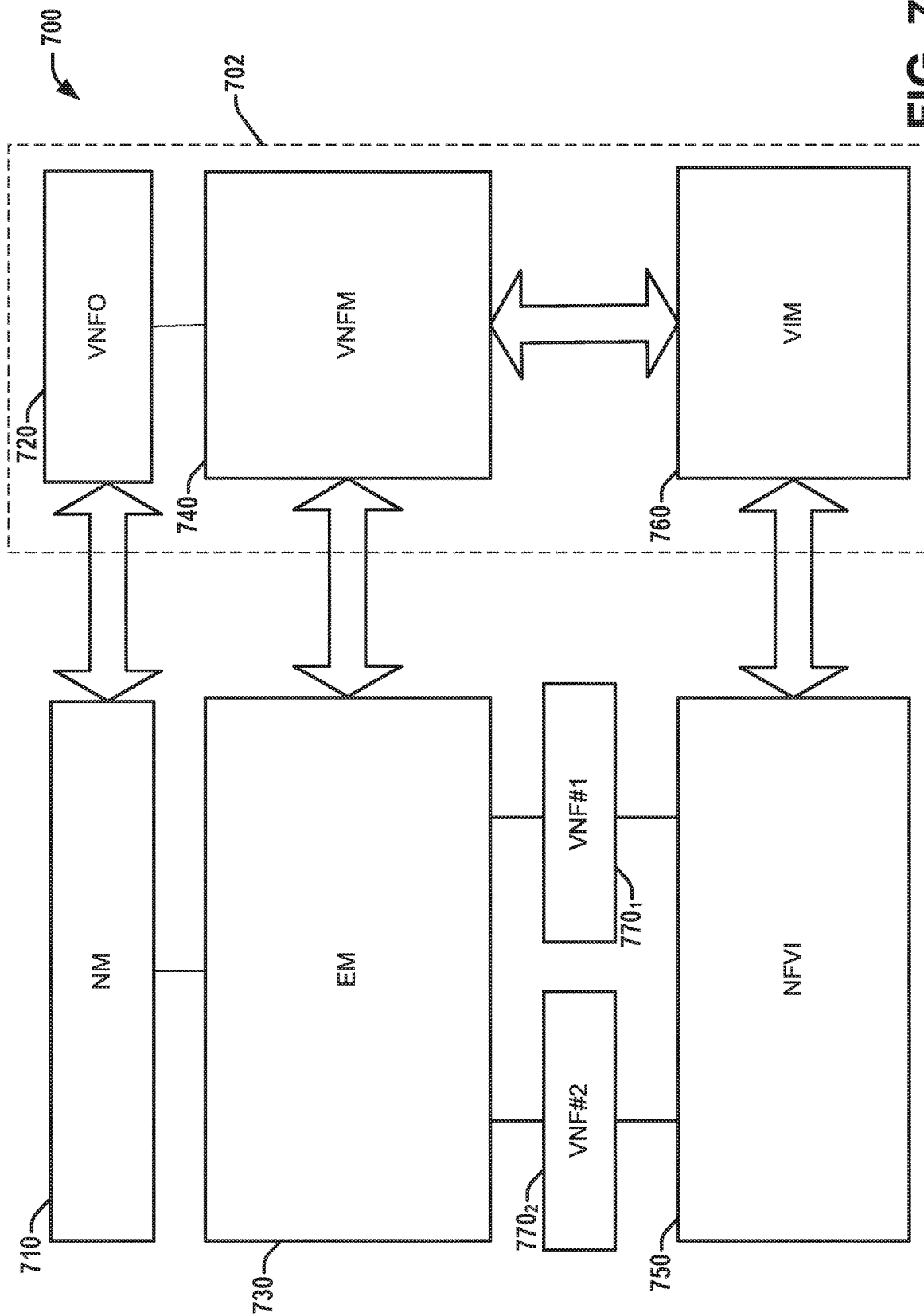
FIG. 7 is another network system that facilitates/enables operations in connection with a VNF related networking components and WPA2 pass-through operations for dynamic partition configuration, according to various aspects or embodiments described herein.

Referring now to FIG. 7, illustrated is an example virtualization architecture in accordance with various aspects or embodiments herein. For example, the NFV operations can be performed/managed according to the SP components, which can correspond to similarly to an NFV management and organization (NFV MANO) 702, as a defined framework for the management and orchestration of the cloud data center, including computing, networking, storage, and virtual machine (VM) resources. One or more components or devices within or a part of the SP network 280. The architecture 700 can facilitate or enable VR performance measurement threshold monitoring (e.g., such as by one or more partition configuration/communication link parameters) as well as threshold crossing notification according to various aspects described herein. In FIG. 7, a virtual network function (VNF) performance measurement (PM) threshold creation flow (and optional subsequent notification of threshold crossing) that can be employed in connection with various aspects described is illustrated as an example threshold monitoring operation, along with a threshold crossing notification flow.

The system illustrated in FIG. 7 comprises a Network Manager (NM) 710, Network Function Virtualization (NFV) Orchestrator (NFVO) 720, network Element Manager (EM) 730, a set of Virtualized Network Functions (VNFs) 770; virtualized by Virtualization Resources (VRs) of a NFV Infrastructure (NFVI) 750, a VNF Manager (VNFM) 740, and a Virtualized Infrastructure Manager (VIM) 760. The solid lines between these entities indicate the various reference points that facilitate data exchange between these entities, the dashed lines indicate the flow of data associated with threshold creation, and the dashed and dotted lines indicate the flow of data associated with the notification of threshold crossing.

One or more components discloses or described herein can correspond to these components. For example, the orchestrator 330 can be configured as the VNFO 720 to facilitate/enable/control on-boarding of network services (NS) and VNF functions, VNF packages, NS lifecycle management, global resource management, validation and authorization of network functions virtualization infrastructure (NFVI) resource requests, and the like. The orchestrator 330 can be coupled to the manger 310 as well as the vAP (or virtualized network element) 340 as a VNF manager 740 that oversees or controls lifecycle management of VNF instances; coordination and adaptation role for configuration and event reporting, for example. The pCPE control 320, for example, can operate also as a virtualized infrastructure manager (VIM) 760 as an entryway or portal to the SP network 280 and the SP network device(s) or components 202, for example, to control and manage the NFVI compute, storage, or network resources, including the WPA2 pass-through and WPA2 protocol process flows. Any one of the orchestrator 330, database or other server component (e.g., authentication, authorization, accounting server, or the like) of a server system, which manages or enables the SP network 280 can further operate to open an access for a specific user/UE 250 (e.g., service set identifier (SSID)) of the SP network 280 to the internet or other WAN.

Figure 8:
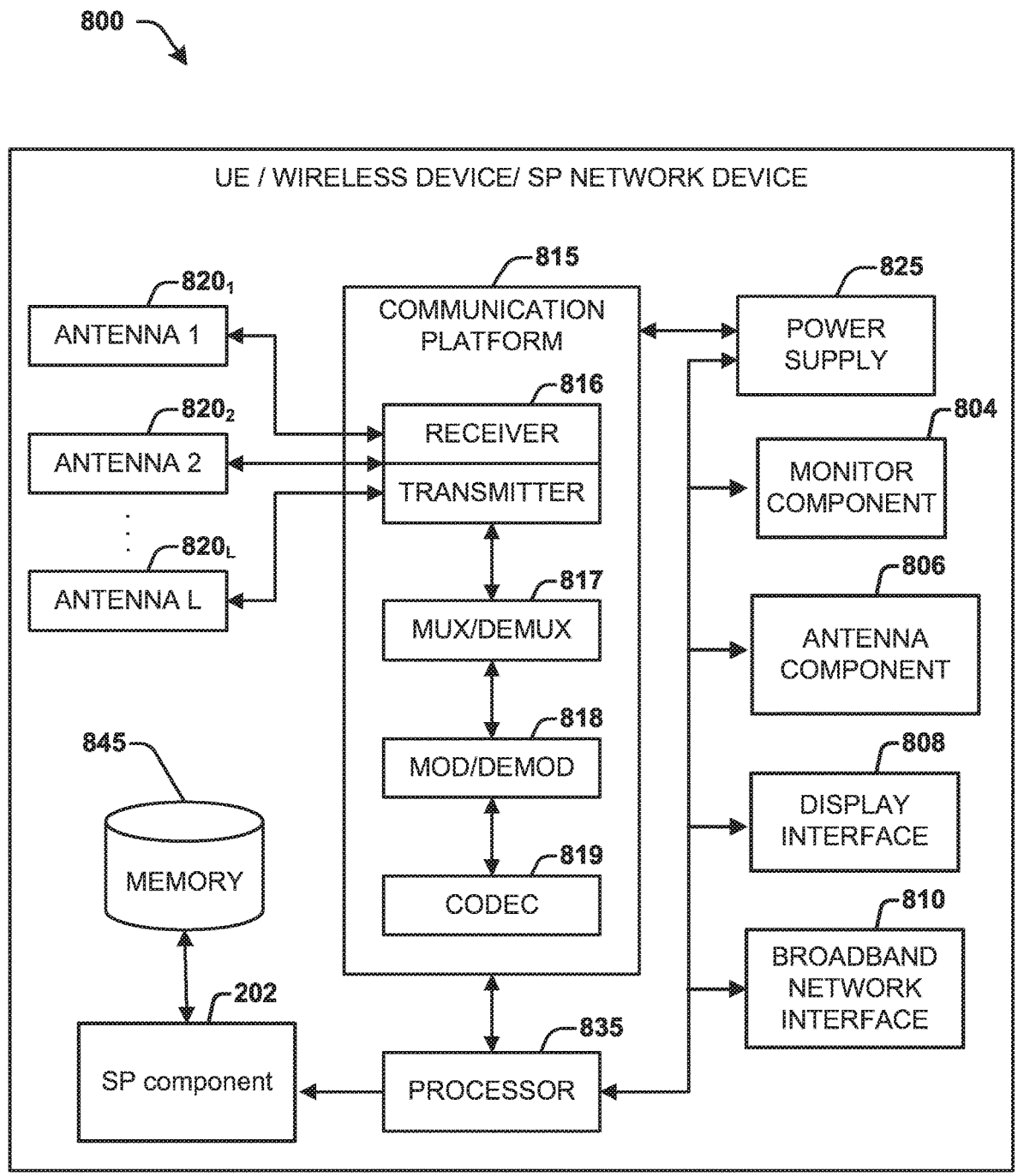
FIG. 8 is an example network device, either as a UE or SP network device in accordance with aspects or embodiments herein.

In order to provide further context for various aspects of the disclosed subject matter, FIG. 8 illustrates a non-limiting example of a UE device, such as a laptop, tablet, or other communication device or wireless terminal 800 that can implement some or all of the aspects described herein. In an aspect, wireless terminal, such as a laptop, tablet, other communication device, or wireless terminal, network device or SP network device 800 of an SP network can receive and transmit signal(s) to and/or from wireless devices such as APs, access terminals, wireless ports and routers, or the like, through a set of L antennas $820_{1-L}$, which can be configured according to one or more embodiments or aspects described herein. In one example, antennas 820 can be implemented as part of a communication platform 815, which in turn can comprise electronic components and associated circuitry and/or other means that provide for processing and manipulation of received signal(s) and signal(s) to be transmitted. The antennas 820 can comprise the various antenna elements incorporating the different aspects or embodiments disclosed herein.

In an aspect, communication platform 815 can include a monitor component 804 and antenna component 806, which can couple to communication platform 815 and include electronic components with associated circuitry that provide for processing and manipulation of received signal(s) and other signal(s) to be transmitted. The communication platform 815 can further comprise a receiver/transmitter or transceiver 816, which can transmit and receive signals and/or perform one or more processing operations on such signals (e.g., conversion from analog to digital upon reception, conversion from digital to analog upon transmission, etc.). In addition, transceiver 816 can divide a single data stream into multiple, parallel data streams, or perform the reciprocal operation.

Additionally, the communication device 800 can include display interface 808, which can display functions that control functionality of the device 800, or reveal operation conditions thereof. In addition, display interface 808 can include a screen to convey information to an end user. In an aspect, display interface 808 can be a liquid crystal display, a plasma panel, a monolithic thin-film based electro chromic display, and so on. Moreover, display interface 808 can include a component (e.g., speaker) that facilitates communication of aural indicia, which can also be employed in connection with messages that convey operational instructions to an end user. Display interface 808 can also facilitate data entry (e.g., through a linked keypad or through touch gestures), which can cause access equipment and/or software 800 to receive external commands (e.g., restart operation).

Broadband network interface 810 facilitates connection of access equipment and/or software 800 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 810 can be internal or external to access equipment and/or software 800, and can utilize display interface 808 for end-user interaction and status information delivery.

Processor 835 can be functionally connected to communication platform 808 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 835 can be functionally connected, through data, system, or an address bus, to display interface 808 and broadband network interface 810, to confer, at least in part, functionality to each of such components.

In another example, a multiplexer/demultiplexer (mux/demux) unit 817 can be coupled to transceiver 816. Mux/demux unit 817 can, for example, facilitate manipulation of signal in time and frequency space. Additionally or alternatively, mux/demux unit 817 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 817 can scramble and spread information according to substantially any code generally known in the art, such as Hadamard-Walsh codes, Baker codes, Kasami codes, polyphase codes, and so on.

In a further example, a modulator/demodulator (mod/demod) unit 818 implemented within communication platform 815 can modulate information according to multiple modulation techniques, such as frequency modulation, amplitude modulation (e.g., L-ary quadrature amplitude modulation (L-QAM), etc.), phase-shift keying (PSK), and the like. Further, communication platform 815 can also include a coder/decoder (codec) module 819 that facilitates decoding received signal(s) and/or coding signal(s) to convey.

According to another aspect, wireless terminal 800 can include a processor 835 configured to confer functionality, at least in part, to substantially any electronic component utilized by wireless terminal 800. As further shown in system 800, a power supply 825 can attach to a power grid and include one or more transformers to achieve a power level at which various components and/or circuitry associated with wireless terminal 800 can operate. In one example, power supply 825 can include a rechargeable power mechanism to facilitate continued operation of wireless terminal 800 in the event that wireless terminal 800 is disconnected from the power grid, the power grid is not operating, etc.

In a further aspect, processor 835 can be functionally connected to communication platform 815 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 835 can be functionally connected, via a data or system bus (e.g., a wireless PCIE or the like), to any other components or circuitry not shown in system 800 to at least partially confer functionality to each of such components, such as by the antenna systems disclosed herein.

As additionally illustrated, a memory 845 can be used by wireless terminal 800 to store data structures, code instructions and program modules, system or device information, code sequences for scrambling, spreading and pilot transmission, location intelligence storage, determined delay offset(s), over-the-air propagation models, and so on. Processor 835 can be coupled to the memory 845 in order to store and retrieve information necessary to operate and/or confer functionality to communication platform 815 and/or any other components of wireless terminal 800.

Further, the antenna systems described above with the communication device 800 can also be configured, for example, to operate at a wide range of frequencies in a high band frequency range additionally include peer-to-peer (e.g., mobile-to-mobile) ad hoc network systems often using unpaired unlicensed spectrums, 802.xx wireless LAN, BLUETOOTH and any other short- or long-range, wireless frequency ranges and communication techniques. The narrow band antenna elements disclosed herein, such as antennas resonating systems of devices disclosed, for example, can also be configured to operate at other frequency ranges also.

In other examples, the components (of SP device 202 or an affiliated component) disclosed herein can operate to communicate wirelessly with other components, such as the display interface 808 as a wireless device, or with other wireless interfaces, such as a wireless USB device, for example. For example, a wireless USB device can communicate within a frequency range. In addition, the antenna systems disclosed can be configured to communicate with other wireless connections, components, interfaces or devices in order to provide communication interfacing for wireless component-to-component communications. For example, a PCB to PCB interface can be facilitated by the high band antenna systems as well as micro millimeter wave communications among one or more internal or external components. Other communication interfaces can also be facilitated by the antenna elements disclosed such as an internet of things (IoT) to IoT components, wearable components, mobile to mobile, a network base station (e.g., a macro cell network device, femto cell device, pico cell device or other network devices) or any combination thereof to communicate via one of more of the antenna elements, such as via the antenna system or devices herein, for example. Additional other examples are also envisioned by which the antenna systems disclosed herein can operate in different frequency ranges, as well as communication and facilitate communications with, or among, one or more wireless components or devices. For example, industrial, scientific and medical (ISM) radio bands, radar band widths, or other ranges of a frequency spectrum can also be facilitated for communications by the antenna systems being disclosed.

Figure 9:
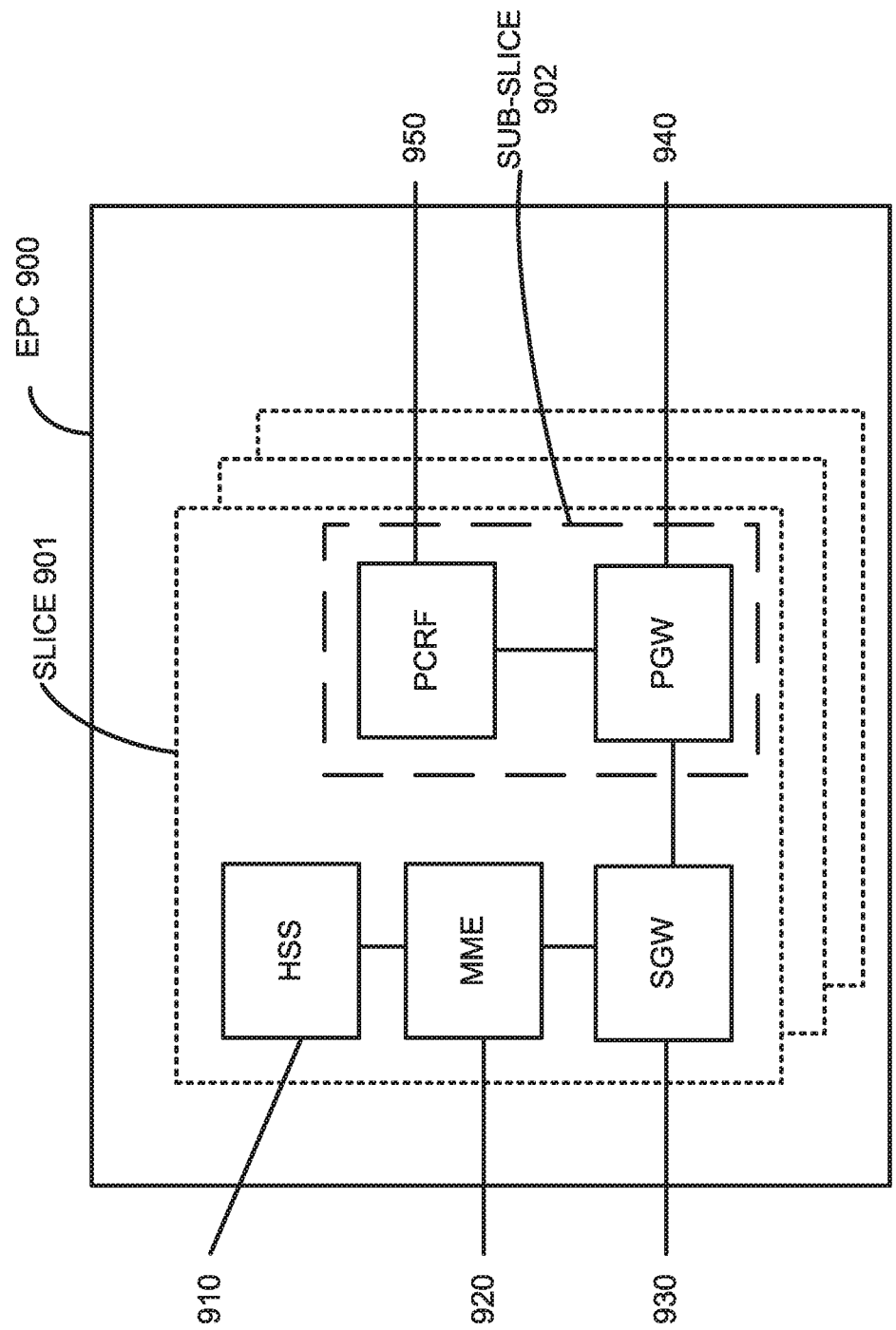
FIG. 9 is a diagram illustrating components of a network in accordance with one or more aspects or embodiments described herein.

Embodiments described herein can be implemented into a system using any suitably configured hardware and/or software. FIG. 9 illustrates components of a network in accordance with some embodiments. In various aspects, part(s) or all of one or more of the components illustrated in connection with the figures herein can be implemented as virtual network functions (VNFs) in connection with various aspects described herein. An Evolved Packet Core (EPC) network 900 is shown to include a Home Subscriber Server (HSS) 910, a Mobility Management Entity (MME) 920, a Serving GateWay (SGW) 930, a Packet Data Network (PDN) GateWay (PGW) 940, a Policy and Charging Rules Function (PCRF) 950.

The HSS 910 comprises one or more databases for network users, including subscription-related information to support the network entities' handling of communication sessions. For example, the HSS 910 may provide support for routing/roaming, authentication, authorization, naming/addressing resolution, location dependencies, etc. The EPC network 900 may comprise one or several HSSs 910, depending on the number of mobile subscribers, on the capacity of the equipment, on the organization of the network, etc.

The MME 920 is similar in function to the control plane of legacy Serving General packet radio service (GPRS) Support Nodes (SGSN). The MMEs 920 manage mobility aspects in access such as gateway selection and tracking area list management. The EPC network 900 may comprise one or several MMEs 920

The SGW 930 terminates the interface toward an Evolved UMTS (Universal Mobile Telecommunications System) Terrestrial Radio Access Network (E-UTRAN), and routes data packets between the E-UTRAN and the EPC network 900. In addition, the SGW 930 may be a local mobility anchor point for inter-eNodeB handovers and also may provide an anchor for inter-3GPP mobility. Other responsibilities may include lawful intercept, charging, and some policy enforcement.

The PGW 940 terminates an SGi interface toward the PDN. The PGW 940 routes data packets between the EPC network 900 and external networks, and may be a node for policy enforcement and charging data collection. The PCRF 950 is the policy and charging control element of the EPC network 900. In a non-roaming scenario, there may be a single PCRF in the Home Public Land Mobile Network (HPLMN) associated with a User Equipment's (UE) Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 950 may be communicatively coupled to an application server (alternatively referred to as application function (AF)). Generally, the application server is an element offering applications that use Internet Protocol (IP) bearer resources with the core network (e.g., UMTS Packet Services (PS) domain, Long Term Evolution (LTE) PS data services, etc.). The application server may signal the PCRF 950 to indicate a new service flow and selecting the appropriate Quality of Service (QoS) and charging parameters. The PCRF 950 may provision this rule into a Policy and Charging Enforcement Function (PCEF) (not shown) with the appropriate traffic flow template (TFT) and QoS class of identifier (QCI), which commences the QoS and charging as specified by the application server.

The components of the EPC 900 may be implemented in one physical node or separate physical nodes. In some embodiments, Network Functions Virtualization (NFV) is utilized to virtualize any or all of the above described network node functions via executable instructions stored in one or more computer readable storage mediums (described in further detail below). A logical instantiation of the EPC network 900 may be referred to as a network slice 901. A logical instantiation of a portion of the EPC network 900 may be referred to as a network sub-slice 902 (e.g., the network sub-slice 902 is shown to include the PGW 940 and the PCRF 950).

Figure 10:
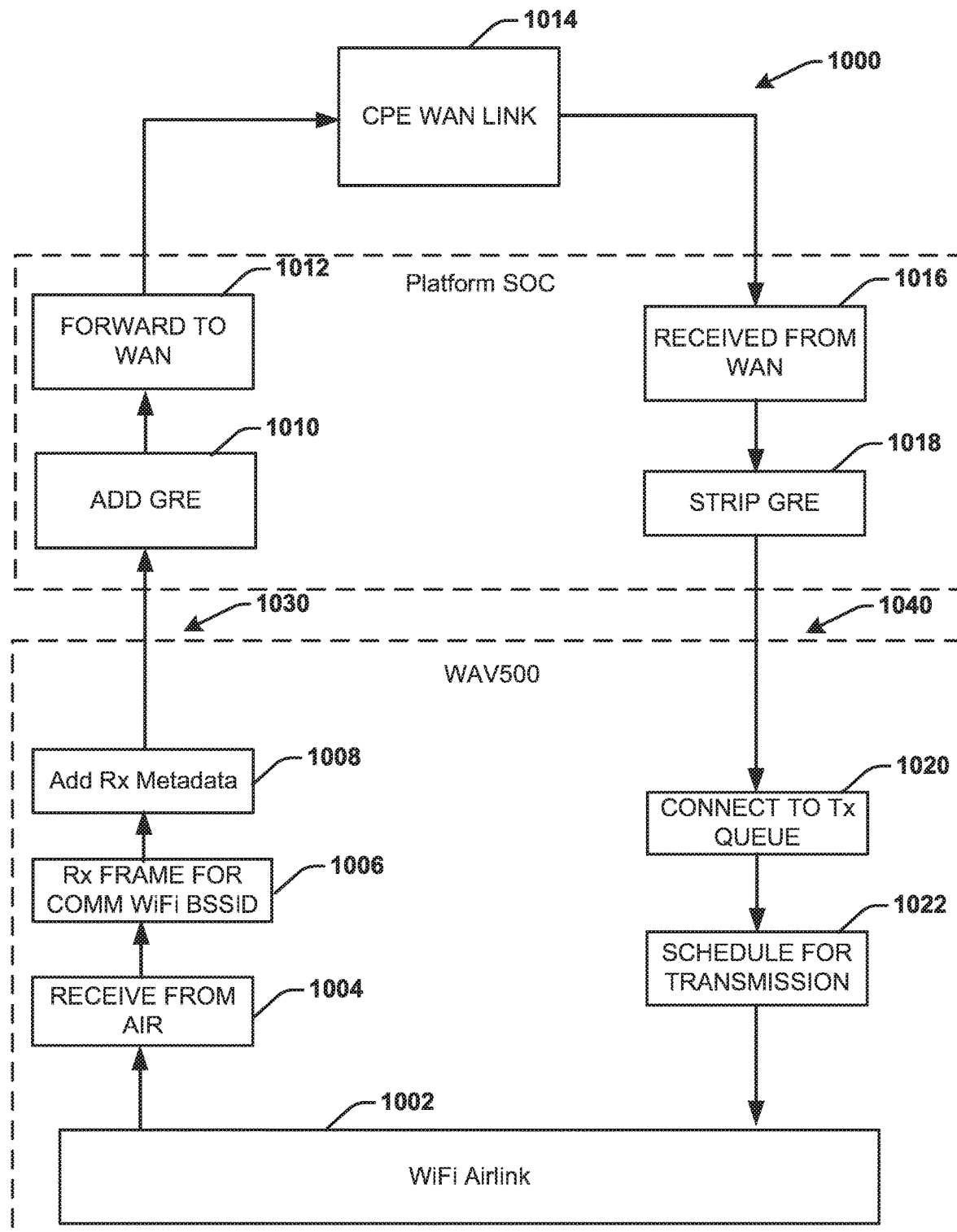
FIG. 10 illustrates an example data flow from a CPE perspective in accordance with one or more aspects or embodiments described herein.

Referring to FIG. 10, illustrates is an example data flow for protocols details of data flows for a CPE or residential home GW in accordance with the aspects or embodiments described herein. The process flow 100 illustrates the data exchanges occurring for a partitioning of the VNFs from a pAP 302 in the CPE to the vAP 340 at the SP provider network 280. When the data flow occurs via communications of the WPA2 pass-through interface 270, for example, a dynamic partition can be enabled. When this dynamic partition is performed, partition configuration two can be one options as discussed herein, which can be enabled when the link 290 is a cable link, or considered as option 2. The partitioning here, what functions will be removed from the pAP 302 of the CPE 240 and what will be executed/done in the pAP 302 at the CPE 240 or AP or Gateway can be illustrated by the acts of FIG. 10 between a WAV 500 or WiFi chip component and a platform system on a chip (SOC), in which each can be a part of or integrated with the CPE 240 as a wireless routing or network device, or residential home GW, for example. The WAV 500 component can individually or separately also be a part of or comprise a range extender coupled to the pAP 302 for wireless communication with a UE, mobile device or other network device.

In one example, the left portion/path can be considered a receive path 1030. Packets can be received via the receive path at the pAP 302 of the CPE 240 over an air interface or WiFi airlink 1002 in order to process data for the community WiFi network from a UE, for example, or other network wireless device. Packets can be generically referred to as data packets or packet data, while also data packets and be different from management packets, and the term packets or data packets can refer to both or data packets specifically, for example. In general, management packets can comprise a request for association or authentication, while data packets can refer to packets already configured for association or authentication after such protocols have succeeded between the SP network 280 and CPE 240, for example, or corresponding components.

The pAP 302 of the CPE 240 can include one or more components including the WAV 500 WiFi processor chip, for example, and the Platform SoC of the CPE. These can be separate components or division with separate interfaces within or a part of the CPE 240 overall or the pAP 302. In response to receiving a packet (or mobile/UE packet) at 1004 along the receive path 1030, a check can be performed at 1006 (e.g., by the pAP 240) as to whether or not the packet belongs to the community WiFi network, which is configured as a virtual network.

The check at 1006 can be performed by the WAV 500 according to or based on the BSS ID of the packets such as a corresponding BSS ID in a receive frame for the community WiFi BSS ID. If the packets belong to the BSS according to the BSS ID, then a determination or check can be made for the class (e.g., a CLASS 1-3) of the packet. However, if the packet does not belong to the BSS as the community WiFi network, then the partition configuration is not virtualized and the residential GW or CPE 240 would process the packet accordingly without a WPA2 pass-through interface 270 to the SP network 280.

With respect to checking for the class, (e.g., Class 1-3), this is the wireless LAN specific functionality that as defined in the Wireless LAN 802.11 spec. Three different specific types of the packets can be enabled or specified to be in a specific state, called class 1, 2 and 3. If in the state, when the client is not associated to the network, then you can buff-in only packets that are management packets, called Class 1. Management packets can be similar to or considered packets making an initial request for an association with the network. Class 2 can be considered an intermediate class, and class 3 is if the packet is associated with the network then you can buff in all of the date packets, especially data packets and management packets as different packet types (unlike class 2).

After checking whether the packets received over the airlink (or air interface) belong to the community WiFi network or not, and if belonging, forwarding the packets along the receive path 1030, a received metadata can be added to the packet. The received metadata, for example, can be any additional information that is not originally within or a part of the packet, but that would have/could have been collected when the packet was received. This received metadata or metadata can include, for example, the received signal strength (e.g., a received signal strength indication (RSSI)), the signal-to-noise ratio or other signal power strength indication or parameter that was also received/able to be determined with receiving the packet over the air 1002, and a physical header (e.g., 802.1x PHY layer header or other similar packet header) associated with it. Typically, the physical header with all the associated information has been dropped because there may not be a need for it in further processing, aside from only utilizing it to receive the frame at the lowest possible level (e.g., as Class 1). However, this physical header could be available for the VNF by the SP network 280 if retained, as in the act at 1008. The metadata can be information that the SP 280, for example, could use to manage a radio resource parameter (e.g., a latency, power or signal strength, or other similar communication signal/link parameter) such as a radio parameter of the SP network, the community WiFi network or communication link there-between.

In an aspect, packet data or packets can be received and further transferred for processing without alteration to the encryption or decryption of the packets by the CPE 240. The packets can be passed along (via the WPA2 pass-through interface 270) in the same form as received, as well as with some added or additional metadata information, for example.

The packet can be moved to the next stage (e.g., at a platform SoC or SoC platform) for processing whereby at 1010 a genetic routing encapsulation (GRE) header can also be added. This GRE header, for example, can be an IP header that contains the information of what is the destination, in which the destination can be the virtual network function (VNF) in the SP network 280, such as at the vAP 340.

Additionally, the packet(s) can be forwarded at 1012 to the wide area network (WAN) interface or CPE WAN link 1014 (e.g., cable/digital subscriber line (DSL)/passive optical network (PON) 290), which can be at least in part in a router of the CPE. This CPE WAN link 1014, for example, can be the network interface that connects to the SP network 280 (e.g., a cable provider network or the like). As such, the CPE 240, for example, can operate by receiving packets from the wireless interface 1002, adding to them and passing them along to the WAN 1014 to go to the SP network 280 without a modification involving an encryption or decryption by the CPE 240.

Continuing along the right side of FIG. 10, a transmit path 1040 is configured for the continued data flow, which can be a management and control path for management and control operations, while the receive path 1030 a data path. Along the transmit path 1040, a packet from the WAN at 1016 is received, which could contain SP provider data or other internet provider (IP) data to be rendered at a screen of the UE or by a browser. The received packet can be from the SP network or the CPE 1 link 1014, for example over the cable modem link, and then processed at additional steps. Once the packet is received from the cable modem, for example, the packets can be identified as belonging to the network (community WiFi network) that has been virtualized at the vAP 340.

For example, at 1018 a GRE can be stripped from the received packet, as the packet can come from the VNF (e.g., vAP 340) as an IP packet. The packet can then be passed along the transmit path 1040 without the GRE header to the WiFi access point chip (e.g., WAV 500 or the like component). The WiFi AP chip then operates to transmit the packet at 1022 further along to the air interface 1002. For example, the WiFi AP chip puts the packet without the GRE header in the WiFi transmit queue at 1020 and schedule it for transmission at 1022; as such the CPE does not have to do any further modification to the packet, especially with respect to encryption/decryption. These acts of the data flow 1000 can be what is performed for the community WiFi network with virtualization to happen in the CPE 240 in a router, for example. Typically, if all the functionality is inside the CPE or router, and the operating network is not a virtual network, there would be many more steps for the CPE to implement that are not included here, such as encryption/decryption operations. The received packet would also be transformed from 802.3 to 802.11 format, decrypted and only then connected or associated to the transmit queue, for example.

As such, the WPA2 pass-through 270 can enable/manage an authentication or security protocol with the UE 250 based on a VNF of a pAP 302 associated with the community WiFi network for (e.g., the creation of) a vAP of the SP network 280 of the SP network device/component 202. The vAP 340, thus, can be a creation or instance of a set of functions that have been virtualized from the pAP 302 in relation to a community WiFi network. As described above, the community WiFi network can be a hot spot, or other pass point or network configured to be enabled at the CPE 240 for guest, subscribers of the SP (e.g., Com cast), or the home with a UE 250 that recognizes the community WiFi network based on a BSSID, for example, and initiates connection with it. In return, an authentication/security protocol can be exchanged without interference, tampering, modification or concern of breach by or through the CPE 240 to the vAP 340 at the SP network 280, especially with respect to decryption/encryption via the WPA2 pass-through associated with the community WiFi network.

Further, the SP network component 202 can operate to virtualize authentication and encryption protocols over the WPA2 pass-through to ascertain one or more credentials to be filled in by the UE 250, or client by maintaining/controlling/operating functions that would otherwise be associated with the residential GW/CPE 240 at the SP network 280. The authentication protocols can include, for example, WISPr 1.0, or 802.1x protocol where a specific procedure/protocol with 0.1x can be with/without extensions such as EAP-TTLs, PEAP, EAP-SIM, EAP-AKA, for example, or other extensions. As such, the SP network component 202, for example, can create a virtual network function for a pAP to form an instance of a vAP based on one or more VNFs, depending on the partition configuration (e.g., a second partition configuration for cable).

The WPA2 pass-through 270 from end-to-end ensures security all the way through the CPE to the SP network and ensures that modification, tampering or breach of privacy does not provide opportunity otherwise, in association with a community WiFi network, or to disrupt such communication flow for any possible breach. The WPA2 pass-through 270 can be instantiated or generated by the SP network device 202 when there is a configuration at the CPE 240 where all the traffic for a specific network (e.g., community WiFi network) is passed transparently through the residential GW 240 without the residential GW 240 touching/removing any of the bits on this traffic, and through the cable/DSL/PON access to the SP network 280 at one or more components/devices thereat (e.g. the SP network device 202).

Authentication or security protocol(s) can then be facilitated through the WPA2 pass-through 270 connection/interface. An encryption key is then communicated (shared) between the UE 250 and some function or component in the SP network 280 as part of such protocol. In this situation, all the data traffic from the connecting UE 250 can flow transparently through the home network CPE 240, gets to the SP network 280, and there it is encrypted/decrypted. With this approach utilizing or generating the WPA2 pass-through 270 by the SP network device/component, there is no security at home or at a home CPE, in the middle between the UE and the SP network, where the traffic is not encrypted and someone can hack into this home GW 240 and get an access to it. This is the traffic that does not belong to the home network, it's the traffic of the community WiFi, and thus belongs to the SP, but happens to pass through the home network via the WPA2 pass-through.

Figure 11:
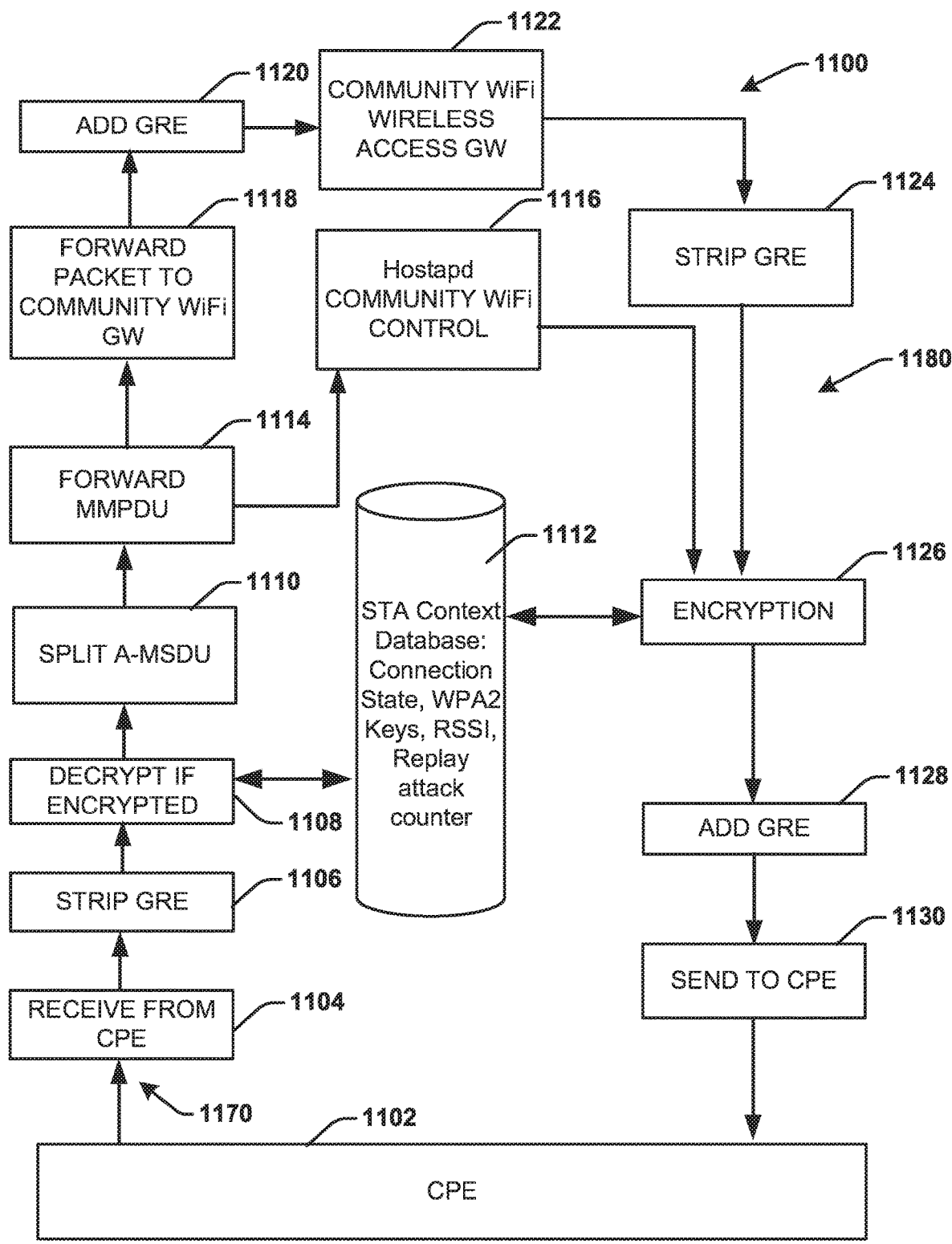
FIG. 11 illustrates an example data flow from a SP network component perspective in accordance with one or more aspects or embodiments described herein.

Referring now to FIG. 11, illustrated is an example data flow between the CPE 1102 (from the CPE WAN link 1014 of FIG. 10) and the community WiFi wireless access GW 1122 (e.g., the SP network device 202, or any component thereof) in accordance with various aspects or embodiments being described. Thus, the happenings or acts operating in the VNF (e.g., vAP 340) of the SP network 280, in the part the functions that have been split out from the pAP 302, and implemented as functions in the SP network or SP network device/component 202 are illustrated along the data flow 1100.

Beginning for reference at 1104, a packet has been received from the receive direction/path 1030 of FIG. 10 over the CPE WAN link 1014 from the CPE 1102 and processed along receive path 1170 to the Hostapd community WiFi control 1116 or the Community Wifi Wireless Access GW 1122 as part of the receive path. At 1106, the GRE header is stripped because the packet has been received at its destination, and thus, to get to the packet body or data payload the GRE header can be stripped. At 1108, a determination can be made whether the packet is encrypted and to decrypt the packet if there is an encryption. In order to decrypt the packet, a stations (STA) context database 1112 (e.g., DB 508), which can include a station connector state, keys for encryption/decryption and other client/UE specific related data (e.g., an RSSI, latency, or other parameters or data) can be accessed.

At 1108, by reference to the STA context database 1112, a determination can be made to decrypt the packet, whether a replay attack is occurring (whether the packet is similar to another or past packet that has been decrypted previously), or if decryption is unsuccessful or not. If a determination is made that a replay attack notification is to be generated, in which the packet is shown to have been decrypted as the same or similar packet one time before, this can mean the client or sending device has not created a replay attack, where the attacker has captured one packet and the attacker is sending it again and again to see how the network behavior will be (called a replay attack). If a replay attack is detected, a replay attack notification can be generated, the packet or encrypted packet is dropped and a replay update counter (not shown) can be updated, which can be included in the STA context database 1112. The counters in the STA context database 1112 can also part of the VNF that handles data flow at the SP network device 202, for example.

At 1110, a determination is made as to whether the packet is an aggregated packet, such as an aggregated MAC service data unit (A-MSDU). An A-MSDU can be the result of multiple MSDU packets aggregated together such as from several packets in a special format called an A-MSDU. Alone an MSDU is the service data unit that is received from the logical link control (LLC) sub-layer, which can lie above the media access control (MAC) sub-layer in a protocol stack, for example. The LLC and MAC sub-layers are collectively referred to as the data link layer (DLL). Some packets received at 1110 could be determined as not aggregated. Aggregation can occur, for example, to reduce the overhead of the transmission and obtain or form a higher layer group or grouping. When packets are received there is usually a gap between them. So to decrease the gap and increase efficiency, many packets can sometimes be lumped together or aggregated in one large packet such as an A-MSDU. If the packets received are aggregated as an A-MSDU, then they can be de-aggregated and split at 1110 into individual packets and moved to the next stage 1114 of the receive path 1170 for further processing.

At 1114, a determination can be made as to whether the packets are management packets or data packets. If the packets after the de-aggregation contain management packets referred to as management MPDU (MMPDU), which are the packets that are used to establish a connection to change any connection parameters, then these MMPDUs are forwarded at 1114 to a Hostapd community WiFi control (e.g., pAP 320, manager 310 or other component of the SP network).

Some packets could be simply data packets, which are packets with information or data in a payload for communicating information once the user or UE has been associated (e.g., with data of class 2 or class 3). Data packets can be considered packets that just hold information, for example, from a web browser or any type of application or software program. If the packet received is an MMPDU, then it can be passed to be un-packaged/processed to the component doing access point management and control at the transmit path 1180 to the control VNF or Hostapd 1116 (e.g., pCPE control 320) for BSS management, for example. As a management packet, the hostapd 1116 can be a component operating BSS management by recognizing that the packet represents a new client (unassociated UE or network device) that wants to connect by asking for a station request with a MMPDU packet. The hostapd component 1116 can send a station response, and it will be processed along the transmit path 1180 as a management and control path through the CPE 240 over air to the client. So the client can then start establishing a connection.

However, if the packet comprises a data packet (e.g., a video or Netflix that includes like Netflix data), this packet can go all the way up to a data VNF or community Wifi Wireless Access GW 1122 (e.g., vAP or other SP network component) where it will detect the data packet and be transmitted from here to the internet, for example. If the packet is not an MMPDU packet, but a data packet, then it becomes converted at 1118 from 802.11 format to the 802.3 format, which are formats of the IEEE standard. Then, at 1118 the packet will be forwarded it to the community WiFi GW 112, further forwarding to the internet. Before being forwarded completely, at 1120 a GRE header of the community WiFi GW can be added, and it will be sent out from there as an IP packet so eventually it will get to the community WiFi GW 1122.

In the transmit direction 1180, a packet can be received from the community WiFi GW 1222. At 1124, the GRE header is stripped, then the packet is encrypted at 1126 using this station context database and using the WPA2 keys to encrypt it. The GRE header is then added at 1128 for the CPE 1102 or for the residential home router, the home GW. The packet is transmitted to the CPE 1102 (e.g., CPE 240 of FIG. 2) as an IP packet to the UE via the CPE. So this packet will be sent for encryption, then the GRE will be added and they will be sent to the CPE as well. As such, packets designated as or related to data packets will come from the community WiFi GW 1122 and the management packets will be generated by the Hostapd 1116 as the community WiFi control.

Figure 12:
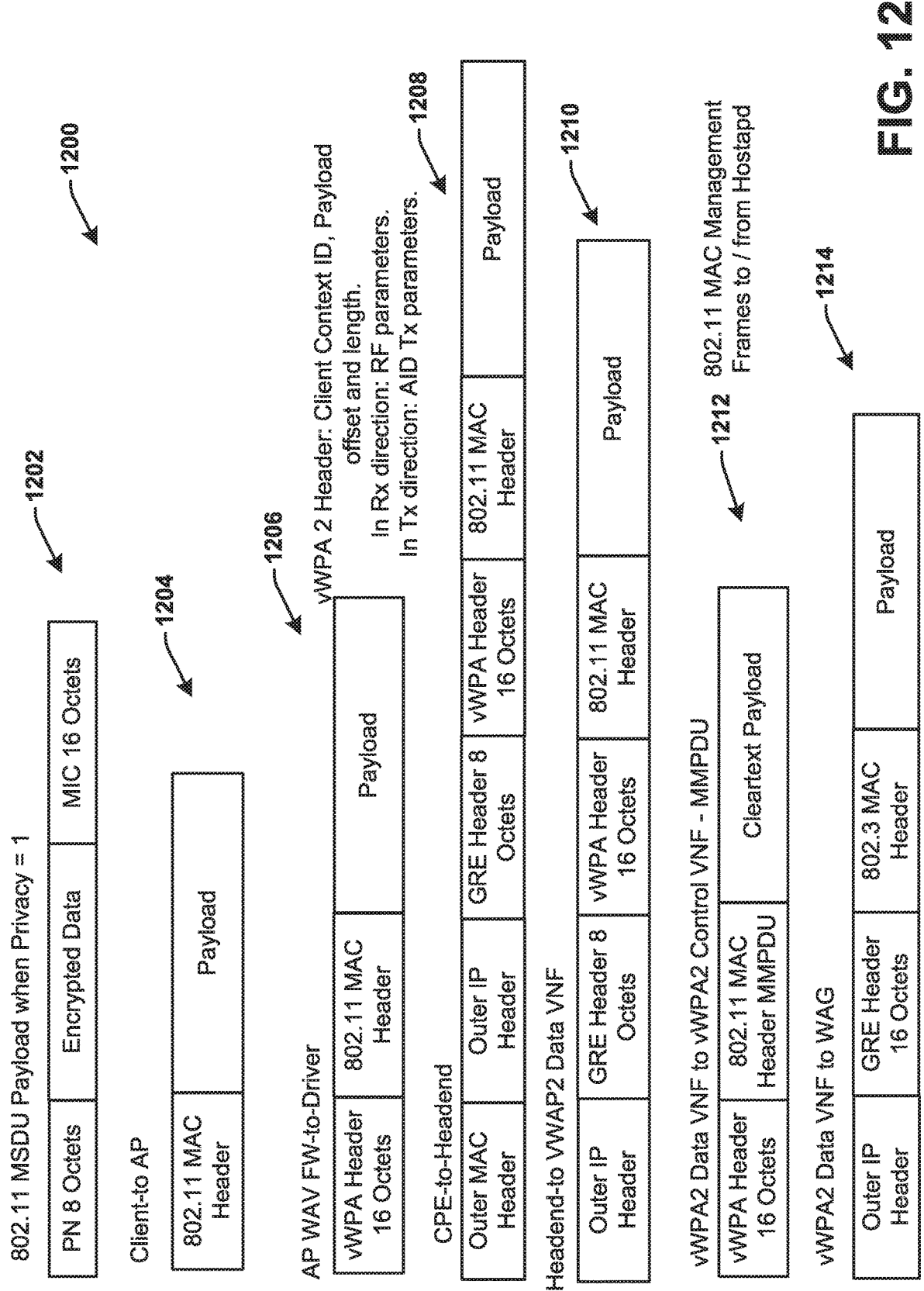
FIG. 12 illustrates packets structures in accordance with one or more aspects or embodiments described herein.

Referring to FIG. 12, illustrated is an example of different packet structures along various stages of the processing paths described with respect to FIGS. 10-11. The first packet structure 1202 is the payload of the 802.11 MSDU (see above for discussion of aggregated MSDU with a privacy class of 1) as an 802.11 packet payload comprising three fields. The three fields of packet 1202 include an encrypted data in the middle, a packet number (PN) or seed used for seed in encryption and decryption (e.g., about 8 octets), and the message integrity code (MIC) at the end that authenticates that this is encrypted data that has been encrypted by the sender or identifying the sender. This packet is then transmitted over the air from the client/UE to the AP (e.g., the pAP 302) transmitted in the format of packet structure 1204. This packet structure 1204 has the payload and an 802.11 MAC header is appended to this payload. So when a packet in this format will be received over the air, it can be in this format.

Then a station (STA) context can be added (e.g., info to the right of the transmission data packet 1206), which can be detailed in the format of a vWPA header and can be 16 octets long. The STA context, for example, can contain a client context identity (ID), a payload offset and a length, as well as one or more RF parameters (e.g., the metadata added at 1008 of FIG. 10) or an association identity (AID) with one or more transmit parameters for transmission of the packets. The association ID identifies the client, UE or other network device along with other transmit parameters in the STA context 1112. As such, the packet 1206 can become of this format: vWPA header, 802.11 MAC header and the payload.

Further, when the packet is moved from WiFi AP chip to the platform SOC as in FIG. 10 and a GRE header is added to it to form part of the packet structure 1208, as at 1010 along with an outer IP header and outer MAC header and the previous stage with the WPA header, 802.11 MAC header and payload. This packet structure 1208 is the format (the long one) when the packet is coming to the first GW/first server in the SP network (e.g., the pCPE control 320 or the vAP 340) of VNF data processing at 1104 along the data/reception path 1170.

As the packet received along path 1170 is processed to move the packets to this WPA2 data VNF at 1106 there can be outer MAC address that can be stripped and the rest of the packet can be retained, as demonstrated by the packet structure 1210. The MAC address that is stripped (outer MAC header) at 1106 is stripped because it communicates with the IP addresses that are not needed anymore, what is left is sent to the data VNF (e.g., vAP 340, data path 526, or set of VNFs 504 of a partition configuration).

After stripping the GRE, the packet is decrypted at 1106 and a different GRE header is added and the packet is sent to the community WiFi access GW at 1120, which can be demonstrated for example by the packet structure 1214, which is the last packet structure at the output of the receive path 1170 processing to the community WiFi GW. This packet structure 1214 can have an outer header (outer GRE header), a different GRE header than the last one that was stripped. The first GRE header is to get to the data VNF for processing, while this different GRE header here is to get to the wireless access GW. Then packet can be in a 802.3 format, after decryption as the result of a transformation from MAC 802.11 to 802.3. If the payload cannot be encrypted it can be dropped, here the payload can be encrypted and so it goes up the decryption process.

The packet structure 1212 is an example of the management packet (MMPDU). This packet structure 1212 is the format of the packet that can go forward of the MMPDU at 1114 to the hostapd community WiFi control 1116, which can be after decryption and be a clear text payload, with a 802.11 MAC header as MMPDU as management packet and can also have the STA context, which can be utilized here in the control function.

FIGS. 13-18 illustrates embodiments related to the control flow operations and provisioning of data for the data flow operations describe above in FIGS. 10-11. Generally, this is the information that is acquired in the vCPE or vAP 340 in the VNF and as well in the pCPE or pAP 302 in the GW/CPE 240). In the vCPE 340, for example, it has to be provisioned with the information that will enable it to configure the community WiFi vAP parameters, which will then be used by the WiFi AP. The key parameters, as described elsewhere herein, can include the BSS parameters that essentially are then used in the WiFi protocol, such as the 802.11 protocol. The AP uses also to communicate with clients, Radius Server IP and wireless access GW name and the IP address. This information is used to register the IP. These two parameters are also required for various operations such as the control VNF and data VNF. The control VNF (or hostapd 1116 or pCPE control 320) has to receive the IP address of this server to be able to communicate with it. The community WiFi GW IP address and the IP address is also utilized by the data VNF (e.g., the vAP 340) to create this processing of the data VNF when it handles the packet that it receives from the pCPE 302 to process it and forward it to the community WiFi gateway or SP network 280.

The pCPE 302, in particular, has to create a secure connection with the VNF or VNFs of the SP network 280, for which the protocol is transferred. It has to have a credential for this secured connection, like a public security key (PSK) or public security certificate. Because the GW already has the credential(s) to be able to communicate with the SP network, the pCPE in the GW can reuse this credential to not have to configure a new credential for the communications. Another parameter that can be utilized in the process flows of the pCPE 302 is the service set identifier or SSID or the name of the community WiFi that will be displayed in beacons that the WiFi AP (CPE 240) transmits so the client/UE can identify this as a community WiFi BSS and connect to it. Every SP uses its own name. Another parameter that can be utilized is the domain name, the server name of the data VNF. So the UE or network device (e.g., 250) is able to reach to it, obtain an IP address of it and establish the GRE protocol, the communication from the pCPE 302 to the data VNF or vAP 340.

In case a range extender (e.g., range extender as peripheral device 104) is utilized these parameters and provisioning for process flows can also be used to enable communication between the range extender and the VNF to configure the credentials via the secure link with the control VNF or pCPE control 320 because it is different from the GW or CPE 240 as illustrated in FIG. 5. The GW 240 receives these credentials when it is being initialized. However, a range extender 104, for example, though typically does not receive these credentials, so the range extender has to be configured with the credentials that enable it to establish this secure link or the WPA2 pass-through interface 270. Essentially the credentials are certificates of the control VNF 320 and it has to be configured with the same parameters like the pCPE 302 to enable a communication over WiFi. The service provider, the SSID, the network name, and the data VNF, the data VNF domain name can all be provisioned in various process control flows described.

Figure 13:
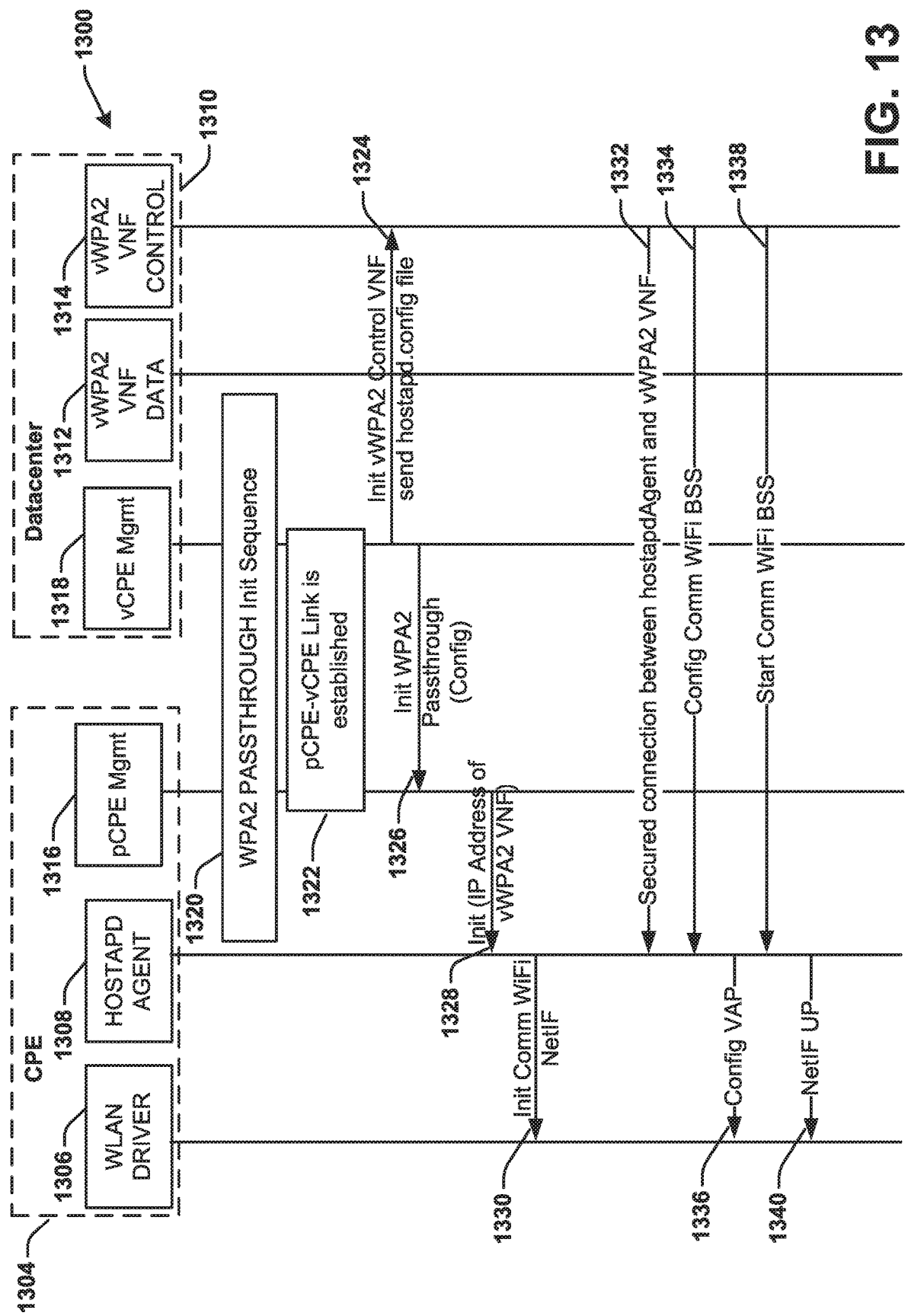
FIG. 13 illustrates a control flow for an initiation sequence or association between the CPE and SP provider network in accordance with one or more aspects or embodiments described herein.

Referring to FIG. 13, illustrated is an example provisions control flow of parameters and data for data flows of WPA2 pass-through communications of a partition configuration of VNFs in accord with various aspects or embodiments described. In the management part of the init or initialization process, this is the procedure of how to initialize or orchestrate the communication between the data VNF (e.g., the vAP 340 with DB 508 according to a partition configuration 504), the control VNF and the pCPE/range extender. Initially, the pCPE 302 establishes the communication with the vCPE or vAP 340 for all the communications between SP network device 202 and the GW/CPE 240 at 1320. When this communication is established then the orchestrator 330 of the vCPE management 1318 to initialize the control VNF and the data VNF.

Terminology used herein has various synonyms and for purposes or our description, the control flow is illustrated with reference to particular components of the CPE 1304, which can include pAP 302, as well as pCPE control 320 on the SP network side and can correspond to the WLAN driver 1306, the hostapd agent 1308, and the pCPE management 1316 (as part of the CPE). The data center 1310 can include any data bases such as DB 508 or AAA 506, vCPE management (e.g., manager 310), vWPA2 VNF data 1312 (e.g., vAP 340, and the orchestrator 330), and vWPA2 VNF control 1314 (e.g., also part of the pCPE control 320, the Hostapd community WiFi control 1116, or a control VNF).

The orchestrator 330, for example, initializes the control VNF 1314 at 1324 and then uses the initial procedure towards the pCPE 1316 to initialize the vAP 340 for community WiFi. So it sends the configuration file to the pCPE 1316 at 1326. The pCPE 1316 then uses this data to configure or prepare for the work of different components in the CPE 1304. For example, the pCPE 1316 initializes the hostapd agent 1308 that is the data secure member at 1328. This hostapd agent 1308 is the agent used for the communication protocol between the pCPE 1318 and the control VNF 1314. The pCPE 1318 initializes the hostapd agent 1308, which initializes wireless LAN driver 1306 for supporting communication operations at 1330. Afterwards, the secured connection between the hostapd agent 1308 and the control VNF 1314 can be established as at 1332, and then the protocol flow is enabled for the control flow 1300.

As part of this protocol flow 1300, there is an initial configuration of the BSS parameters at 1334. So the control VNF 1314 configures the BSS parameters to the hostapd agent 1308, which then configures the AP driver 1306 with this SSID, for example, or one of these parameters described herein at 1336. Afterwards, the control VNF 1314 can start communication at 1338. After this point then, the pCPE functionality for the community WiFi as well as the VNF are configured and ready for work at 1340 as the final stage of the init sequence.

Figure 14:
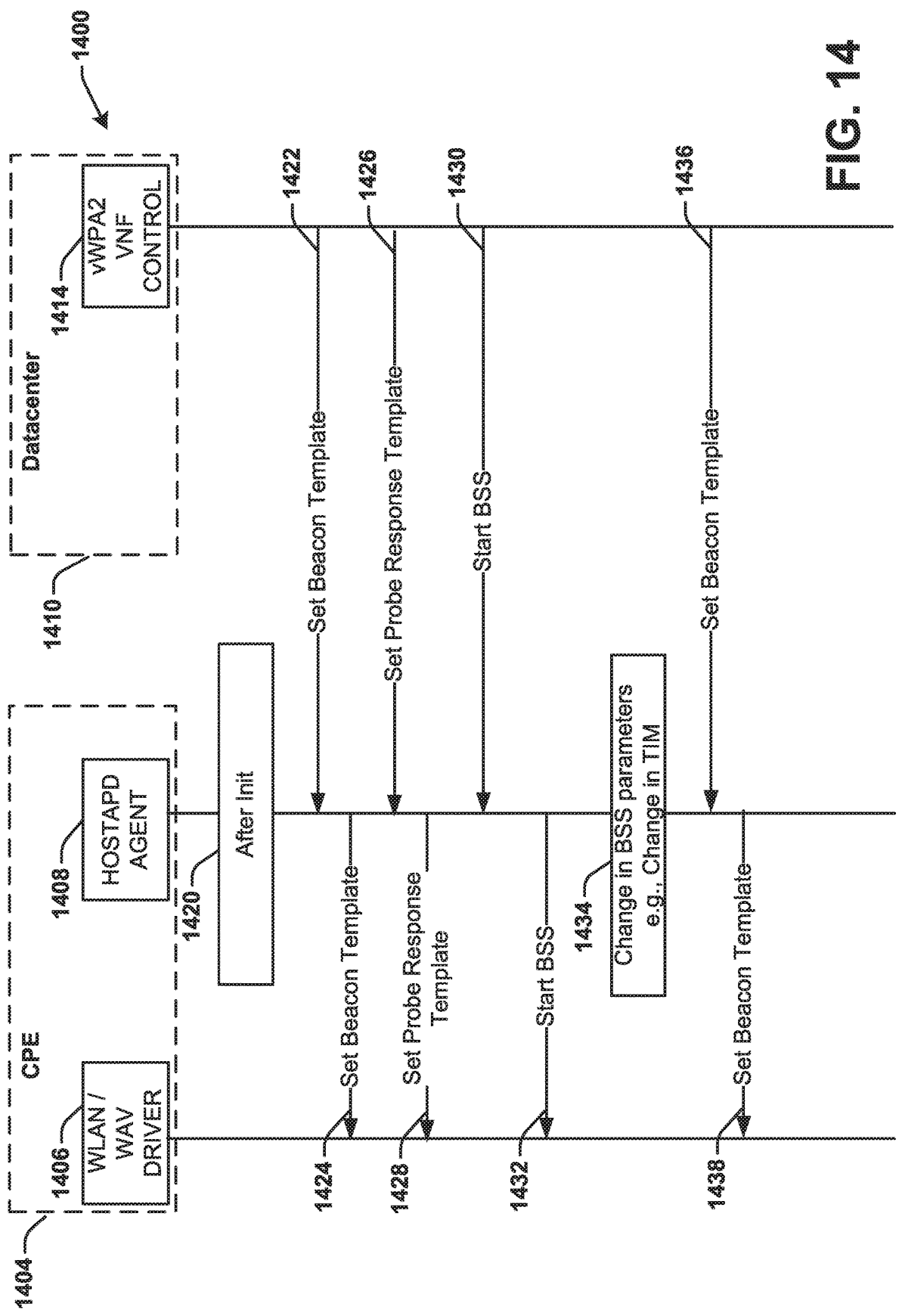
FIG. 14 illustrates a control flow for provisioning one or more parameters between the CPE and SP provider network in accordance with one or more aspects or embodiments described herein.

Referring not to FIG. 14, illustrates an example of the BSS parameter configuration control flow, which provides further details on the control plane and how parameters are changed after the init 1420 processes of FIG. 13. As such, the control VNF 1414 of the data center 1410 sends or sets a beacon template 1422 using this communication protocol, or this secure link to the hostapd agent, which then will configure the beacon templates to the wireless LAN AP driver at 1424. The beacon template can be used to create the beacons that then the wireless AP starts transmitting over the air so clients will be able to identify it and initiate a connection procedure for the community WiFi network, for example.

Additionally, at 1426 another information has to be configured considered as a probe response template, which is also configured through the hostapd agent 1408 of the CPE 1404 to the AP driver 1406 (e.g., waveform audio file format or WAV driver) at 1428. The probe responses are used when the client/UE sends an inquiry called a probe requests to the residential GW/AP/CPE 1404 to obtain more information of the AP capabilities.

Then the control VNF at 1430 sends the command starts BSS, to start the community WiFi BSS to the hostapd agent 1408, which commands the WiFi driver 1406 to start BSS at 1432. Then the BSS has started and client UEs will be able to connect to it. Further, from time to time there could be a change in the BSS parameters at 1434. For example, an indication of a change in the traffic, a change of the buffer traffic for clients that are connected to the access point, as the traffic indication map (TIM). In this case, it has to update the beacon template and send the TIM to the AP, done by the last sequence at 1436 from the VNF control 1414 to the hostapd agent 1408 to the driver 1406 at 1438 finally. This process or control flow 1400 can be how BSS parameters are configured after the INIT processed 1420 from FIG. 13 and during run time operation.

Figure 15:
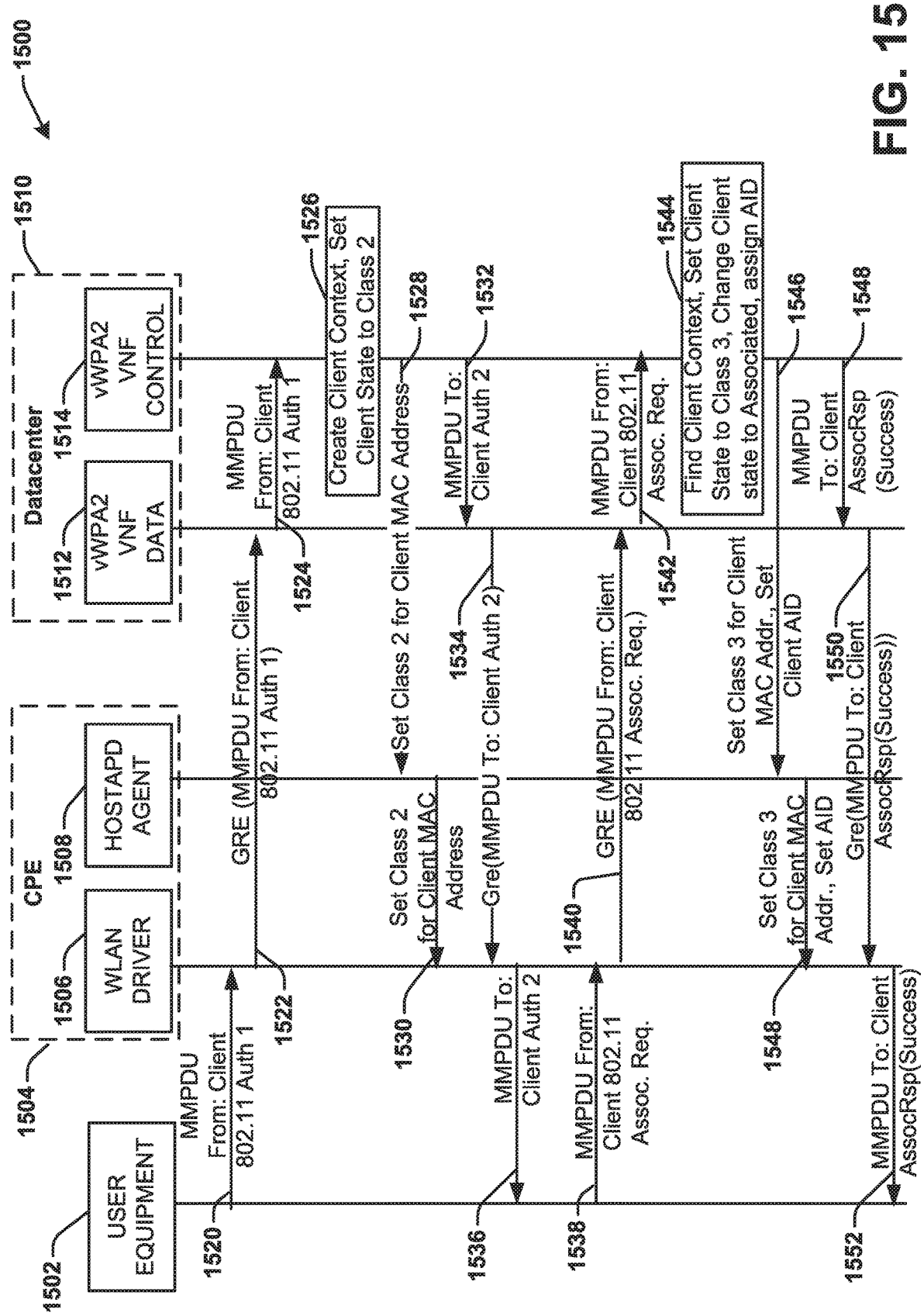
FIG. 15 illustrates a control flow for a client UE connection between the CPE and SP provider network in accordance with one or more aspects or embodiments described herein.

Referring to FIG. 15, illustrated is another example control flow 1500 in accordance with various aspects or embodiments herein. The control flow 1500 demonstrates the operation flow of the client/UE (e.g., 1502) connection establishment, which is a little modification to the standard behavior of the connection establishment that typically happens locally, except when a partition configuration has been virtualized by one or more VNFs. When a client UE 1602 want to connect to the AP, it sends packets at 1520 or starts the process for the authentication, adds to the packet an 802.11 authentication message, or a management MAC protocol data unit (MMPDU).

Once the UE 1502 sends the authentication requests at 1520, the packet is then encapsulated using a GRE tunnel at 1522 by the wireless LAN driver 1506 of CPE 1504, and sends it directly to the data VNF 1512 of the data center 1510. The data VNF 1524 identifies this packet as the management frame (or authentication/association request) and sends it to the control VNF 1514 at 1524. Based on this information, the control VNF creates the client context or STA context, and sends/sets the client state to class 2 at 1526. Class 2 in 802.11 is the state in which the AP is configured to accept a management association, or association messages from clients. Before this act at 1526, the SP network or SP network device/component 202 could just drop any association requests from the clients.

Then in the next act, at 1528 the control VNF 1514 sends the command set Class 2 for client MAC address because it is a new client, to the hostapd agent, which then at 1530 forwards it to the WLAN driver 1506. This WLAN driver 1506 sets it in the data base (e.g., DB 508). Then, the control VNF 1514 at 1532 sets the MMPDU to client authentication 2, which is the authentication response, to be transferred using the protocol of the WiFi AP driver 1506 at 1534, which then forwards it over the air to the client 1502 at 1536. When the client receives, it updates the state machine and continues with association, which is part of 802.11 protocol at 1538. Then the association requests is put with a GRE at 1540 and forwarded to the data VNF 1512, which forwards it to the control VNF 1514 at 1542.

At 1544, the control VNF 1514 updates the client context (STA context of the STA database 1112 of FIG. 11 to Class 3, which means that afterwards that the client access port will accept data packets and not just management packets from the client 1502, and thus both data and management packets can be processed readily. So control VNF 1514 then changes the client state to associated, assigns an association ID (AID) and sends this configuration to the hostapd agent 1508 at 1546, which, in turn, sends this to the WLAN driver 1506 at 1548. Afterwards, at 1548 the control VNF 1514 sends the packet association response with an indication of a success to the data VNF1512, which then at 1550 forwards it over a GRE tunnel to the WiFi driver/AP driver 1506 that forwards/sends this packet to the client 1502 at 1552 for the client to be then considered associated.

Figure 16:
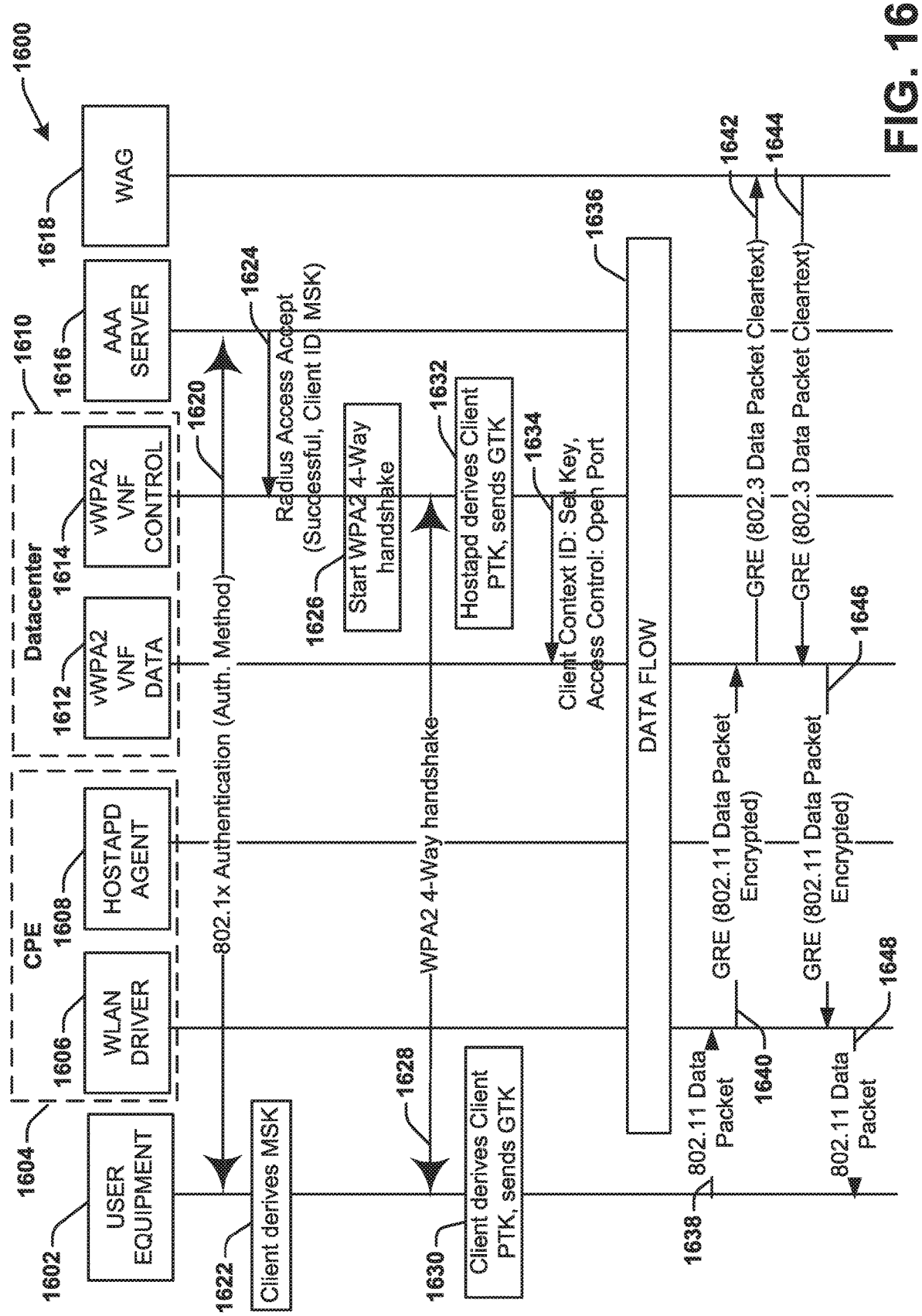
FIG. 16 illustrates a control flow for securing a client UE connection establishment between the CPE and SP provider network in accordance with one or more aspects or embodiments described herein.

Referring to FIG. 16, illustrated is another embodiment of a control flow with operations directed toward securing connection establishment in accordance with various aspects or embodiments herein. After a success association notification from 1552 of FIG. 15, the client 1602 can now can send data packets to the AP (e.g., vAP or SP network device 202) and the data packets communicated will contain 802.1x authentication protocol from the UE 1602 through the CPE 240 with pAP 302 to the SP network device 202 (e.g., to the authentication server 1616, or the AAA 506) via a WPA2 pass-through interface and without modification from decryption/encryption at the CPE 240.

A 802.1x authentication protocol can be sent from the WiFi client 1602 then through all of this chain (1604-1616) to the authentication data server 1616. The authentication server 1616 communicates back to the WiFi client 1602 by updating the client's credentials and sending additional key material so the client 1602 will be enabled to create or derive the master station key (MSK) at 1622. The authentication server 1616, at 1624 derives the master station key as well and configures it to the control VNF 1614. After this there is a stage where the encryption key that will be used for the encryption of the data and management packets will be executed, which is called four-way handshake 1626. Essentially, in the four-way handshake the control VNF 1614 is the one that initiates it and the WiFi client 1602 is the one that co-operates using the communication response protocol known as a Four-way handshake, meaning about or at least four messages are exchanged between WiFi client 1602 and the control VNF 1614 using communications 1628 therebetween.

At 1630 and 1632, both client 1602 and AP or vWPA2 VNF control 1614 derive the encryption key used for WPA2 encryption of unicast frames or unicast packets used, for example, as a client pairwise temporal key/pairwise transient key (PTK), which can also be used for the communication from the AP 1614 to the client 1602 of broadcast messages or broadcast traffic. Broadcast message, for example, can be generated using a different key, a group temporal key (GTK), for example. A GTK can be derived in the VNF control 1614 and transferred to client 1602 using the secured link (e.g., the WPA2 pass-through interface) as part of the WPA2 four-way handshake 1626. The client 1602 accepts it and configures the GTK into the hardware. As such, the control flow 1600 illustrates the transpiring communication response of the client 1602 and control VNF 1614 with respect to key derivation. The key is not visible necessarily to any other component, does not stay in or reside at any point/component along the communication path 1628 in-between, and is responsive or utilized for the communications over the WPA2 pass-through, for example.

Afterwards, the control VNF 1614 configures to the client context data base (e.g., STA context database 1112 or the vWPA2 VNF data 1612) these keys for the unicast traffic and broadcast traffic at 1634, while further commanding the data VNF 1612 to open a port (access port) for communication with this particular client 1602. So from this point on, any traffic at all, which is coming from client over the data flow 1636, will go to the SP network and reach this wireless access gateway (WAG) 1618.

After this point, when the client/UE 1602 wants to send IP traffic, for example, for an application to communicate, it typically sends the packet to the WiFi driver 1606 at 1638, which then at 1640 puts this packet into the GRE tunnel and sends it to the data VNF 1612. The data VNF 1612 further decrypts the packet and encapsulates it into a different GRE header, further sending it to the WAG 1618 at 1642. The WAG 1618 then hands it out farther in the SP network and eventually to the internet. Then any incoming packets for this client 1602 that are coming from the WAG 1618 can also be forwarded to the interface or using this GRE tunnel at 1644. Then they will be repackaged, modified to the 802.11 format and be encrypted, and repackaged into a GRE tunnel and sent to the WiFi driver 1606 at 1646, which then will forward them to the client 1602 over the air at 1648.

Figure 17:
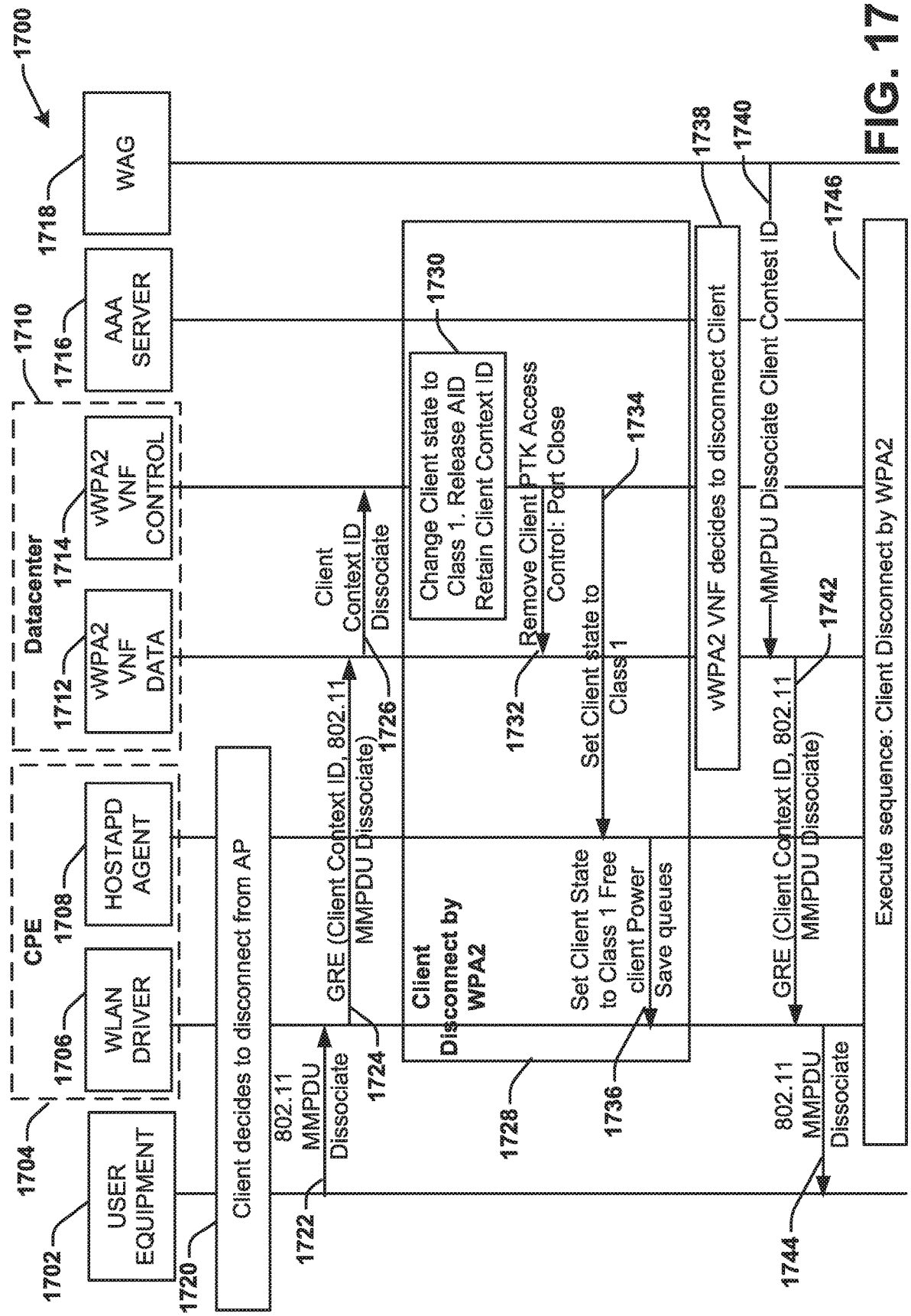
FIG. 17 illustrates a control flow for a client UE disconnection between the CPE and SP provider network in accordance with one or more aspects or embodiments described herein.

Referring to FIG. 17, illustrated is another example control flow for a client disconnect, in which the client/UE 1702 desires to disconnect from the community WiFi network in accordance with various aspects or embodiments herein. For example, the client/UE could 1702 could discern that the signal with this communication connected with the AP (e.g., SP network device 202 of FIG. 5) is week and would like to disconnect at 1720 from this AP 202 and connect to some other AP or GW with a stronger signal.

As a result of deciding to disconnect from the community WiFi network, the client 1702 can send the management frame that is called Dissociate over the air at 1722 to the WiFi AP driver 1706, which then puts the packet in a GRE tunnel and forwards it to the data VNF 1712 at 1724. The data VNF 1712 decrypts the packet, detects that this packet is a management packet, and so forwards it to the control VNF 1714 at 1726. The control VNF 1714 then performs the procedure of the client disconnect at 1730. It changes the client state to Class 1, which means do not accept any packet other than authenticate requests. The control VNF 1714 releases or frees up the AID or client association ID at 1730 and sends commands to change the class and close the port at 1732 and 1734, which is forwarded to the WLAN driver 1706 at 1736. However, the context ID can still be retained because client 1702 could attempt to associate with this AP in the future. The client context can be maintained for some time, but the control VNF 1714 configures the maintenance by re-moving the keys, the encryption keys, to the data VNF 1712 at 1732 because now the client 1702 has disconnected and these keys are derived upon each new connection (or session). The keys are removed and sends the commands are sent to remove to the hostapd agent 1708 to change client state to class 1 at 1732, in which class 1 is to accept only authentication request packet. Then the hostapd agent 1708 configures this command to the wireless LAN driver 1706 at 1736.

Now the client/UE 1702 can be disconnected at 1740 with a management command from the vWPA2 VNF data 1712 to the WLAN driver 1706, which then commands a dissociate 802.11 messages to the client UE 1702 at 1744. Security information that is relevant to the last session or connection can be cleared, and thus dissociation is complete with disconnect at 1746 as a result of the client 1702 deciding to disconnect from the AP/communicating WiFi network. At 1738-1746, a procedure can be carried out when the VNF decides to disconnect the client 1702, for example, such as in response to when the client 1702 does not communicate for a period or a duration of time, or any other circumstance when the VNF or component of the SP network device 202 decides for that the client 1702 has to be disconnected. The VNF can create a dissociate message (e.g., MMPDU dissociate client context ID) 1738 to be sent to client 1702 that it forwards at 1740 first to the data VNF 1712 from the WAG 1718 through the AAA server 1716, which then puts it on the GRE tunnel and sends it to the WiFi AP driver 1706 at 1742, which sends it over the air to the client 1702 at 1744 and now the client is disconnected at 1746.

Figure 18:
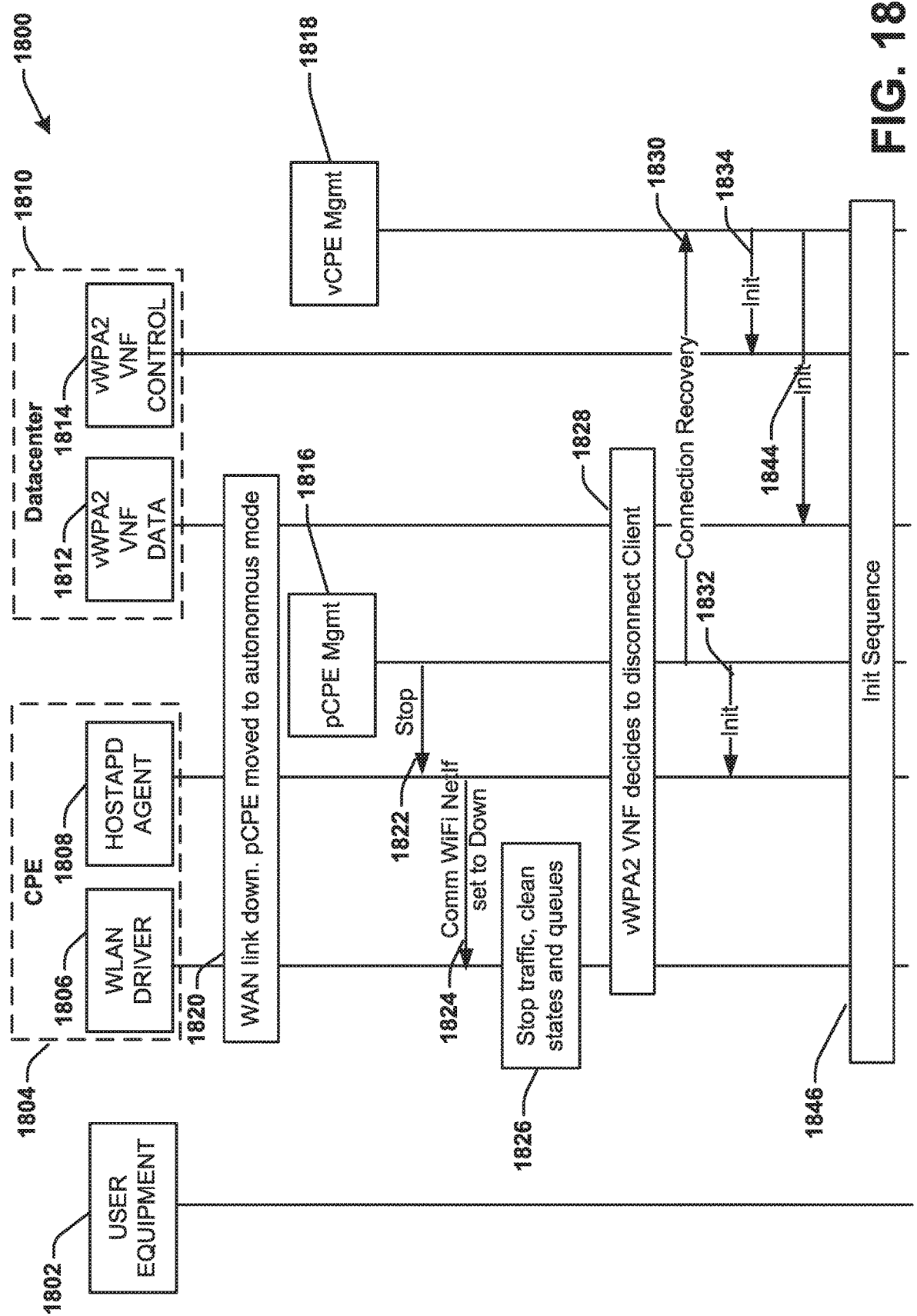
FIG. 18 illustrates a control flow for a client UE disconnection between the CPE and SP provider network when a link there-between is no longer functional in accordance with one or more aspects or embodiments described herein.

Referring to FIG. 18, illustrated is another control flow demonstrating the procedure when the CPE WAN link is down or no longer function (e.g., the cable link or optical link 290 between the SP network device 202 and the CPE 1804.

For example, although communication has been enabled, the WiFi client 1802 communicates to the SP network 280 over the community WiFi network or the WPA2 pass-through interface, but suddenly the cable link 290 goes down or there is some service interruption in the SP network. As such, there is no communication now between the CPE 240 and the data center 1810, or between the CPE 1804 and the SP network 280, for example.

First, the CPE 1804 detects it that one link is down. For example, cable modem link is down. Additionally, the pCPE 302 moves to autonomous mode at 1820, so it still wants to be able to function if there is some service interruption in the cable provider or SP network 280, and does not necessarily mean that the home network is down or blocked. However, the community WiFi service should be stopped as at 1822 with a stop command because the community WiFi network is the SP provider traffic. So pCPE management block 1816 in the CPE 1804 sends a command to the hostapd agent 1808 to stop at 1822.

The hostapd agent 1808 configures at 1824 the stop commands then into the WLAN driver 1806, which stops any communication with clients that are related to the community WiFi and stops sending beacons so the community WiFi clients does not see the community WiFi network. The WLAN driver 1806 then stops the client clean state and queues at 1826 and the vWPA2 VNF decides to disconnect the client at 1828.

At 1830, there is the possibility that the pCPE 1816 then re-establishes normal modes or a normal connection or link 290 between the CPE and the datacenter or SP network. As such, when it detects at 1828 or decides that the connection has be reestablished on the one link 290 (e.g., the cable modem connection), then it is reestablished, and starts connection recovery with vCPE management 1818 or the orchestrator 330, for example, at 1830. The orchestrator 330 can initialize the init procedure at 1834 and 1844 for the control VNF 1814 and data VNF 1812. The pCPE management 1816 then starts the init procedure at 1832 for the community WiFi AP. Alternatively or additionally, the pCPE management 1816 initializes the hostapd agent 1808, which then triggers the whole sequence of the WiFi AP driver initialization, etc. as above with an init sequence or flow 1846.

Figure 19:
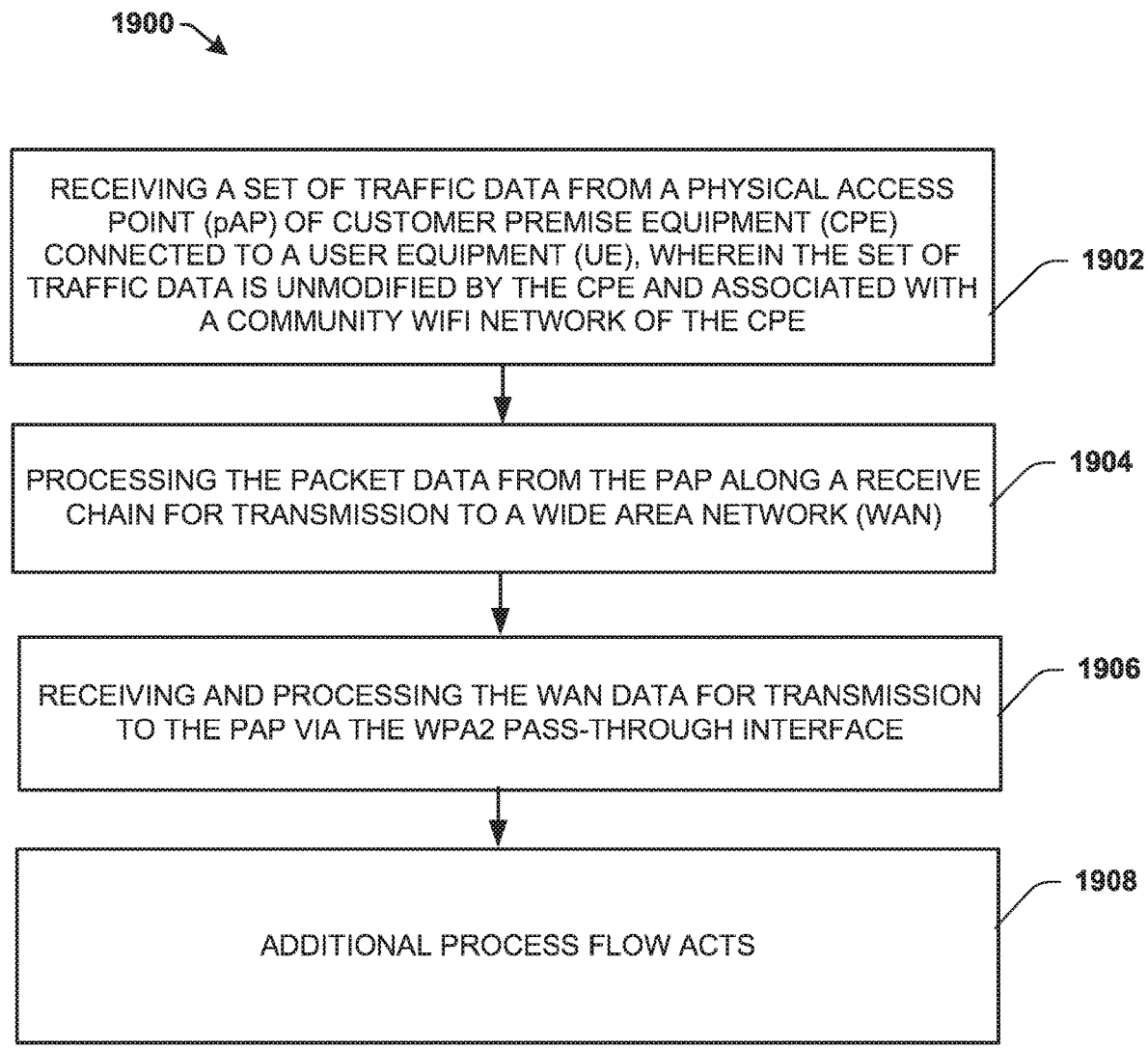
FIG. 19 a block diagram of a process flow for a SP network WPA2 pass-through according to various aspects described.

Referring to FIG. 19, illustrated is an example process flow 1900. A computer-readable storage medium, for example, could storing executable instructions that, in response to execution, cause one or more processors of a service provider (SP) network component or device to perform the operations of the process flow 1900. The process flow initiates at 1902 with receiving, via a WiFi protected access 2 (WPA2) pass-through, a set of traffic data from a physical access point (pAP) of customer premise equipment (CPE) connected to a user equipment (UE), wherein the set of traffic data is unmodified by the CPE and associated with a community WiFi network of the CPE At 1904, the process flow or method 1900 continues with processing the packet data from the pAP along a receive chain for transmission to a wide area network (WAN).

At 1906, receiving and processing the WAN data for transmission to the pAP via the WPA2 pass-through interface.

At 1908, the process flow can include at least one or more of stripping a GRE header from the packet data received from the UE; determining whether the packet data comprises an encrypted data; determining whether a similar encrypted data as the encrypted data has been decrypted before; determining whether the packet data comprises an aggregate media access control (MAC) service data unit (A-MSDU); or determining whether the packet data comprises a data packet or a management packet requesting access to the community WiFi network.

In one or more other embodiments, the process flow 1900 at 1908 can include other acts or steps as disclosed herein such as decrypting the packet data in response to the packet data comprising an encrypted data. In response to the encrypted data being similar to a similar encrypted data decrypted before the encrypted data, the SP network device or component 202 can generate a replay attack notification, drop the encrypted data and update a replay attack counter. The packet data can then be de-aggregated in response to the packet data comprising an A-MSDU. In response to the packet data comprising a management packet, the management packet can then be transmitted to a basic service set (BSS) management component that is configured to control a BSS ID of the community WiFi network and a station (STA) connection state. Alternatively or additionally, in response to the packet data comprising a data packet, converting the data packet from an 802.11 format to an 802.3 format and add a generic routing encapsulation (GRE) header for transmission to the community WiFi network and the WAN. The actions of data and control flows here can also be further carried in a process flow in conjunction as detailed herein.

Figure 20:
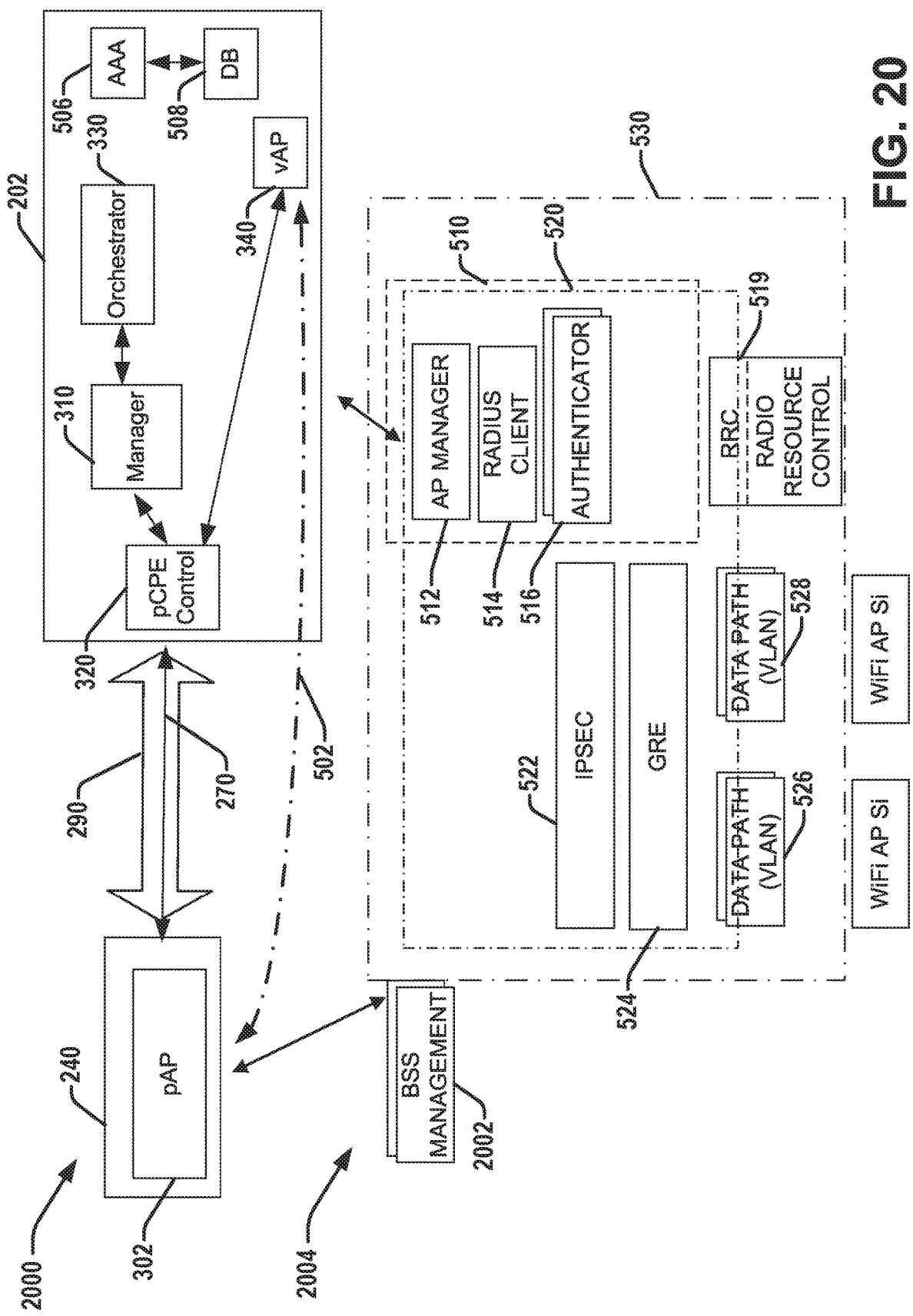
FIG. 20 is another network system that facilitates/enables operations in connection with a VNF related networking components and WPA2 pass-through operations for dynamic partition configuration, according to various aspects or embodiments described herein.

Referring to FIG. 20 illustrated is

Referring to FIG. 20, illustrated are different partition configurations for virtualizing or generating VNFs from the residential GW to the SP network associated with a community WiFi network system 500 for enabling/supporting a WPA2 pass-through. Reference is also made to the above figures in the description. A partition configuration can refer to the resources, hardware, firmware or software and associated functions that are either removed from the pAP 302 and assigned to the vAP 340, or kept at the pAP 302 in the CPE 240, for example. Each feature or function associated with the community WiFi network at the CPE 240 can be enabled by a change in the partition (or partition configuration), which defines which functions are at the pAP 302 or removed/assigned for operation to the vAP 340. Some of the functions of the CPE 240 can be moved out and put in a data center, server component, or other SP network device/component 202, which further can change the protocol, how the different functions communicate in and out from one another through the WPA2 pass-through.

In one embodiment, a communication link 502 can be provided between the CPE and the vAP 340, which can be controlled by the orchestrator 330, for example, in order to control and measure communication parameters there-between. One such communication parameter, for example, can include a communication latency. Other communication parameters can also be monitored by the orchestrator 330 as well, such as power, signal strength, load, or other communication network parameters in order to dynamically determine the partition configuration of the APs for VNFs associated with the WPA2 pass-through.

The orchestrator 330 can operate in conjunction with the vAP 340 or the control 320 of the SP network in order to generate or configure partition configurations of the VNFs dynamically or on-the-fly based on a communication parameter(s) (e.g., latency) of the communication link 502. The partition configurations 504 can be virtualized (moved from the CPE 240 to the SP network device 202) to the vAP 340 so that any one partition 510-530 can be selected, enabled or dynamically modified from among these functions, which can be removed from the CPE 240 and executed/assigned by the SP network at the vAP 340 or other SP network component, for example, in relation to a community WiFi network.

The orchestrator 330, for example, can measure latency, and then decide by the latency which functions to virtualize or re-assigned from the pAP 302 to the vAP 340. Based on this decision, the orchestrator 330 configures (both the virtual network function(s) VNFs 504 and the physical AP 302 to instantiate this specific configuration (or partition configuration). Different configurations can be enabled based on latency. For example, partition configuration one 510 can be enabled as a first a partition configuration from among different VNFs when the latency of the link 502 (or 290) is within a first range (e.g., about 100 ms or greater than 100 ms). A second partition can be configured when the latency is determined as being within a second range that is different from the first. The second range can comprise, for example, a latency value that is less than about 100 ms and greater than about 10 ms. A third partition configuration that is different from the first and second partitions can be configured when the latency is in a third range different from the first and second ranges. For example, the third range can be a latency value that is less than about 10 ms.

In another embodiment, the first partition 510 can include the following components along with associated functions or VNFs as they can be referred to herein. For example, a WiFi AP management component 512 can be configured to operate one or more policy settings associated with the vAP 340, such as security policies, security extensions with WPA2 security, group settings of one or more UEs, permissions, relates quality of service parameters (QoS), or other network policies or settings, for example. The first partition 510 can further include a RADIUS client component 514 that is configured to operate one or more authentication processes with an authentication server component 506, such as an authentication, authorization, accounting server as well as an associated database 508, for example. The AAA server component 506 can operate to retrieve/compare/confirm/process one or more keys, or security credentials for authentication or decryption of data traffic, for example. The first partition 510 can further include an authenticator component 516 configured to authenticate a user equipment (UE) with the vAP 340 through the pAP 302 on the WPA2 pass-through 270 based on the one or more authentication processes/protocols. The first partition 510 can further include a basic service set (BSS) management component 518 configured to operate a channel selection associated with a BSS identification (BSSID) of the community WiFi network for a client authentication and a key derivation, for example. The BSS management component 518 can control L2 security (per SSID/BSSID), as well as client connection management, the RADIUS CLIENT, or robust security client/WPA2 authentication/authentication requests. Any one of these components/associated functions by which each is configured can reside within or be controlled by the SP network device 202 or any component (e.g., virtual AP 340) therein, for example, as VNFs associated with the SP network 280 from the pAP 302.

In another embodiment, the first partition configuration of VNFs, including the AP management component 512, the RADIUS client component 514, the authenticator 516, and the BSS management component 518 can be classified as non-real time functions, in which the functions do not necessarily occur immediately in time and even if the function is not successful/complete or fails to meet a parameter or time deadline, possibly more than one (e.g., with multiple requests), the network system 500 is not considered in failure. As such, in some instances the results are not worthless in value for a result after any deadline for requests of the associated function, or is not zero, rather it could degrade over time or be pre-configured without being modified immediately or dynamically upon any modification or change in parameters or partition configuration, for example. These functions (VNFs) can be considered non-real time function with a latency of greater than about 10 ms, for example.

Additionally, the second partition 520 can further include a radio resource control (RRC) component 519 configured to control per client (UE) functionalities and common functions among clients. The per client functionalities can include at least one of: setting a data path, transmit parameters (e.g., transmit power), one or more modulation coding schemes, a channel width, one or more beamforming groups, or client/UE received signal strength indicators, and the like. Common client functionalities can include at least one of: a dynamic frequency selection, a channel load or coexistence. Additionally, the second partition 520 can include an IPSec channeling/tunneling component 522 operations, GRE component 524 operations, as well as data path functions 526 and 528. These functions and components of the second partition configuration 520 can be based on a real-time operation (RRC 519, IPSec 522, GRE 524, data path 526, 528) and a non-real time operation (e.g., the components and related functions of the first partition configuration 510). Real-time operations can include those functions that have a latency (e.g., a round trip packet latency or time for the function to operate) or take between one to ten milliseconds to function, and non-real time functions can be those that have a latency of greater than 10 milliseconds, for example.

The third partition configuration 530 can include components/functions within the first partition configuration 510 and the second partition configuration 520, including related components and functions (or potential VNFs) that operate or demand hard real time operation. For example, the RRC 519 can include partially real-time and partially hard real time functions, in which the hard real time functions can be those functions of an associated component that are performed or utilized resources for any associated function for less than about 1 ms. A hard real time function can require a particular deadline, otherwise failure of the function can occur if success is not achieved on the first endeavor, for example.

The first partition configuration 510 of VNFs, including the AP management component 512, the RADIUS client component 514, the authenticator 516, and the BSS management component 518 can be classified as non-real time functions, in which the functions do not necessarily occur immediately in time and even if the function is not successful/complete or fails to meet a parameter or time deadline, possibly more than one (e.g., with multiple requests), the network system 500 is not considered in failure. As such, in some instances the results are not worthless in value for a result after any deadline for requests of the associated function, or is not zero, rather it could degrade over time or be pre-configured without being modified immediately or dynamically upon any modification or change in parameters or partition configuration, for example. These functions can be considered non-real time function comprising a latency of greater than about 10 ms, for example. The second partition configuration 520 further comprises real-time functions and associated components (RRC 519, IPSec 522, GRE 524, data path 526, 528), in which even if the component or function of the component fails to meet the deadline/time frame, possibly more than once (i.e. for multiple requests), the system is not considered to have failed. The real time functions operate with a latency of between about 1 to 10 ms, for example, while the third partition configuration includes hard real time functions operational at a latency of less than 1 ms.

In another embodiment, a configuration can be based on the type of interface between the CPE 240 and the SP network 280. For example, a cable network access can be selected to operate with the second partition configuration 520, while DSL or PON can differ in partition configuration in order to further enable/support/manage the WPA2 passthrough. The partition configurations however can be modified at any time during communication packet transfer between the UE, through the CPE and to the SP network based on the latency detected. Other parameters can instantiate other partition configurations as well, and the disclosure is not limited to latency as the only parameter(s) that can be used for dynamically enabling/generating a partition configuration from among various different potential partition configurations with or based on one or more VNFs. Further, the first, second, and third partitions 510-530 can be selected with different functions described herein as VNFs in different partitions 510-530. However, these example partition configurations 510-530 are not fixed or static to the given example embodiments described herein for supporting the WPA2 pass-through.

The data path components 526 and 528 can include functionality that at least partially can be moved out, or virtualized from the CPE 240 to the SP network 280 or device 202 as VNFs as well. The data paths or planes 526, 528 can be demonstrated as multiple network interfaces (interfaces per VLAN). Essentially, the network that is particularly being virtualized (i.e., the community WiFi network from the home CPE 240 with one or more related VNFs). One interface can be for the home network that is not virtualized, and the other one can be for the network that is virtualized. The functions managed by each here can include WPA2 privacy WPA2 privacy (e.g., encryption/decryption of the packet). For the non-virtualized network, the privacy encryption/decryption can stay here in the data path locally at the CPE 240, but the other one, for example, can be virtualized to the SP network where the encryption/decryption can be moved out to the SP network as well.

These partition configurations, for example, 510-530 demonstrate what VNFs can stay at the home and what can move out. Thus, each partition configuration with associated components or functions of the components can be virtualized and moved to the SP network 280, the SP network device 202, or an associated component in operation or functional capacity. Essentially, in order for the orchestrator 330 to decide what to move, the latency of the communication (e.g., over link 502 or 290) between the pAP 302 and the SP network is determined. In particular, because if the latency is too large, and some of the protocols/functionality is virtualized or moved out, the protocol itself built on wireless WiFi protocol will fail because it is bound in time.

In another embodiment, in order to define/determine what the latency of the communication is, the latency or link is measured. The orchestrator 330 can measure the latency by using a "ping" procedure. A ping, communication or query can be sent from the SP network 280 to the AP 302, which replies to the PING in response, and then the orchestrator 330 can measure the time it takes to receive the response, which will determine the latency. Then, the SP orchestrator 330 or manager 310 can operate to decide how to configure the partitions as well as the appropriate ranges of any parameters associated with the particular partition configurations 510-530, for example. Then the SP orchestrator 330 can configure the partition configuration 510-530 option with the AP 302 by sending a command to the AP 302 that indicates the partition configuration by which it should function or operate in association with a community WiFi network and one or more connecting UEs thereto. In addition, the orchestrator 330 can configure the appropriate VNFs on the SP network side of the WPA2 pass-through 270.

Referring to FIG. 6, illustrated is an example process flow 600 for dynamic partitioning operations associated with FIG. 5 in accordance with the aspects or embodiments being disclosed.

At 602, the process flow 600 initiates with determining a partition configuration of one or more VNFs to be configured at a virtual access point (e.g., vAP 340) of the SP network 280 from a physical access point (e.g., pAP 302) of a customer premise equipment (e.g., CPE 240) based on a communication parameter of a communication interface/link (e.g., link 502) to the CPE 240.

At 604, the flow comprises instantiating the vAP of the SP network based on a community WiFi network to enable a WiFi protected access 2 (WPA2) pass-through. This act can be based on a partition configuration determined by the VNF orchestrator 330, for example. A communication query or PING can be sent to the CPE, a response then received in response to the PING/query, and based on a measurement of a related parameter (e.g., WAN latency, load, etc.) the partition can be selected and configured.

At 606, the flow continues by enabling the WPA2 pass-through transparently through the pAP from the vAP.

At 608, the orchestrator 330, for example, can modify the partition configuration of from the set of VNFs by removing operations associated with the pAP of the community WiFi network from the pAP to the vAP in response to a change in a latency value of the communication link.

The first partition configuration from the set of VNFs can be configured when a link latency is about 100 ms or greater. The second partition configuration from the set of VNFs can be configured when the link latency is less than about 100 ms and greater than about 10 ms. A third partition configuration can be configured from the set of VNFs when the link latency is about 10 ms, or less than about 10 ms, for example. Alternatively, other ranges of parameters can correspond differently to the first, second or third partitions.

As such, the orchestrator component 330, or the SP network device 202 can measure a WAN link latency: GW-to-SP network Access GW, using a PING of communication, for example. Then a decision can be made to enable vAP functions based on measured latency, such as for non-real time control only (e.g., the first partition 510), non-real time control with privacy and a part of real-time control (e.g., the second partition 520), non-real time, real time, hard real-time control, and privacy (e.g., the third partition 530). Then the orchestrator 330 can configure the GW functions and AP VNFs (e.g. as a vWPA2 pass-through operational system). Then AP management and control is located on the virtual WPA control VNF, the AP data plane is in the virtual plane.

Referring to FIG. 20, illustrated are additional embodiments for different partition configurations for virtualizing or generating VNFs from the residential GW to the SP network associated with a community WiFi network system 500 for enabling/supporting a WPA2 pass-through. Reference is also made to the above figures in the description. A partition configuration can refer to the resources, hardware, firmware or software and associated functions that are either removed from the pAP 302 and assigned to the vAP 340, or kept at the pAP 302 in the CPE 240, for example. Each feature or function associated with the community WiFi network at the CPE 240 can be enabled by a change in the partition (or partition configuration), which defines which functions are at the pAP 302 or removed/assigned for operation to the vAP 340. Some of the functions of the CPE 240 can be moved out and put in a data center 1310, 1410, 1510, 1610, 1710, 1810 (e.g., the data VNF/vWPA2 VNF data, control VNF/vWPA2 VNF control), server component, or other SP network device/component 202, which further can change the protocol, how the different functions communicate in and out from one another through the WPA2 pass-through.

Similar to FIG. 5, illustrated above, for example, in reference to various partition configurations and their dynamic or predefined configuration, a communication link 502 can be provided between the CPE and the vAP 340, which can be controlled by the orchestrator 330, for example, in order to control and measure communication parameters there-between. One such communication parameter, for example, can include a communication latency, or the speed at which communication between components or devices (e.g., pAP 302 and SP network device/component 202). Other communication parameters can also be monitored by the orchestrator 330 as well, such as power, signal strength, load, or other communication network parameters in order to dynamically determine the partition configuration of the APs for VNFs associated with the WPA2 pass-through.

The orchestrator 330 can operate in conjunction with the vAP 340 or the control 320 of the SP network in order to generate or configure partition configurations of the VNFs dynamically or on-the-fly based on a communication parameter(s) (e.g., latency) of the communication link 502. The partition configurations 504 can be virtualized (moved from the CPE 240 to the SP network device 202) to the vAP 340, as such any one partition 510-530 can be selected, enabled or dynamically modified from among these functions, which can be removed from the CPE 240 and executed/assigned by the SP network at the vAP 340 or other SP network component, for example, in relation to a community WiFi network.

Additional aspect herein can pertain to the partition configurations of VNFs over the virtual AP, repartitioning the vAP and defining the protocol between the pAP and the functions/VNFs that are being moved to the data center 1310, 1410, 1510, 1610, 1710, 1810. Instead of moving all of the AP protocol stack, control protocol stack as a virtual network function to the control VNF 1314, 1414, 1514, 1614, 1714, 1814. As such, functions left in the pAP can be a protocol translation layer, the way to talk to the driver (e.g., WLAN driver 1306-1806). An additional partition configuration can include the BSS management 2002 (or 518 of FIG. 5) being left or located in the pAP to be functioned by or controlled by the CPE 240 for the partition configurations 510, 520, or 530 of FIG. 5. As will be further described below, this can further lead to changes in the protocols in the wireless specifications or aspects related to the SP network VNF partitioning and virtualization operations herein. For example, in this specific partitioning of the CPE, in which the BSS management 2002 (or 518 of FIG. 5 is kept at the CPE 240 (e.g., in the hostapd agent 1116, 1308, 1408, 1508, 1608, 1708, or 1808 of the CPE 240, 1304, 1404, 1504, 1604, 1704, or 1804) certain VNFs are kept thereat and not virtualized or relocated to the SP network outside or external to the CPE. These VNFs as part of the potential set of VNFs discussed above, or the BSS functions of the BSS management 2002 (or 518 of FIG. 5) not just a plug in to the protocol for the WLAN/WAV driver 1406-1806 (e.g., via the UE/user device/client device to the CPE 1304-1804, but also the function of the BSS management 2002 that can be configured to perform the 802.11 association and authentication functions, while moving secured connection management to the control VNF 1314-1814 or other component of the data center 1310-1810 or SP network device/component 202.

First of all from the implementation perspective, the portion of the 802.11 or 802.1x association/authentication is unchanging in function, such as in terms of latency or speed. This part of the protocol of the client connection establishment has much more sensitivity to latency, such that the latency for this part of the protocol can be limited to about 30 milliseconds latency, which can be a round-trip or bidirectional latency that adds to the protocol 802.11 specification. Thus, this part of the management being partitioned to the network side could potentially be a limiting factor to the latency of the communication from the CPE to the virtual network functions to about 30 milliseconds. These functions as such could further limit the distance of how far out of the pAP 302 or CPE 240, 1304-1804 VNFs can be moved from the CPE 240, 1304-1804. However, if the BSS management 2002 is provided or kept located locally in the CPE 240, 1304-1804 throughout any dynamic partitioning configuration 510, 520, 530 and only move the security part of the client connection to the VNF (e.g., AP manager 512, RADIUS client 514, authenticator 516, latency can be increased to about 100 milliseconds or greater, or less, and dynamic partitioning can become relatively more flexible and dynamic. Because this part of association/authentication of the protocol operations is less latency sensitive, in the event of partitioning in this way, SP networks can determine/decide whether to implement this type of partitioning and would be able to move VNFs deeper into the network to a more central location away or outside of the CPE 240, 1304-1804, for example, in an SP network component/device 202.

In other aspects, the SP network component/device 202 could decide to do the partitioning involving two virtual network functions or network functions, which can be partitioned between the control VNF1314-1814 of the data center and the pAP of the CPE, for example. One network function can include the security part of the function and the second one is the BSS management as an additional function. The BSS management 2002 could be located closer to the CPE 240, 1304-1804 (e.g., the pAP 302) and function(s) configured for a secure connection could be located farther from the CPE such as at the vAP 340 or other component of the SP network device 202, which can have benefits of deployment by the service provider. As such, when this particular partition configuration 2004 illustrated in the network system 2000 is implemented, it can be facilitated in the protocol or via the communication connection 290 or link 502, which can be designated by or with control commands/notifications that can be communicated over a transport layer security (TLS), which provide cryptographic protocol(s) or process(es) that provide communication security over a network as will be further illustrated below in FIGS. 22 and 23. In one example, the link 290 can be a GRE connection and link 502 a TLS connection, vice versa, or one or more both, for example.

In contrast to FIG. 5 described above, the first, second, third partition configurations 510-530 can include the BSS management component 518, 2002 configured to be operated by or located at the CPE 240, 1304-1804 or the pAP 302 instead of being virtualized to or located at the SP network device/component 202 for operation thereat or by any one SP network component of the SP network device 202. The BSS management 2002 can be configured to operate a channel selection associated with a BSS identification (BSSID) of the community WiFi network for a client authentication and a key derivation, for example, and implement such functions between the User or Client device/UE 1502-1802 and the CPE. The BSS management component 518 can control or operate in conjunction with L2 security (per SSID/BSSID), for example, as well as client connection management, the RADIUS CLIENT, or robust security client/WPA2 authentication/authentication requests. Any one of these components/associated functions by which each is configured can reside within or be controlled by the SP network device 202 or any component (e.g., virtual AP 340) therein, for example, as VNFs associated with the SP network 280 from the pAP 302, for example. Other components illustrated in FIG. 20 can operate or be configured similarly as described above with reference to FIG. 5.

Figure 21:
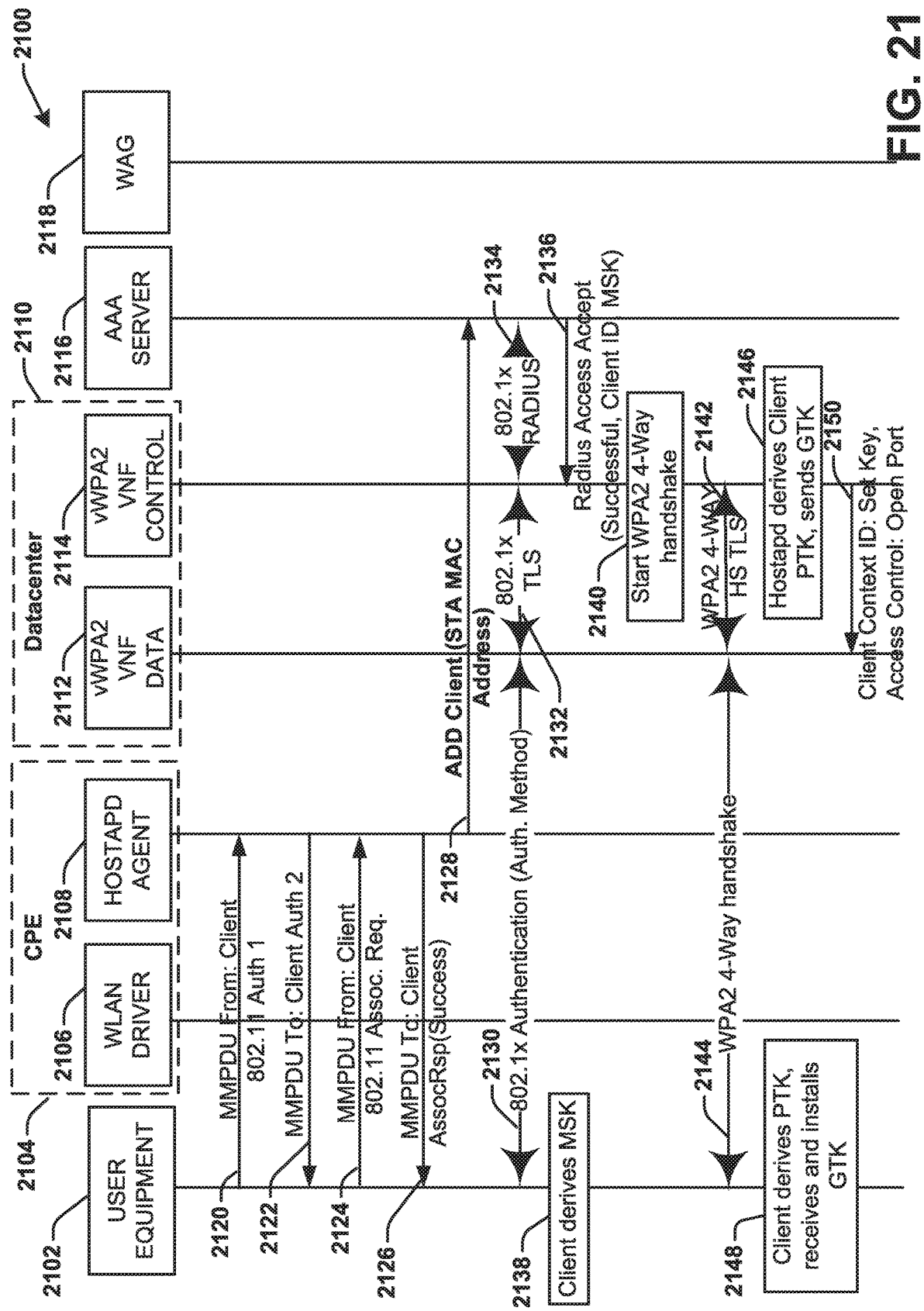
FIG. 21 illustrates a control flow interface for a client UE connection between the UE, CPE and SP provider network components in accordance with one or more aspects or embodiments described herein.

Referring to FIG. 21, illustrated is a control flow interface for a client UE connection between the UE, CPE and SP provider network components in accordance with the partition configurations of FIG. 20, for example, and one or more aspects or embodiments described herein. As a result of the partition configurations illustrated and described with respect to FIG. 20, a set of different scenarios can be put together for connection established from the process flow of FIGS. 15 and 16 for connection establishment. In particular, one of the flows associated with client connection establishment is to operate for this particular partition configure 2004 where, for example, partition 510, 520, or 530 are implemented, except without one or more functions of the BSS management 518 or associated functions being virtualized out of the pAP 302 of the CPE 240 or the like, for example, and moved to be located/operates by/at the SP network device 202 or a component thereof 310, 320, 330, 340, 506, 508.

Similar to process flows described above, the process control flow 2100 comprises operations or communications among various SP or CPE components. For example, the CPE 2104 can include the WLAN driver 2106, similar to the WLAN drivers discussed elsewhere herein and the hostapd agent 2108, also similar to hostapd agents discussed herein.

The data center 2110 can also include the vWPA2 VNF data/data VNF 2112 and the vWPA2 VNF control/control VNF 2114. The AAA or triple A server 2116 and the wireless access gateway can be integrated with or separate from the SP network device/component 202 with data center 2110, for example. The user equipment 2102 can operate independently of any other network component until initiation connect via the process control flow 2100 for association/authentication.

The control flow 2100 describes how the client secure connection establishment (2120-2128) and related processes will look like in the partition configurations being added where a secure connection management is in the control VNF 2114 and the 802.11 authentication (as BSS management 2002) stays in the hostapd agent 2108 of the CPE 2104.

In this particular partitioning configuration 2004, when a specific client 2102 wants to connect to the access point 2104 as part of a community WiFi network, a 802.11 authentication message (MMPDU From Client 802.11 Auth 1) 2120 can be sent over the air and received/handled/controlled by the hostapd agent 2108 in the CPE 2104, which, in response to receiver this, can return an authentication to message (MMPDU TO; Client Auth 2) 2122, as the authentication response to the client 2102. As such, the WLAN driver 2106 can be initially by-passed in function upon the client 2102 initiating access by the client secure connection establishment 2120-2128 processes, for example.

In response to receiving the message 2122, the client 2102 can send the MMPDU message 802.11 association request 2124, which can then be received at the pAP that can be handled/controlled by the hostapd agent 2108 in the CPE 2104. In response to receiving the message 2124, the hostapd agent 2108 can then return association response success (MMPDU To: Client AssocRsp(Success)) 2126 to the WiFi client 2102 or UE. The new stuff is this new interface that is needed because we are applying this new partition.

In response to the client 2102 being associated successfully and receiving the success message 2126, then the hostapd agent 2108 can further send to the control VNF message ADD Client 2128 with the parameter client MAC address for appropriate station STA component. Afterwards, the client 2102 can start a secured connection establishment with the network via connections 2130, 2132, and 2134.

First, the UE 2102 or client can execute the message exchange that is called 802.1x authentication 2130, as described in more detail above with the other components. This can be do this over the GRE tunnel encryption because all the data path is sent over the GRE. This traffic can move the same way as described in above embodiments. Thus, it can come to the data VNF 2112 as GRE where the Data center or data VNF 2112 can then remove the GRE header and can send the packet to the control VNF 2114 over a transport layer security (TLS) connection 2132. The control VNF 2114 can then send the packet to the triple A server 2116 over the RADIUS client 514 RADIUS protocol connection 2134. This traffic can be bi-directional with an exchange of 8 to 12 messages possible that are bidirectional concurrently via connections 2130, 2132, and 2134.

At some point in time when the AAA server 2116 has successfully authenticated the client 2102, it can send to control VNF message RADIUS access accept with parameters (Client ID, MSK, successful) 2136, indicating that the authentication has been successful, and it can send a client ID and a master session key (MSK). Now, the control VNF 2114 can use this master session key (MSK) to derive one or more unicast/broadcast keys for communication with the client or clients 2102. Additionally, the client derives the MSK at operation 2138 by processing the information that starts in this 802.1x authentication session.

After the above process flows are completed, both client 2102 has derived the MSK at 2138 and the control VNF 2114 has the an MSK, the control VNF 21114 can initiate/execute a four-way handshake 2140 to derive unicast and broadcast keys with the client(s) 2102. Thus, four-way handshake can include a four message sequence that can happen between WiFi clients 2102 and the control VNF 2114. Because the control VNF communicates with data VNF over TLS 2142, the message 2142 can be sent over TLS to the data VNF 2112, which can then encapsulate this in the GRE tunnel and send it to the AP at 2144 that can decapsulate them and send them to the client 2144.

Then all clients at 2148 and the control VNFs 2114 at 2146 can derive client's PTK, which is the pairwise transient key or another name for the unicast key. So both client and control VNF derive unicast key, and the control VNF 2114 sends group key or broadcast key—GTK is group temporal key or another name for a broadcast key. The client can receive the GTK and install it. Then control VNF 2114 configures the client key to the data VNF 2112 and commands the data VNF 2112 to allow traffic from the client to pass through it 2150.

In aspects/embodiments, herein the client connection establishment 2120-2128 results from the above partitions 2004 of FIG. 20, as the first four messages now terminate at the hostapd agent 2108. Previously these were terminated at the control VNF at the SP network, and thus, an additional interface is being added with the client or UE as a result. Now, the hostapd agent 2108 handles the first phase of the client connection so it has to notify the control VNF 2114 when connection is established, when the first part of the connection is established such as association and first part of authentication. Essentially the first five messages is of primary concern or difference from the other partition interfaces involved with partitions 510, 520 and 530 and with the client connection control flow of FIG. 15 or 16.

Figure 22:
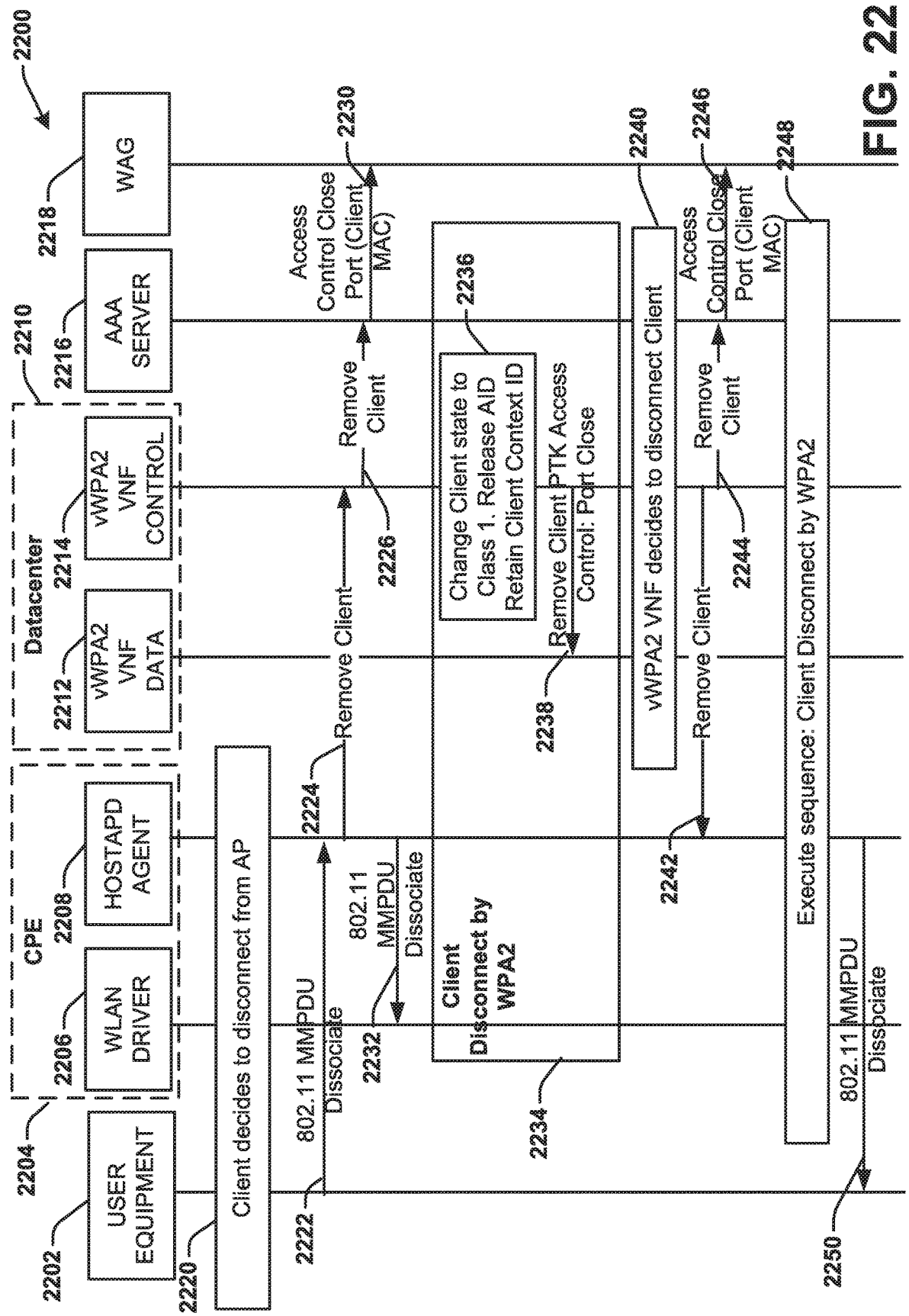
FIG. 22 illustrates a control flow for a client UE disconnection between the CPE and SP provider network in accordance with one or more aspects or embodiments described herein.

Referring to FIG. 22, illustrated is a control flow 2200 for a client UE disconnection between the CPE 2204 and SP network device component(s) 2210. Similar to figures above, the network can include a UE 2202, a CPE 2204 with a WLAN driver 2206 and a hostapd agent 2208. A data center of SP component/device 2210 can further include the data VNF 2212 and control VNF 2214, as well as optionally the AAA server 2216 in communication with the WAG 2218.

When the client 2202 as a client device or UE decides to disconnect 2220 as the first part, or alternatively (or additionally) if the control VNF 2114 decides to disconnect the client at 2240, various changes can be seen in the interface. When the client decides to disconnect at 2220, it sends a disassociate message (802.11 MMPDU Dissociate) 2222 to the hostapd agent 2208, and in response, the hostapd agent 2208 sends command to the control VNF—remove client 2224. Then it sends message back to the client 2202 and commands 2232 (802.11 MMPDU Dissociate) the WiFi driver 2206 to stop communicating with this client, to stop accepting all packets other than associate packages from the client 2202.

In response to receiving the remove client message 2224, the control VNF 2214 forwards or communicates a similar message remove client 2226 to the AAA sever 2216, which sends a message 2230 Access control close port (client MAC) 2230 to the WAG 2218, which serves to message close port from triple A server to one, wherein one is an access gateway indication, for example. As such, herein is the change from other embodiments/aspects because in the other aspects/embodiments the disassociate message went all the way to the control VNF, for example. Then the control VNF 2214 sends the command to the hostapd agent—set client state to plus one and all this stuff: disconnect client, as described above with respect to FIG. 17, for example.

In an aspect, the two messages 2224, 2226 and the first message 2222 can be different from FIG. 17, for example. The rest of this client disconnect process called client disconnect in this rectangle block 2234 is without further change. Essentially, the control VNF 2214 then changes the client state to the state where it is not allowed to pass data, releases the association identity (AID) 2236, which means client unique client identifier for the connection identifier at the access points, and retains client content. There is no significant change being performed here because the client can be able to reconnect shortly if desired. Some of the content like MSK has to be retained so the SP network component can save all the 802.1x authentication procedure data, which is about 12 messages, for example exchanged or communicated. So when client reconnects, time can be saved on the reconnect process and get faster to moving data. Then this control VNF 2214 can send connect to the data VNF 2212—remove client key and close port 2238, which means stop communicating with client.

The second part is when the control VNF decides to disconnect client 2240 and it sends a remove client command 2242 to the hostapd agent 2208, in accordance with one embodiment. This is a new message, which then generates 802.11 dissociate message 2250 to the client that sends it. In other aspects, the control VNF 2214 had been sending this disassociate message all the way to the client and hostapd agent hadn't been involved.

The rest of the messages are not significantly modified. The control VNF sends command to the triple A server—remove client 2244, interpolate/interlays/interfaces, notifies that it wants the wireless access gateway to close the port(s) for this client 2246, for example. Then this box executes the sequence: client disconnect by WPA2 2248.

FIGS. 23-26 illustrate data sets with message data for a control VNF/data VNF interface in accordance with one or more aspects or embodiments described herein.

Figure 27:
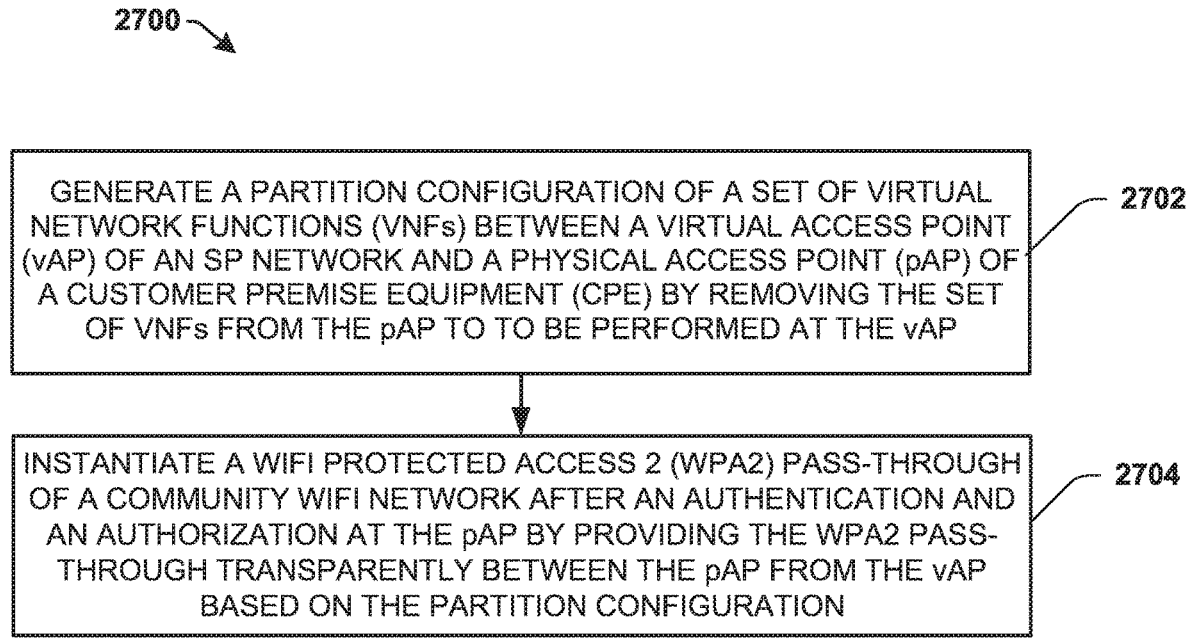
FIG. 27 another block diagram of a process flow for a SP network WPA2 pass-through according to various aspects described.

In particular, FIG. 27 illustrates data sets to document the interface between the control VNF and the data VNF, for example. Several messages can be defined on the control VNF/data VNF interface, some or all of which can or could not necessarily be implemented, for example. The following are the type of messages defined: BSS add—when control VNF asks data VNF to add to start tracking a specific virtual AP; Station (STA) add—when VNF control asks to allow traffic from the station to pass; BSS delete—when specific AID or AP went down and control VNF has detected that and now commands to stop all the communication from the client or to the client that belongs to that BSS or BSSID and the BSS is a virtual AP; Station delete—when control VNF wants to remove a specific station; Key set—when control VNF wants to add the key, as in the sequence diagram/flow process of client connection, then end of this client connection establishment control VNF sends message to the data VNF add key. As such, there can be the description of this message Key get—when control VNF wants to get the latest key material from the data VNF because data VNF receives the key from the control VNF and then uses it and some other data from the packet to create the key material for packet encryption. From time to time for these processes can be called re-key where the control VNF requires message information so it can ask key get to ask to get this information. Frame transmit and frame receive are essentially how data frames are passing between control and data VNF.

Referring to FIG. 24, illustrated is another example of data sets used between the Control VNF and Data VNF interface with description of data fields associated with the above defined messages. In this data set, ADD BSS, add station, delete BSS and delete Station and other messages can be utilized. In the Add BSS there are two fields: message ID, which can read add BSS and BSS MAC address or BSS ADD. In the add station there are three parameters: the message ID, which is add statin BSS ID, MAC address of BSS and Station address. In the delete BSS two parameters: message ID which can delete BSS, and BSS ID which gives to the BSS MAC address to delete. In the delete station there are three parameters: message ID, delete station and BSS ID and the station belongs to and station address to delete station MAC address in the BSS to be deleted. As such, the field descriptions provide add BSS stations, delete BSS and delete station with various parameters therein for interfacing.

Referring to FIG. 25, illustrated is a SET Key and GET Key. SET Key includes several fields. The first field can be message id SET Key, and the second can be the station MAC address because a key for a specific station can be established or set. Then BSS id is where the client belong to a specific BSS or virtual AP. Then it can be key id that can have value from zero to 4, as zero, one, two, three, or four. If it is zero, then it is a unicast key of parameter of transient key. If it is one or two, it is a group key or broadcast key, and if three or four, the key to encrypt and decrypt is a MAC management message, not a data message or data packet, but one or more management packets. Then, the next field is a cipher suite, which is defined here. If its Z, it can be similar to an enumerator (enum) of different ciphers that are allowed for wireless LAN, in which one of them is called TKIP, the another CCMP, and another is for a cipher that can be value zero, one or two.

Then we have padding by access padding, which means to align a data structure, with no information just get. Then we have sequence counter that is used 64 bit like S byte sequence counter that can be used for both TKIP and CCMP encryption. Then there is a 16 byte or 128 bit, or rather a 2 byte key length and then an array that describes the key. This is set key that is setting encryption key for a specific client that belongs to specific BSS id and defined key parameters. This can be defined by what the cipher suite, the key id, the sequence counter and the key itself.

Referring to FIG. 26, illustrated is an example of transmit frame and the receive frame messages. The transmit frame can have message ID that can call transmit frame. It can have address of the client for which this frame is required to be transmitted—station MAC address. Then some padding information and then the frame itself, frame length and frame by array can be utilized. A similar structure can be used for the receive frame, with message id, station address padding, frame length and frame array.

Referring to FIG. 27, illustrated is an example process flow 2700 for dynamic partitioning operation in accordance with the aspects or embodiments disclosed herein.

At 2702, the method 2700 comprises generating a partition configuration of a set of virtual network functions (VNFs) between a virtual access point (vAP) of the SP network and a physical access point (pAP) of a customer premise equipment (CPE) by removing the set of VNFs from the pAP to be performed at the vAP.

At 2704, the method 2700 further includes instantiating a WiFi protected access 2 (WPA2) pass-through of a community WiFi network after an authentication and an authorization at the pAP by providing the WPA2 pass-through transparently between the pAP from the vAP based on the partition configuration.

The method can further include modifying the partition configuration of from the set of VNFs by removing operations associated with the pAP of the community WiFi network from the pAP to the vAP in response to a change in a latency value of the communication link or other parameters, for example.

The method can further include receiving transparently via the WPA2 pass-through a set of unmodified traffic data from a user device and through the community WiFi network of the CPE to enable a decryption of the set of unmodified traffic data, only at the vAP.

The partition configuration can be configured to comprise a RADIUS client at the vAP of the SP network and a basic service set (BSS) management component at the pAP, wherein the BSS management component is configured to operate a channel selection associated with a BSS identification (BSSID) of the community WiFi network, and generate a unicast key or a broadcast key based on the authentication and the authorization at the pAP. The RADIUS client component, located at the vAP, can be configured to operate one or more authentication processes with an authentication server component that authenticates a user device with the vAP through the pAP on the WPA2 pass-through based on the authentication and the association performed between the pAP and the user device.

A client connection associated with a user device can be added based on a control VNF message from the pAP comprising an add client message with a media access control (MAC) client address from a successful client connection establishment at the pAP.

The process flow or method 2700 can further include receiving a command from the pAP of the CPE to remove a user device in response to the pAP of the CPE receiving a management packet of the packet data comprising a dissociate packet. Alternatively or additionally, the process can include generating a dissociate message to the pAP of the CPE that triggers the CPE to respond to the dissociate message by dissociating the user device from the WPA2 pass-through of the community WiFi network.

Figure 28:
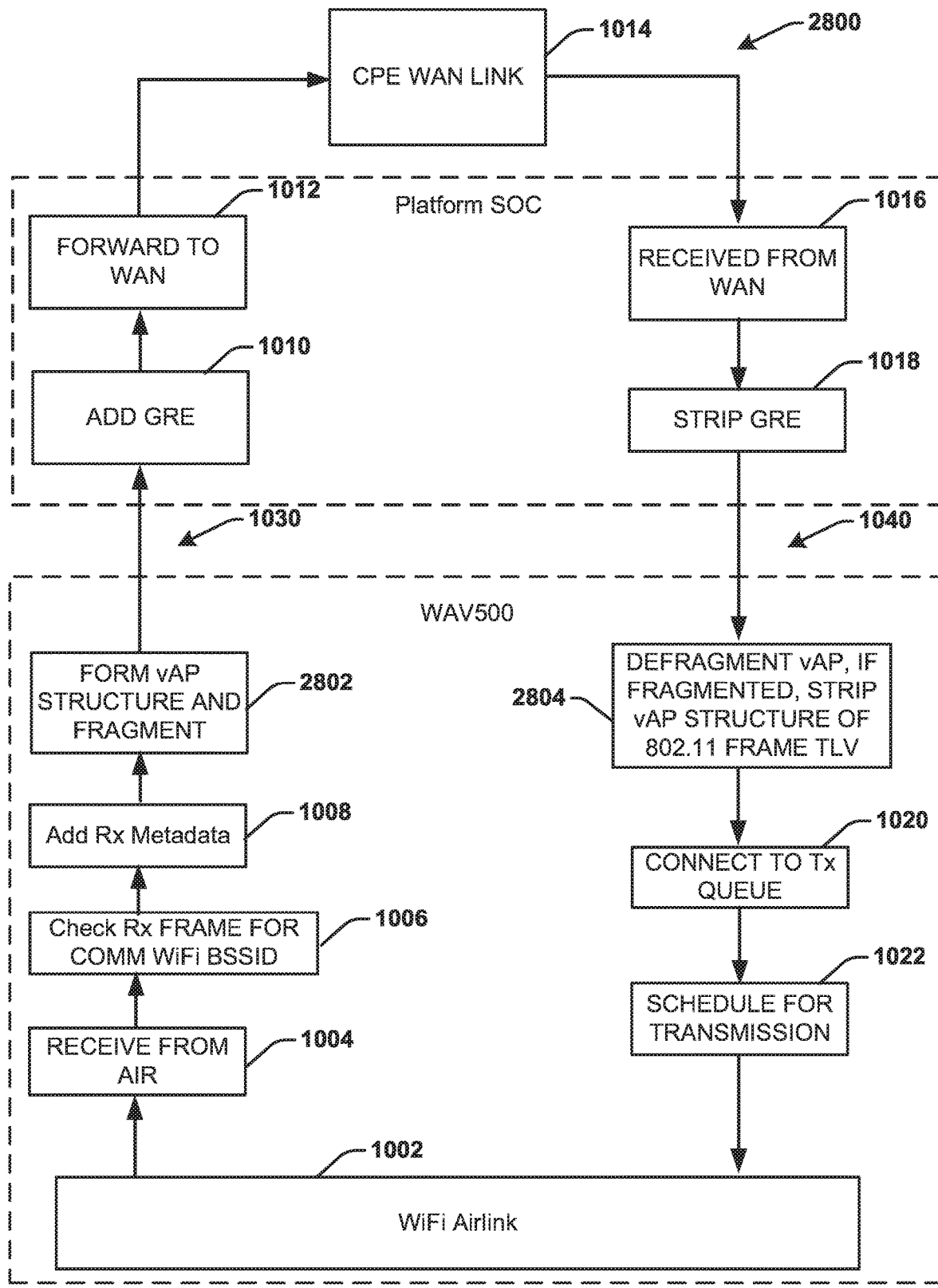
FIG. 28 illustrates an example data flow from a CPE perspective with fragmentation and defragmentation in accordance with one or more aspects or embodiments described herein.

Referring to FIG. 28, illustrated is another example data flow 2800 for protocol details of a CPE similar to, but different from, the flow 1000 with various components of the CPE and SP network. The process flow 2800 illustrates data exchanges with fragmentation and defragmentation of packet frames along various components. These operations enable the processing of any size (or length) of packet frame(s) via the WPA2 pass-through (e.g., 270) from a pAP 302 in the CPE (e.g., 240, etc.) to the vAP 340 or the data VNF (e.g., 1312, 1512, 1612, 1712, etc.) at the SP provider network 280 despite the size of the packet that the vAP/SP provider device is configured to process together or in entirety at a time (e.g., about 1314 bytes, 1500 bytes, 1600 bytes, or other size).

As discussed in reference to FIG. 10 above, packets (or packet frames) can be received via the receive path 1030 over WiFi airlink 1002 in order to process data for the community WiFi network. In response to receiving a packet frame at 1004 along the receive path 1030, a check can be performed at 1006 (e.g., by the pAP 240) as to whether or not the packet frame belongs to the community WiFi network, which is configured as a virtual network. The check at 1006 can be performed to determine if the packets (packet frames) belong to the BSS according to the BSS ID, then a determination or check can be made for the class (e.g., a CLASS 1-3) of the packet frame. However, if the packet does not belong to the BSS as the community WiFi network, then the partition configuration is not virtualized and the residential GW or CPE 240 would process the packet accordingly without a WPA2 pass-through interface 270 to the SP network 280. At 1008, a received metadata can be added to the packet.

In one embodiment, at 2802 (at the CPE or a component of the CPE, as a pAP or the like) the vAP packet frame structure can be further formed and fragmentation can be implemented based on one or more fragmentation criteria. The fragmentation component 2802 can act or can operate to manage the situation where the encapuslated packet frame being received or formed is going to be bigger than a maximum frame size that the WiFi AP network, or further network nodes (e.g., SP network device, WAN, or other component) can handle as an entire packet frame in one piece.

Some concerns of operation in the remote WPA2 mode with the generation of the WPA2 pass-through interface is that the packet frame size can be increased because of additional structure added to the packet frames (e.g., a virtual AP structure, a GRE overhead, an Outer IP overhead, an Outer MAC or other structure). As such, it can happen that the resulting packet frame could be longer than the default maximum transmit unit (MTU) size for Ethernet or for Docsys (e.g., about 1500 to 1600 bytes, or other amount). Without a solution for the WPA2 pass-through interface 270, some packet frames could be dropped, especially for user datagram protocol (UDP) traffic there-through.

As such, structure/fragmentation components 2802/2804 of the pAP of the AP CPE (e.g., WAV500) generates a mechanism that enables the WPA2 pass-through interface along the SP network to process or handle longer packets as a remote WPA2 Native Fragmentation and Defragmentation component or processing layer. These components can be separate or same for determining, processing, forming and operating fragmentation and defragmentation operations within or along the WPA2 pass-through interface.

In case of fragmentation, the component can act at 2802 with input(s)/output(s) from/to the WiFi Airlink 1002, the Add Rx Metadata 1008, the Add GRE 1010, the strip GRE 1018, the Platform SOC, and the CPE WAN link 1014 as illustrated. The fragment component 2802 can be configured to fragment longer packet(s) greater than a packet size threshold or MTU, and will fragment longer calculated 802.11 packets in a way that will be transparent to the networking. As such, there is no reliance on the existing protocols like Path MTU Discovery, adding additional nodes (e.g., routers) that do defragmentation/fragmentation on the way, or on processing Jumbo frames that are larger, while keeping cost lower and being effective for WPA2 pass-through communications.

An advantage of remote WPA2 native fragmentation and defragmentation, as illustrated at component 2802 and 2804 of the CPE 240, respectively, is essentially a seamless handling UDP traffic of any length, being able to operate with variable lengths beyond capabilities or a size threshold limit among packet frames; thus, many more applications can use long UDP packets with the WPA 2 pass-through interface. For example, many Android applications use Google QUIC experimental protocol, based on UDP that uses long UDP packets. With this approach network devices (e.g., AP CPE, pAP, and vAP/Data VNF of the SP network)

can handle video streaming traffic. Some popular apps can further use long(er) UDP packets for video conferencing. With native remote WPA2 fragmentation/defragmentation mechanisms the network components 2802/2804 (as well as corresponding components 2904/2902 of the data flow from the Data VNF of FIG. 29) can ensure that long UDP frames generated by client or network devices/Apps/Servers are always delivered via the WPA2 pass-through 270, and thus, user quality of experience is not impacted and even enhanced.

In an aspect, the packet frame is received from a user equipment or client at the AP CPE and after adding overhead, a determination by the fragmentation component 2802 of the AP CPE (WAV500, or other component) can be made to determine whether the packet frame being formed (with additional vAP header, GRE header, MAC header, etc.) would be larger than a size threshold (e.g., about 1500 bytes, or other size/MTU) after being formed or having additional structures (headers, encapsulation, etc.) appended. For example, the determination can be whether vAP length of the vAP packet frame would exceed vAPMaxFragSize before being transmitted or processed downstream.

If exceeding the size threshold or MTU, the packet frame could not pass through the WPA2 pass-through interface 270 (e.g., as part of an Ethernet interface 290, or the like) and be dropped by a MAC node by the vAP or home gateway. If the determination is that the packet frame does exceed a defined size threshold (e.g., 1314 bytes, 1500 bytes, 1600 bytes, or other byte size), then the fragmentation component 2802 can apply a remote WPA2 native fragmentation that creates up to two fragments, for example. Each of these fragments can be less than the threshold size in order to enable processing by the vAP, Data VNF, or other component of the SP network.

In one aspect, one fragment from among two generated can be larger than the other. The two fragments created can comprise a first fragment and a last fragment. Although two fragments are generated here, a number of other fragments can also be envisioned. As part of the fragmentation, the fragmentation component 2802 (or 2904 of FIG. 29 infra) can configure or determine one or more fragmentation criteria in a bit field comprising a fragmentation indicator that indicates whether the vAP payload is fragmented, a first fragment indicator or a last fragment indicator that indicates or identifies each fragment as the first fragment or the last fragment, and a sequence number of a sequence counter that indicates whether the first fragment and the last fragment belong to first packet frame or the second packet frame according to the value or value differential, for example. The CPE then sends these fragments of the packet frame out, which can each be smaller than the size threshold or MTU (e.g., about 1500 bytes, or another size). As such, the traffic will go out, passing through the home gateway via the WPA2 pass-through interface 270.

In one aspect, the packet(s) (packet frame(s)) or another packet can be moved to the next stage (e.g., at platform SoC) for processing similarly to the data flow 1000 discussed with respect to FIG. 10, whereby at 1010 a genetic routing encapsulation (GRE) header can also be added. Packet(s) can be forwarded at 1012 to the wide area network (WAN) interface or CPE WAN link 1014 (e.g., cable/digital subscriber line (DSL)/passive optical network (PON) 290, Ethernet or the like), which can be at least in part in a router of the CPE.

This CPE WAN link 1014, for example, can be the network interface that connects to the SP network 280 (e.g., a cable provider network or the like). As such, the CPE 240, for example, can operate by receiving packets from the wireless interface 1002, adding to them and passing them along to the WAN 1014 to go to the SP network 280 transparently without a modification involving an encryption/decryption by the CPE 240.

Upon receiving the packet(s) from the SP provider network, for example, a similar process can also occur according to another aspect comprising a defragmentation component 2804. Similar to FIG. 10, FIG. 28 continues along the right side in a transmit path 1040 configured for the continued data flow. Along the transmit path 1040, a packet from the WAN at 1016 is received. The received packet can be from the SP network or the CPE 1 link 1014, for example over the cable modem link, and then processed at additional steps. Once the packet is received from the cable modem, for example, the packet(s) can be identified as belonging to the network (community WiFi network) that has been virtualized at the vAP 340. At 1018, a GRE can be stripped from the received packet, as the packet can come from the VNF (e.g., vAP 340) as an IP packet. The packet(s) can then be passed along the transmit path 1040 without the GRE header to the WiFi access point chip (e.g., WAV 500 or like component).

The packet without the GRE header can then be stripped from the received packet, as the packet can come from the VNF (e.g., vAP 340) as an IP packet. The packet can then be passed along the transmit path 1040 without the GRE header to the WiFi access point chip (e.g., WAV 500 or the like component). The WiFi AP chip can then operate at 2804 to perform a determination of whether the packet(s) being received is fragmented. In response to determining that at last a portion of the packet frame is a fragmented or that in indicator of fragmentation has been received or identified, then the packets can be re-assembled or defragmented into a complete packet frame consisting of the two portions or fragments.

Another fragmentation criteria by which the defragmentation component 2804 determines whether defragmentation is performed or not, can comprise data from a sequence counter value indicating whether each fragment is a part of the same frame or a different frame. If a fragment is a part of the same frame as another fragment (e.g., another received fragment in a queue), as well as an indication that fragmentation has occurred of the packet frame, then a defragmentation process can be generated to combine, re-assemble or defragment the packet frame for communicating/transmitting further to the next data flow operation as a whole frame.

In an aspect, the defragment component 2804 can be configured to compare a received fragment with any fragment in a client queue, which can be identified or associated by ID to a particular client or WPA2 pass-through interface from among a plurality of WPA2 pass-through interfaces associated to particular clients, respectively. If a fragment is in the client queue, is identified as being a counterpart fragment (either a first fragment of a packet frame, or a last fragment of the same packet frame with respect to the received fragment) or belonging to the same frame as the received fragment based on the indicated sequence number or value, then the packets can be re-assembled/defragmented into one packet frame. If not, then the queued fragment can be dropped and replaced with the received fragment, for example, or the received fragment could alternatively be dropped instead depending on a priority of each fragment, for example.

If defragmented, the transmit path can then transmit the packet frame at 1022 further along the processing pathway/ pipeline to the air interface 1002. For example, the WiFi AP chip puts the packet without the GRE header in the WiFi transmit queue at 1020 and schedule it for transmission at 1022; as such the CPE does not have to perform further modification to the packet frame.

Figure 29:
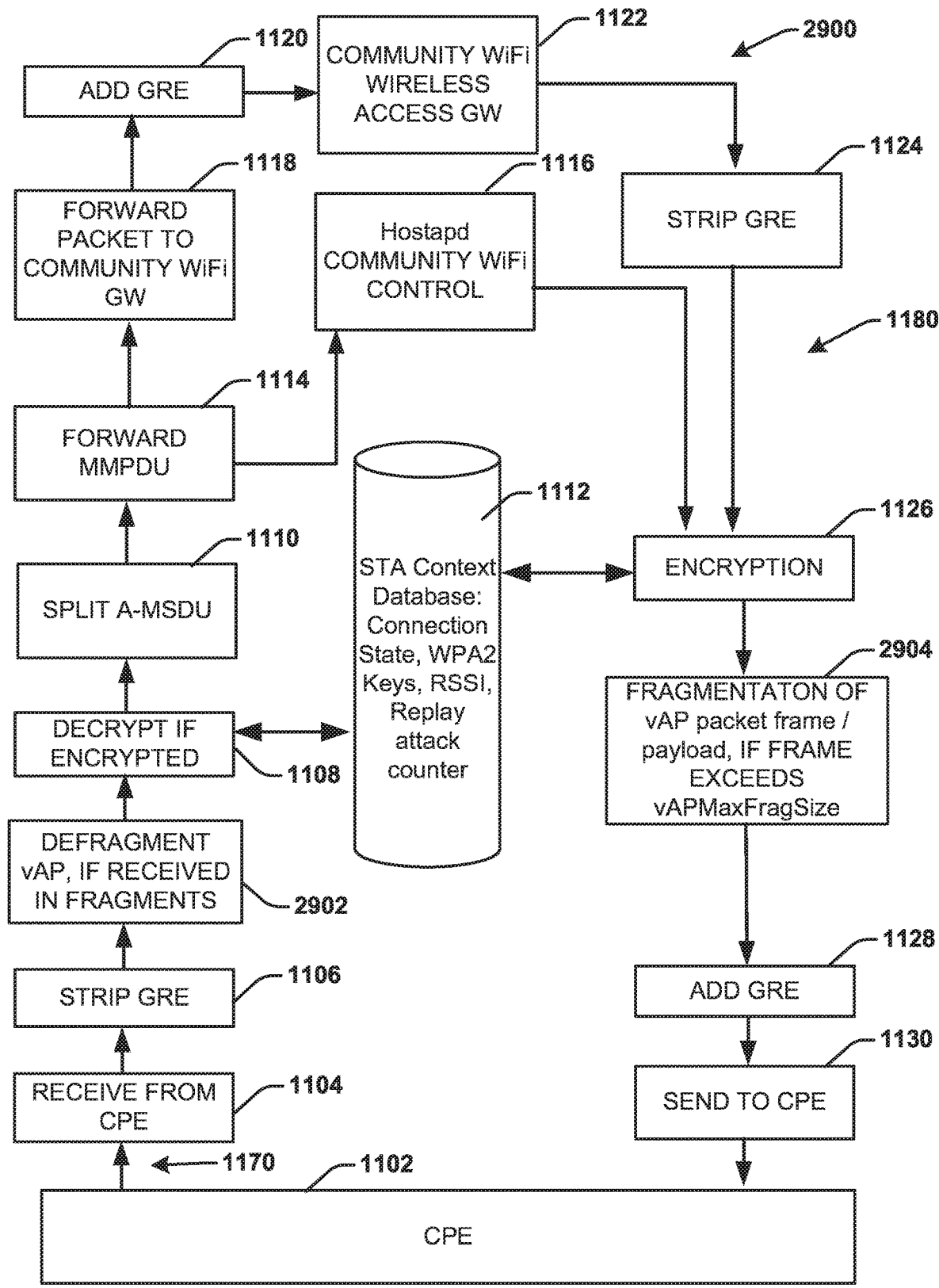
FIG. 29 illustrates an example data flow from a SP network component perspective with fragmentation and defragmentation in accordance with one or more aspects or embodiments described herein.

Referring now to FIG. 29, illustrated is another example data flow 2900 between the CPE 1102 (from the CPE WAN link 1014 of FIG. 10) and the community WiFi wireless access GW 1122 (e.g., the SP network device 202, or any component thereof) in accordance with various aspects or embodiments being described. At least some of the operations can be similar in function and description as that of FIG. 11 above, and similarly from the viewpoint or inputs to the Community Wifi Wireless Access GW 1122 or a vAP at a Data VNF (e.g., vAP 340, data path 526, or set of VNFs 504 of a partition configuration). As such, the acts operating in the VNF (e.g., vAP 340) of the SP network 280 in the vAP or Data VNF where the functions that have been split out from the pAP 302 and implemented as virtual functions in the SP network or SP network device/component 202 are illustrated along the data flow 2900.

The operations at defragmentation component 2902 along the receive path 1170 from the CPE 1102 to the Community Wifi Wireless Access GW 1122, and those of the fragmentation component 2904 along the transmit path 1180 (from the Community Wifi Wireless Access GW 1122 to the CPE 1102) can similarly correspond respectively to operations discussed in the defragmentation component 2804 and fragmentation component 2802, but can be performed in different pathways at a different location by different components at the SP provider network or the Community Wifi Wireless Access GW 1122 (e.g., vAP, in the Data VNF, or other SP component) as fragmentation component 2904 and defragmentation component 2902, or jointly as a native fragmentation/defragmentation layer.

Because the WPA2 pass-through interface 270 (remote WPA2) can increase in frame length by applying tunneling and vAP protocol overheads to the 802.11 frame the resulting frame can be longer than a default MTU size as a fragment size threshold of about 1300 to 1600 bytes (e.g., 1314 bytes, 1500 bytes, 1600 bytes, or greater), the packet may be dropped by network nodes. At the 1102 CPE and D-VNF of the Community Wifi Wireless Access GW 1122 fragmentation and defragmentation components 2904 and 2902 can configure a vAPMaxFragSize as the size threshold configured through CPE and D-VNF config files, for example. This can be used to decide whether to apply Native vAP fragmentation on transmit of vAP structure encapsulated in the GRE. If the vAP structure size or frame size is greater than vAPMaxFragSize, then a fragmentation can be performed. A default value of vAPMaxFragSize can be 1314 bytes, or another size, for example.

A Per STA Context vAPSequenceNumber can be configured in the packet by a counter (e.g., STA context database/counter 1112) with range 0-255 at the fragmentation components (e.g., fragmentation component 2802 or 2904) can be incremented after the use, overlapping to 0 after reaching 255. This counter value as the sequence number value (Per STA Context vAPSequenceNumber) can be used when native vAP fragmentation is applied to indicate that fragments belong to the same vAP structure or packet frame therefrom, especially for, but not limited to, UDP traffic. The remaining or other acts are similar to those described as above in reference to FIG. 11, for example.

Figure 30:
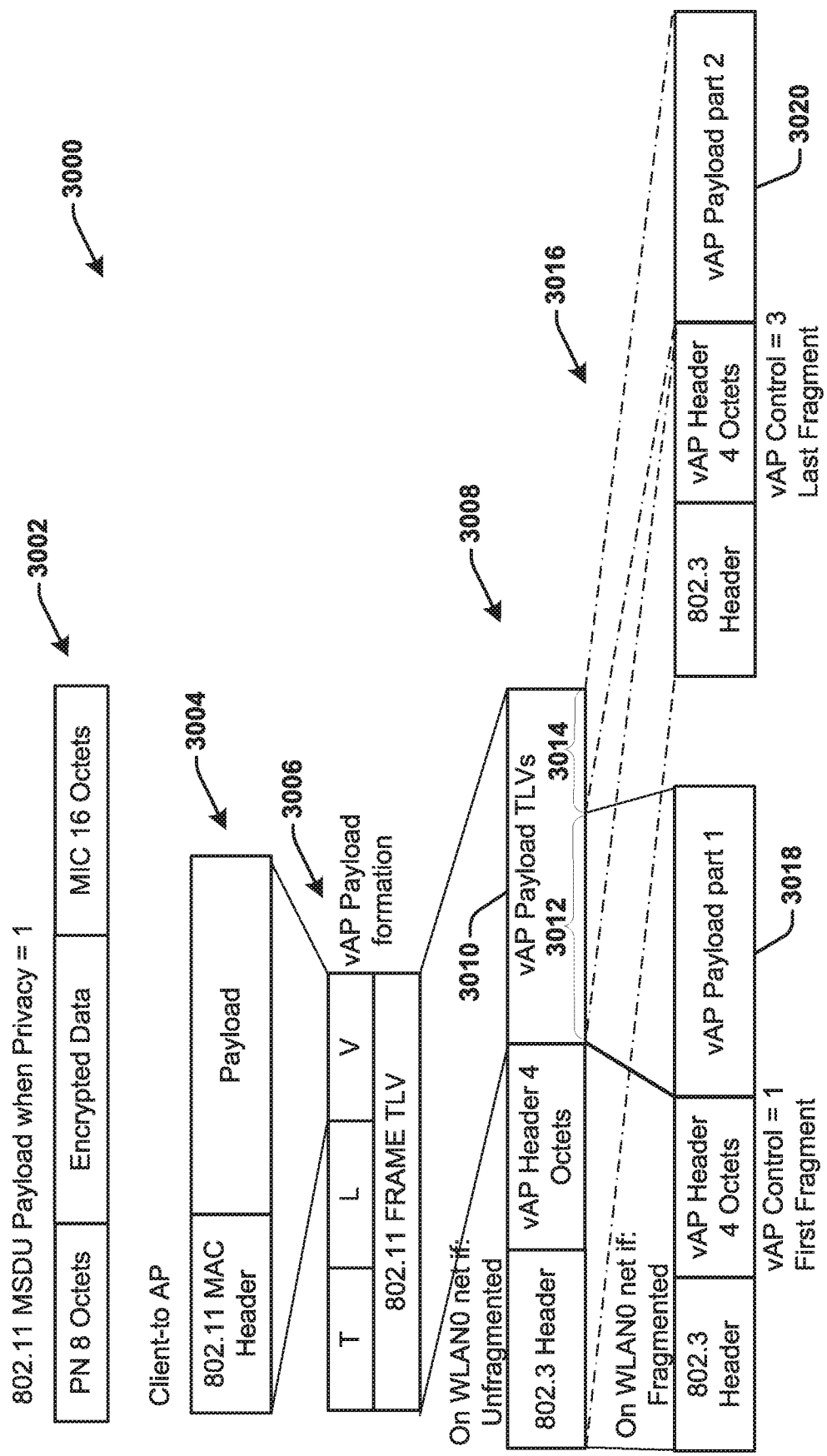
FIG. 30 illustrates packet structures configured with fragmentation and defragmentation in accordance with one or more aspects or embodiments described herein.

Referring to FIG. 30, illustrated is an example of packet frames 3000 at different stages of configuration to illustrate how a packet frame is configured in accordance with embodiments herein along the processing path. The SP network can be configured or enabled at the CPE (e.g., with a network router, ranger extender or other associated network devices/components in a home) and include networks such as a home access network (e.g., a personal area network (PAN)), a community Wi-Fi network that is managed by the SP (e.g., a hot spot (1.0/2.0) or passpoint with a wireless local area network (WLAN)), a local area network (LAN) or the like, in which each network can be associated with or correspond to a different BSSID, for example, for communication via the WPA2 pass-through interface.

The first packet structure 3002 comprises the payload of the 802.11 MSDU (e.g., an aggregated MSDU with a privacy class of 1) as an 802.11 packet payload comprising three fields. The three fields of packet 3002 include an encrypted data in the middle, a packet number (PN) or seed used for seed in encryption and decryption (e.g., about 8 octets), and the message integrity code (MIC) at the end, which authenticates that this is encrypted data encrypted by the sender or identifying the sender. This packet is then transmitted over the air from the client/UE to the AP (e.g., the pAP 302) transmitted in the format of packet structure 3004. This packet structure 1204 has the payload and an 802.11 MAC header appended to this payload. Thus, when a packet or packet frame will be received over the air, it can be in this format.

At the AP CPE 1102, after receiving a packet from a client, it adds on top of it a vAP header, and adds on top of it the 802.3 header as illustrated at the packet frame 3008 after the vAP payload is formed at the packet frame configuration/structure 3006, where the vAP payload comprises a concatenated number of Type, Length, Value (TLV) field structures within the vAP payload TLVs 3010 of the packet frame 3008. Here, the Type can be about two octets (e.g., two sets of 8 bits), the Length can be about two octets, and the Value can be a variable length. The TLV structure formed can be a vAP TLV of Type equal to 0 with an 802.11 frame length equal to L and value of an 802.11 frame equal to V.

At this point, a decision is made at the AP CPE (e.g., 240, etc.) or the Data VNF (e.g., 1312, 1512, 1612, 1712, etc.) as to whether the frame structure 3008 should be fragmented or not. Therefore, if the decision is made to fragment this packet 3008, then from one packet frame, two packets 3016 can be created with the following: a first fragment with vAP payload part 1 (3018) (with vAP Control=1 indicating a First Fragment) and a last fragment with vAP payload part 2 (3020). The first fragment in the Ethernet packet can be a larger size (equal to or less than a size threshold of a packet frame for the WPA2 pass-through interface) compared to the other fragment, and the second fragment, the one with the leftover of the payload, can be a smaller size.

In one example, the vAP packet frame 3008 or the packet vAP payload frame can be about 1300, 1314 bytes, 1500 bytes, 1600 bytes, or other size of bytes. Alternatively, or additionally, other sizes can be envisioned also as the process operates to accommodate variable sizes above and below any size threshold for dynamic adaptability. As such, the results of the fragmentation process can be two fragments 3016: a first fragment and a last fragment with 802.3 headers and vAP headers, respectively 3018 and 3020.

In an aspect, the vAP header can also be redefined in order to signal whether the frame is fragmented and whether each fragment is a first fragment 3018 or a last fragment 3020 with vAP payload part 1 and vAP payload part 2, respectively. As such, this indication can be a part of the criteria used in the receiving node (e.g., the CPE or Data VNF) to determine whether a packet being received or at least a part/portion (fragment) of the frame is fragmented, and configured based on fragmentation at the transmission node (e.g., the CPE or Data VNF).

The fragmentation criteria can also include a priority indication (e.g., a traffic ID frame priority that can govern whether to drop one packet over another within a queue to maintain or provide a certain quality of service (QOS), for example. The CPE 1102 (e.g., CPE 240 as AP CPE, pAP, WAV500 component, or other processing component) receiving data from the Data VNF along the transmit path (e.g., 1040 of FIG. 28) can utilize this criteria for then searching for (e.g., in a queue) or expecting another fragment of the frame. If no other fragment, with similar indication, sequential counter value, or particular differential counter value with respect to another can be found, then the fragment received can be dropped, unless a priority or other condition warrants otherwise. However, if the complimentary fragment of the same frame is identified/found, the defragmentation component (e.g., 2804, or 2902) can re-assemble the fragments: the first and the last fragments, for further transmission and processing thereat or downstream. If not fragmented, then the packet can be further transmitted or processed as is, or without further re-assembly if under the size threshold.

Figure 31:
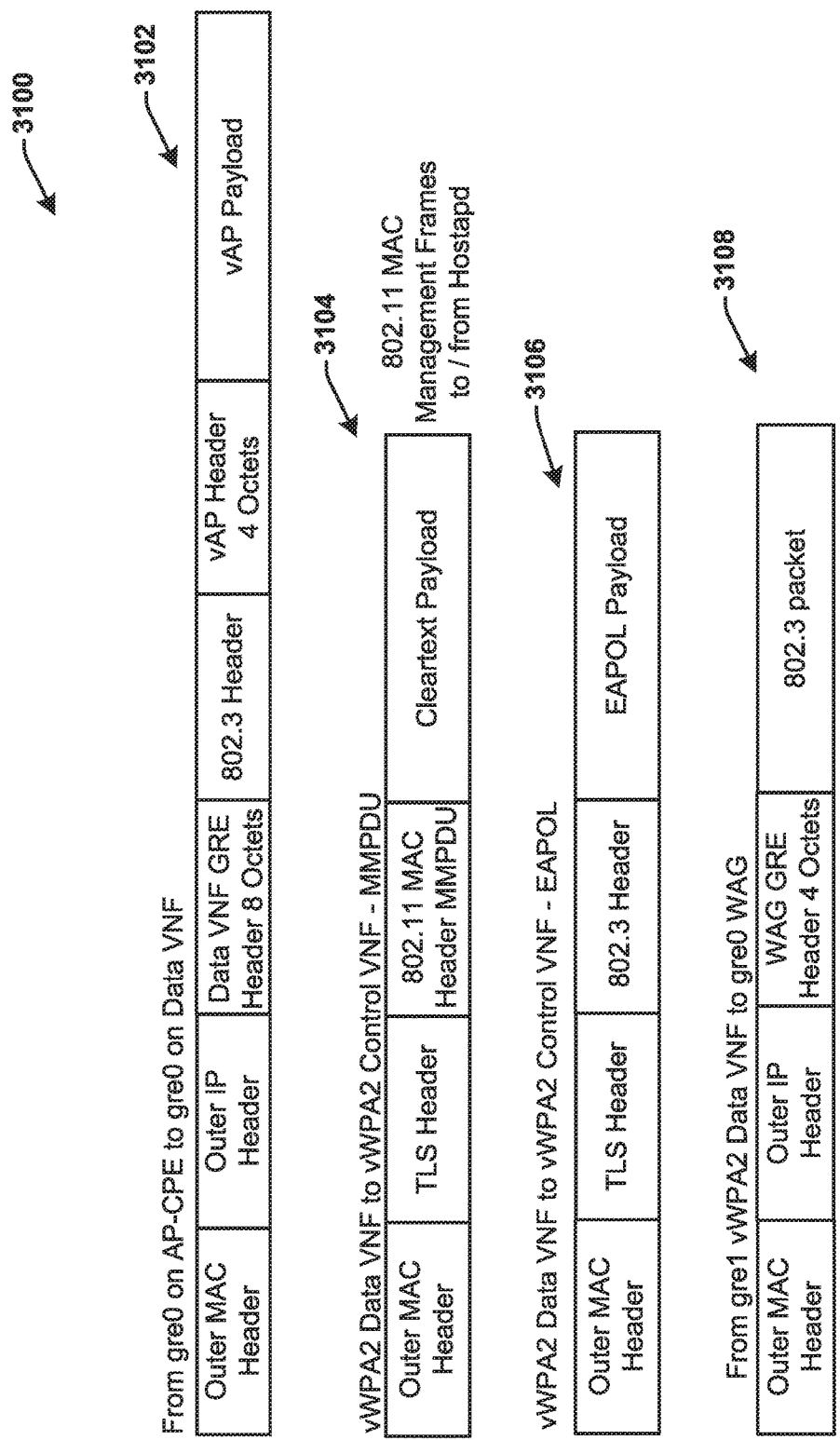
FIG. 31 illustrates packet structures configured with fragmentation and defragmentation in accordance with one or more aspects or embodiments described herein.

Referring to FIG. 31, illustrated is a further example of the data flow continued from FIG. 30. The packet frame 3102 is the result of configuration of the packet frame 3008 or 3016 from the gre0 or GRE component of a bridge device (not shown) at the AP-CPE 1102, where a GRE tunnel is produced from/through the bridge the AP CPE to a gre0 component on the Data VNF of the SP network or community WiFi wireless access GW 1122. As such, an outer MAC header, an outer IP header, and a GRE header (Data VNF GRE Header of 8 octets) can then be added to the encapsulated structure at 3008 or 3016. This is then the full packet frame structure 3008 or fragments 3016 to be sent from the AP CPE thru the Home gateway thru the data VNF in this format in a WPA2 pass-through mode, and then the GRE tunnel can be added thru home gateway or to the Data VNF.

From the Data VNF at the SP network device the packet configuration can be structured as the packet frame configuration 3104 as a part of transport layer security (TLS) thereat with a TLS header and an 802.11 MAC header for management MPDU or MAC management packet data unit (MMPDU). A clear text payload can also be configured as a part of the packet frame 3104 for 802.11 MAC management frames to be communicated to/from the Hostapd 1116 of FIG. 11 or FIG. 29.

Packet frame configuration 3106 can represent the virtual WPA2 (vWPA2) to vWPA2 control VNF for Extensible Authentication Protocol (EAP) over local area network (LAN) (EAPOL). In this packet frame 3106, an outer MAC header, a TLS header, an 802.3 header and an EAPOL payload can be communicated from the vWPA2 Data VNF of the SP network device or the SP network to the Control VNF of the SP network to establish authentication.

Finally, the data VNF (e.g., the vAP, or a component thereof) of the SP network can communicate to the WAG (e.g., 1618) with the packet frame configuration 3108. This packet 3108 includes an outer MAC header, an outer IP header, a WAG GRE header of about 4 octets and the 802.3 packet.

The various data structures of FIGS. 30 and 31 can be processed, appended, fragmented or defragmented in the fragmentation/defragmentation components 2802, 2804, 2902, and 2904, according to the inputs and outputs of each, as illustrated.

Figure 32:
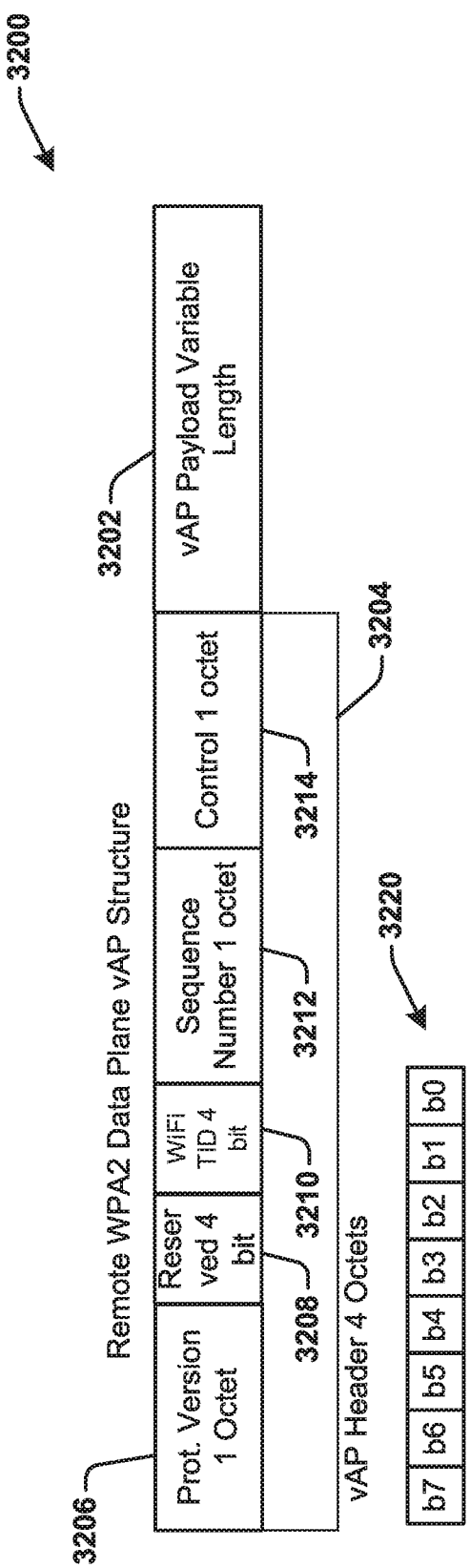
FIG. 32 illustrates a virtual access point (vAP) packet structures for fragmentation and defragmentation in accordance with one or more aspects or embodiments described herein.

Referring to FIG. 32, illustrated is another example of the packet frame 3200 structure as a remote WPA2 data plane vAP structure in accordance with various aspects. The packet frame 3200, for example, can relate to the packet frame(s) 3008 and 3016 of FIG. 30, which can be processed respectively depending on the respective receive and transmit paths of the AP CPE and Data VNF of the SP network described herein.

For example, the vAP payload variable length 3202 can be the vAP payload 3010, 3018 or 3020 of FIG. 30, for example, as a part of the packet frame that is examined for fragmentation or defragmentation at the AP CPE (e.g., 240) or at the Data VNF (e.g., 1312, etc.) of the SP network along the WPA2 pass-through interface 270, for example.

The vAP header 3204 or as referenced elsewhere herein that can be defined as four octets and only the first byte has been defined as a protocol version 3206 (e.g., Protocol Version=0), and the remainder can be reserved, or re-defined as for embodiment/aspects being described for native fragmentation in WPA2 pass-through virtualization protocols or acts as described. The further vAP header 3204 structure can comprise three other bytes defined differently.

The right most byte can be a control 3214 that can be bit field 3220 that is a size of one octet, for example. The max min count or least min bytes can be considered the control 3214, and a bit field 3220 of 8 bits. The bits zero (e.g., b0) and bit one (b1) can indicate whether the packet is fragmented and whether it is the first fragment or the last fragment. So bit zero can be an indication of the particular fragment. Thus, if set to one, then the vAP payload is fragmented, but if to zero, then it is not fragmented. If not fragmented, then no additional treatment is needed. If it is fragmented, then it could be either a first or last fragment, and the packet frame can be sent in two packets: one long and one short, where the receiving side (either the data VNF or the CPE) would reassemble/defragment it with defragment component 2804 or 2902 accordingly.

The decision to fragment or not by fragmentation components 2802 and 2904 can include checking/evaluating the resulting packet size when applied with all the overheads, headers or encapsulation (with the threshold that is defined as vAPMaxFragSize that is configured on both the CPE and data VNF as a static or dynamic setting). The packet frame is checked against this vAPMaxFragSize; if higher, then the packet could be fragmented.

In one embodiment, the packet can be fragmented if the payload is higher than about 1314 bytes as a size threshold. Alternatively or additionally, other size thresholds can also be envisioned, such as about 1500 bytes, 1600 bytes or another MTU.

If a packet frame is fragmented into fragments, then a signal or indication can be generated by the CPE or the data VNF or SP network device that a portion or fragment is a fragment and whether it is a first fragment or a last fragment of a particular packet frame. For example, bit zero (b0) can indicate whether fragmented with a one indicating fragmented, and zero it is not, while bit one (b1) for the control bit field 3220 can indicate whether it is a first fragment or last fragment. If zero, it is first fragment and if one it is the last fragment.

Another field or a second field from the right in the vAP header 3204 is the sequence number field 3212. It can be one octet, and utilized if fragmentation occurs, and the payload is fragmented. Depending on the location of the operation, at the CPE, the Data VNF, or both each respective component or device can increment a sequence number counter and send this value as a sequence number counter value in this field, which is used to provide a sequence number and is incremented to identify fragments that belong to the same frame.

The sequence number counter (vAPSequenceNumber counter) can have 256 values per STA or client, the maximum value being 255 and it can overlap. Essentially, it supports this algorithm to 256 fragmentation operations per client at the CPE and data VNF, and then can start over again at an initial value of zero. As such, the sequence number is a variable per client at access point that is called vAP sequence number (Per STA Context vAPSequenceNumber) and is a counter. The Per STA Context vAPSequenceNumber can be incremented with the value of the counter, in which the value in this field 3212 (Sequence number) can alternatively or additionally comprise a value of all the fragments that are created from this frame; it can be used when native vAP fragmentation is applied to indicate that fragments belong to the same vAP structure.

The sequence number can be utilized by the CPE (e.g., 240) and the data VNF (e.g., 340) for the purpose of managing any lost packets on the receiving side of the WPA2 pass-through interface. For example, some of the traffic data in the course of transmission can normally be lost along the way. As such, in order to defragment in the traffic two fragments should be received if fragmentation is performed at the transmission side. Thus, fragments of packet frames could belong to different packet frames, but the sequence number of the fragments can be used to track whether re-assembly can be performed with original integrity of each packet frame. For example, if an identified first fragment is received with sequence number 10, and then an identified last fragment with sequence number 11 is received, then definitely the last fragment with sequence No 10 and the first fragment with sequence 11 can be determined as lost along transmission. In this example, re-assembly or defragmentation would not be done and the fragments received could be dropped because some a significant data part has been lost with respect to the packet frame.

The third field structure 3210 can be defined as a WiFi TID (traffic ID). Thus, WiFi frames can be prioritized by holding in the WiFi header information that is called WiFi TID. The WiFi TID can be 4 bits, indicating the frame priority from zero to fifteen, for example. Because encapsulated frames would be remote WPA2 would hold 802.11 frames, these can be marked with a priority to show this information as early as possible in order for the A-CPE and D-VNF to be put it in the proper priority or client queue with proper priority. Thus the content of the field 3210 can be occupied with a value of the QOS data or a QOS control field. As a rule of use, the value of the TID from the QOS control field of 802.11 frame TLV can be copied to this field 3210. The remaining four bits 3208 can be unused and marked as reserved.

Figure 33:
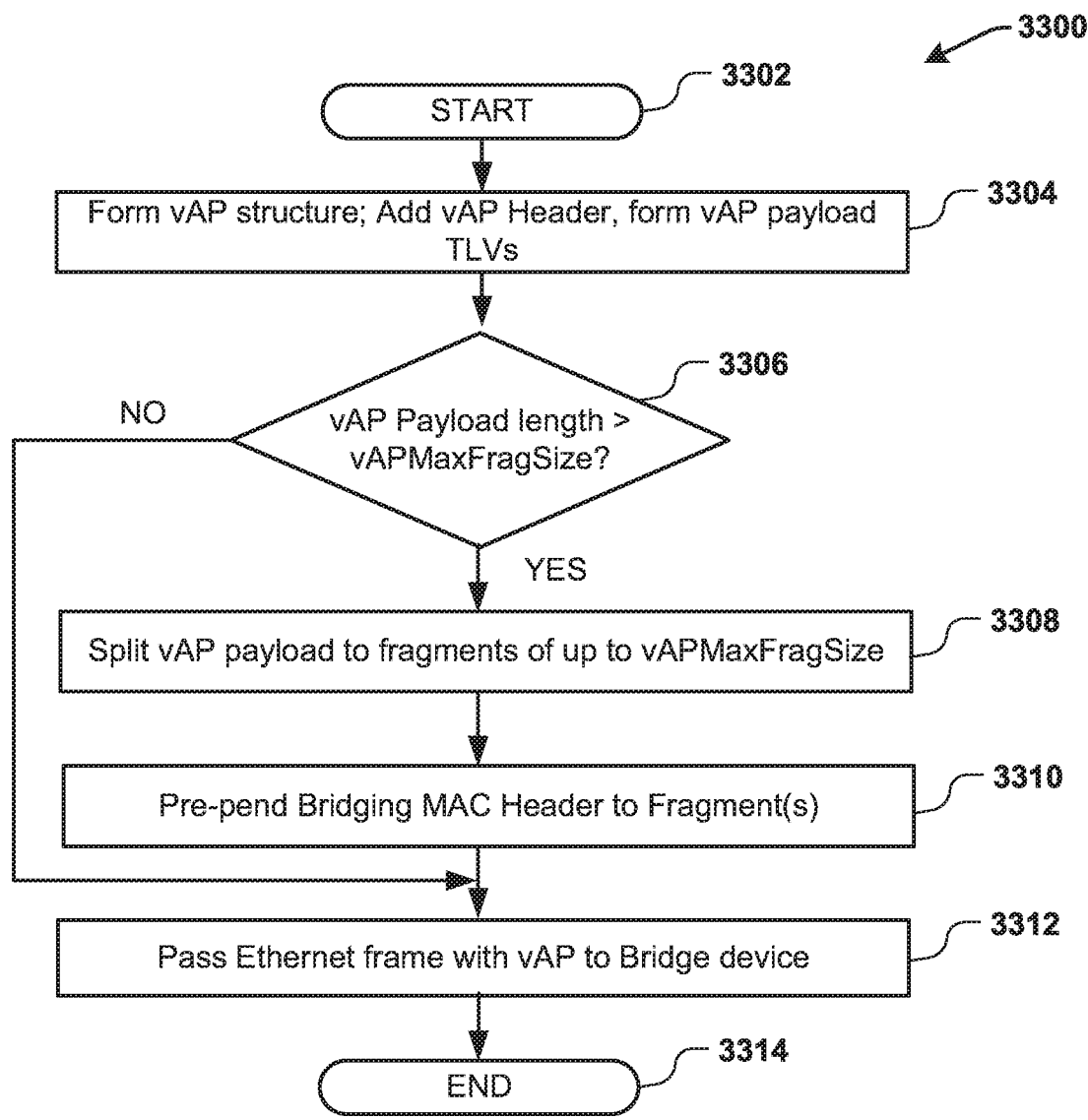
FIG. 33 illustrates a virtual fragmentation protocol in accordance with one or more aspects or embodiments described herein.

Referring now to FIG. 33, illustrated is native fragmentation/defragmentation overall processing at the CPE or AP-CPE in accordance with aspects herein. At the AP-CPE (e.g., CPE 240) a decision is made to perform fragmentation for the traffic that is coming from the client, and to do defragmentation on the traffic coming from the data VNF. In contrast, the data VNF decides whether to perform defragmentation on the data coming from the AP-CPE, and to perform fragmentation of the traffic coming from the WiFi access gateway in similar fashion.

The process flow 3300 initiates at start 3302 in response to a packet coming from the client (e.g., UE, WAG or other network device) from the WiFi Airlink (e.g., 1002 of FIG. 28), where the packet is received from the air. The packet is then shaped at 3304 if it is not dropped; for different reasons described elsewhere herein it could be dropped. As such, the packet frame could have metadata added, for example (as at 1008 of FIG. 28). Then at the node 2802 being considered at the process flow 3300, the last point after adding metadata, at 3304 vAP structure can be formed and fragmented.

At 3306, the decision is generated to determine whether to perform fragmentation of a packet frame (as fragmented frames 3016 of FIG. 30, or unfragmented 3008). If it is determined that the packet (WPA2 packet frame(s)) to be sent out, transmitted or forwarded along this remote WPA2 packet, will be longer than the fragmentation size threshold (vAPMaxFragSize) that can be set in the variable V, and it should be fragmented as a result, then create two packet fragments are created as a long and short fragment at 3308 based on and up to the vAPMaxFragSize. These packet fragments are then passed farther along to have added to it each one of these fragments: IP tunneling GRE header, and IP header (e.g., as at the structure 3102 of FIG. 31 gre0 on AP-CPE to gre0 on D-VNF).

An indication of a sequence number value, an indication of fragmentation, whether each fragment is a first fragment or a last fragment, as well as a priority (TID) can further be configured in the control byte 3214, for example, to be sent in the packet frame. If fragmented, the sequence counter then can be incremented. As discussed above, the vAPSequenceNumber as the sequence number can be also identified according to the client, on a per client basis (or per network device basis for each WPA2 pass-through tunnel generated) and further inserted to a vAP Header Sequence Number field (e.g., Sequence Number field 3212 of FIG. 32).

At 3310, for example, the CPE can then pre-pend a bridging MAC header to each fragment and forward it to the gateway and go to the D-VNF for further processing. At 3312, a bridge or router device coupled to or a part of the CPE can receive each Ethernet packet frame with vAP packet to bridge. If the decisions to fragment the packet frame is no, then the process continues from decision 3306, to 3310 directly. At 3312, the process flow 3300 can end with respect to fragmentation 2802.

On the receive end, the CPE can strip GRE header and further analyze it, as described above with respect to FIG. 28 as well. If the packet data has been fragmented as determined by an indication that it is fragmented, and where it is a first or a last fragment, in this vAP control structure, then defragmentation is performed as further illustrated with respect to FIG. 34. Then the vAP structure is then extracted to get it to the 802.11 frame and the packet is further sent out.

The process flow 3300 is similar in the data VNF, where the traffic is being received from the AP-CPE, for vAP defragmentation if received in fragments as a logical block, and also vAP fragmentation, if frame exceeds vAP MaxFragSize (on the transmit path).

Figure 34:
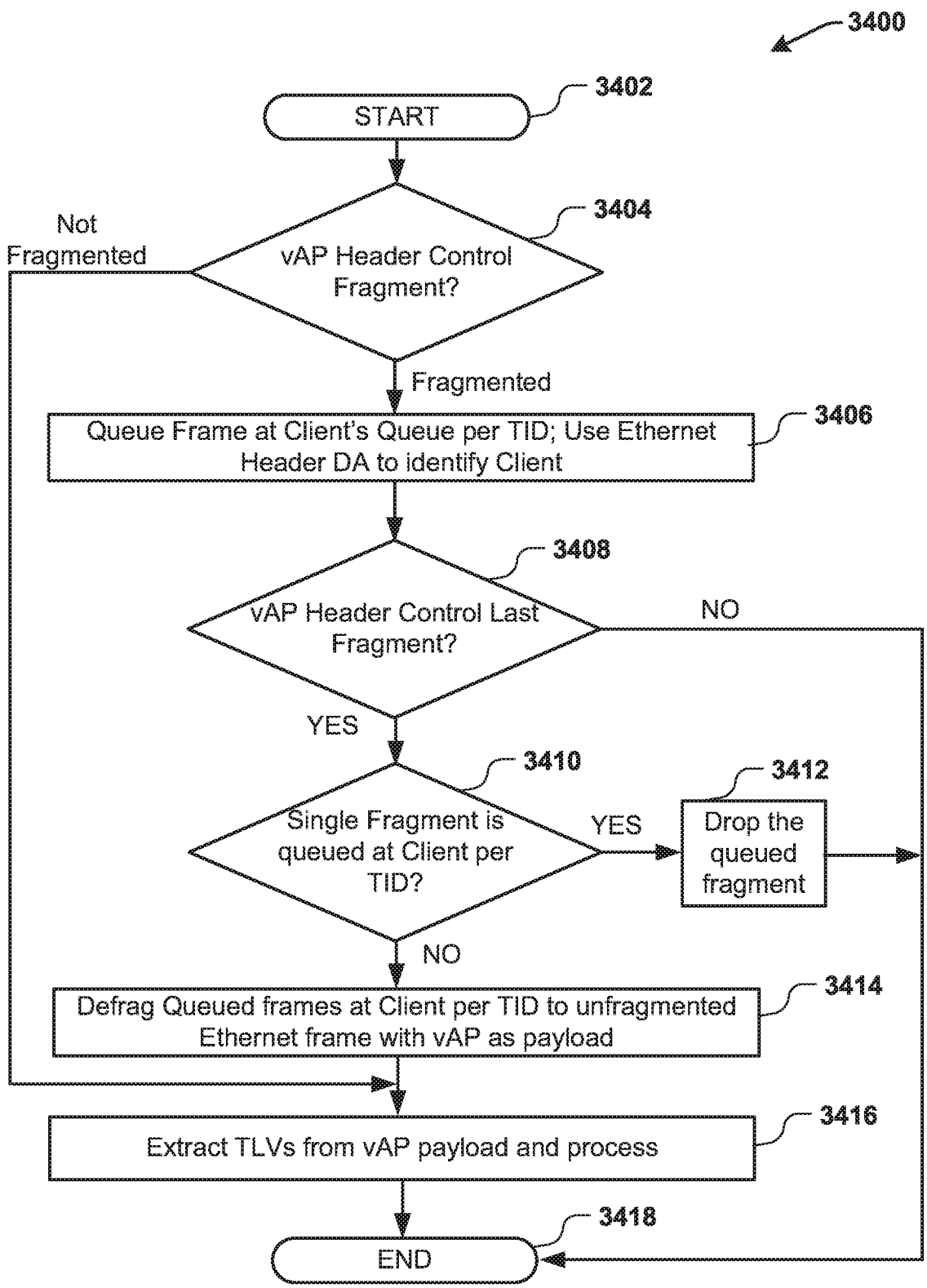
FIG. 34 illustrates a virtual defragmentation protocol in accordance with one or more aspects or embodiments described herein.

Referring to FIG. 34, illustrated is another process flow 3400 where the traffic is received either from the gateway and to the data VNF or from the data VNF of the SP network, and defragmentation is performed if fragmented.

The process flow 3400 starts at 3402 with receiving from the previous block where the vAP structure is formed from the 802.11 frame that has been received from the client, which can be configured with an indication of whether the packet frame is fragmented. At 3402, a decision is then made about the received packet frame as to whether is fragmented, either from the indication or other fragmentation criteria, for example, such as being a partial payload or particular length, or other indication. At 3404, the AP-CPE receives such packet and examines the vAP Header Control Fragmenting as to whether or not it is fragmented. If indicated that it is not fragmented then the process flow continues at 3414 with extracting the TLVs from the payload with any further processing and ends at 3418, without performing defragmentation by removing the overhead, getting the 802.11 frame and sending it to the client (e.g., UE, WAG or other network device).

However, if there is an indication that the packet frame being received has been fragmented, operations are performed to ensure two packet fragments, first fragment and last fragment of the same packet frame, are re-assembled. Thus, at 3406 the frame or fragment(s) can be queued at a Client's queue associated with a particular WPA2 pass-through with a particular identified client according to a priority TID indication. As such, the Ethernet header destination address (DA) can be used to identify the client.

Once a first fragment is queued, a decision 3408 is made as to whether the last fragment is available in the client queue or is being received. If yes, then a decisions 3410 is performed to examine whether both first and second fragments are obtained. If yes, then the process flows to 3414 to defragment the queued frames or fragments by a re-assembly from the client queue per TID to an unfragmented Ethernet frame with the vAP as a payload. Then at 3416, the TLVs are extracted from the vAP payload and further processed accordingly.

If only a single fragmented is queued for a client per TID, then the process flow continues to 3412 where the queued fragment is dropped. Based on the TID, the queued fragment can be stored, or replaced with the one received, for example. An examination of the queued fragment with the received fragment to determine whether it is of the same frame, or not, can be based on the sequence number as described herein. If they do not belong to the same fragmented frame because it could be that some fragments may have been dropped along the way, and this is identified by the sequence number, the queued fragment can be dropped so that two fragments are not assembled that belong to different packets. If only a single fragment of a frame is received within a time period, for example, the fragment can be dropped at 3412 and the process flow ends at 3418.

The fragmentation and defragmentation that happens on the D-VNF, is similar to the same operations at the AP-CPE with nearly the same logic.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

A first example can be an apparatus configured to be employed in a customer premise equipment (CPE), comprising: a physical access point (pAP) comprising one or more processors configured to: enable a community WiFi network for communication with a user equipment (UE); initiate a WiFi protected access 2 (WPA2) pass-through interface through the pAP by connecting the community WiFi network associated with an SP network at a virtual access point (vAP) to transparently communicate packet data on packet frames; provide at least one of: a first packet frame to the vAP of the SP network, or a second packet frame from the vAP, via the WPA2 pass-through interface; and determine at least one of: whether to fragment the first packet frame based on a packet size threshold, or whether to defragment the second packet frame based on one or more fragmentation criteria; a communication interface, coupled to the one or more processors, configured to receive or transmit the packet data with the vAP of the SP network.

A second example can include the subject matter of the first example, wherein the one or more processors are further configured to receive the first packet frame, and fragment the first packet frame in response to the first packet frame being greater than the packet size threshold.

A third example includes the subject matter of any one or more of the first example thru the second example, wherein one or more processors are further configured to fragment the first packet frame by splitting the first packet frame into two segments comprising a first fragment and a last fragment that are less than a size of the packet size threshold, respectively, wherein at least one fragment of the first fragment and the last fragment is larger than an other fragment of the first fragment and the last fragment.

A fourth example includes the subject matter of any one or more of the first example thru the third example, wherein the one or more processors are further configured to configure in the first packet frame, or determine in the second packet frame, the one or more fragmentation criteria in a bit field comprising a fragmentation indicator that indicates whether a vAP payload is fragmented, a first fragment indicator or a last fragment indicator that indicates the first fragment or the last fragment, and a sequence number that indicates whether a first fragment and a last fragment belong to first packet frame or the second packet frame.

A fifth example includes the subject matter of any one or more of the first example thru the fourth example, wherein the one or more processors are further configured to: defragment the first fragment and the last fragment by a re-assembly into the second packet frame in response to the first fragment and the last fragment being identified as belonging to a same packet frame; and drop the first fragment and the last fragment in response to the first fragment and the last fragment being identified as belonging to different packet frames.

A sixth example includes the subject matter of any one or more of the first example thru the fourth example, wherein the one or more processors are further configured to process, or drop, one or more fragments of the second packet frame based on a fragmentation indicator and an associated sequence number derived from a sequence counter.

A seventh example includes the subject matter of any one or more of the first example thru the eighth example, wherein the packet size threshold comprises a maximum signal frame size/length that the vAP is configured to process, and wherein the pAP is configured to communicate UDP traffic with the WPA2 pass-through interface in a packet frame that is larger than the maximum signal frame size/length to and from the vAP.

An eighth example includes an apparatus configured to be employed in a service provider (SP) network device of an SP network, comprising: one or more processors configured to: receive a first packet frame, and form a second packet frame, associated with a community WiFi network through a WiFi protected access 2 (WPA2) pass-through interface, wherein the WPA2 pass-through interface is coupled to a data virtual network function (D-VNF) at a virtual access point (vAP) of the SP network device based on a virtual network function (VNF) of a physical access point (pAP) at a customer premise equipment (CPE); and generate a determination of whether the first packet frame received through the WPA2 pass-through interface is fragmented, and whether a length of the second packet frame formed is greater than a packet size threshold; a communication interface, coupled to the one or more processors, configured to receive or transmit communication transmissions based on the determination.

A ninth example includes the subject matter of the eighth example, wherein the one or more processors are further configured to: in response to the first packet frame through the WPA2 pass-through being fragmented, and a first fragment and a last fragment belonging to a same packet frame, re-assembling the first fragment and the last fragment into a vAP payload of the packet frame.

A tenth example includes the subject matter of any one or more of the eighth example thru the ninth example, wherein the one or more processors are further configured to drop a queued fragment in response to a fragment of the first packet frame being received corresponding to a different packet frame based on a sequence number value of the received fragment and the queued fragment, and replacing the queued fragment in a client queue with the received fragment.

An eleventh example includes the subject matter of any one or more of the eighth example thru the tenth example, wherein the one or more processors are further configured to determine the length of the second packet frame by determining whether a payload of the second packet frame is greater than the packet size threshold, wherein the packet size threshold comprises a maximum signal frame size that the vAP is configured to process for any one packet frame, and, in response to being greater than the packet size threshold, fragment the second packet frame into no more than two fragments before forwarding via the WPA2 pass-through interface.

A twelfth example includes the subject matter of any one or more of the eighth example thru the eleventh example, wherein the two fragments comprise a first fragment and a last fragment of the second packet frame, with one fragment of the two fragments comprising a larger size than an other fragment, and wherein the first fragment and the last fragment comprise sizes less than or equal to the packet size threshold.

A thirteenth example includes the subject matter of any one or more of the eighth example thru the twelfth example, wherein the one or more processors are further configured to pre-pend a vAP header to the first fragment and the last fragment of the two fragments, and provide in the vAP header a fragmentation indicator that indicates fragmentation of the second packet frame and an associated sequence number derived from a sequence counter that indicates an association with the second packet frame for the first fragment and the last fragment.

A fourteenth example includes the subject matter of any one or more of the eighth example thru the thirteenth example, wherein the one or more processors are further configured to: receive one of a first fragment or a last fragment of at least one packet frame; store the one of the first fragment or the last fragment based on a traffic identifier (TID) associated with the pAP in a client queue; receive another one of the first fragment or the last fragment; determine whether the first fragment and the last fragment belong to a same packet frame based on a sequence number of a sequence counter; in response to the first fragment and the last fragment belonging to the same packet frame, defragmenting the first fragment and the last fragment into the same packet frame; and in response to the first fragment and the last fragment belonging to different packet frames based on associated sequence numbers, replacing the one of the first fragment or the last fragment in the client queue with the another one of the first fragment or the last fragment.

A fifteenth example includes the subject matter of any one or more of the eighth example thru the sixteenth example, wherein the one or more processors are further configured to determine whether the fragments of the packet frame are from a same packet frame by referencing a client queue corresponding to the pAP according to a TID and determine whether a first sequence number of a first fragment corresponds to a last sequence number of a last fragment of the first packet frame.

A sixteenth example includes the subject matter of any one or more of the eighth example thru the fifteenth example, wherein the one or more processors are further configured to: in response to the length of the second packet frame through the WPA2 pass-through interface comprising a length that is greater than a packet size threshold, fragment the packet frame or the another packet frame into two fragments.

A seventeenth example includes a non-transitory computer-readable storage medium storing executable instructions that, in response to execution, cause one or more processors of a service provider (SP) network device to perform operations comprising: providing a WiFi protected access 2 (WPA2) pass-through interface via a customer premise equipment (CPE) to a user equipment (UE) and between a virtual access point (vAP) of an SP network and a physical access point (pAP) of a customer premise equipment (CPE) transparently to the pAP and the vAP; and receiving, via the WPA2 pass-through interface, at least a portion of a packet frame, wherein the packet frame is associated with a community WiFi network of the CPE; generating a determination of whether the packet frame in the WPA2 pass-through interface is fragmented based on a fragmentation indicator; and re-assembling the packet frame with the at least the portion of the packet frame based on one or more fragmentation criteria in response to the packet frame being fragmented.

A eighteenth example includes the subject matter of the seventeenth example, wherein the operations further comprise: determining whether a size or length of another packet frame being formed is greater than a packet size threshold comprising a maximum signal frame size that the vAP is configured to process for any one packet frame.

A nineteenth example includes the subject matter of any one or more of the seventeenth example thru the eighteenth example, wherein the operations further comprise: in response to the another packet frame being greater than the packet size threshold, fragmenting the another packet into a first fragment and a last fragment before forwarding via the WPA2 pass-through interface; and associating the first fragment and the last fragment to a same packet frame based on a sequence number of a vAP sequence number counter that is identified with a client identifier (ID) associated specifically with the CPE coupled to the WPA2 pass-through interface.

A twentieth example includes the subject matter of any one or more of the eighteenth example thru the nineteenth example, wherein the at least the portion of the packet frame is received from the pAP and the another packet frame is formed for the WPA2 pass-through interface with payload data received at least in part from a wireless access gateway (WAG).

A twenty-first example includes a system configured to be employed in a service provider (SP) network, comprising: a customer premise equipment (CPE) comprising a physical access point (pAP) configured to provide a community WiFi network for communication with a user equipment (UE); and a data virtual network function (D-VNF) at a virtual access point (vAP) of the SP network based on a virtual network function (VNF) of the physical access point (pAP), wherein the D-VNF is coupled to the pAP by a WiFi protected access 2 (WPA2) pass-through interface configured to transparently communicate packet data on packet frames therebetween; wherein the CPE and the D-VNF are configured to enable communication of different sizes of packet frames through the WPA2 pass-through interface, including packet frames comprising a size that is larger than a packet size threshold that the vAP is configured to process.

A twenty-second example includes the subject matter of the twenty-first example, wherein the CPE and the D-VNF are configured to separately determine whether a packet frame being received thereat is to be re-assembled from different fragments, and whether another packet frame being formed for the WPA2 pass-through interface is to be fragmented based on the packet size threshold.

Other examples of the various aspects/embodiments herein can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Examples can include an apparatus comprising means to perform one or more elements of a method described in or related to any of examples (embodiments) above, or any other method or process described herein.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

Examples can include an apparatus comprising logic, modules, or circuitry to perform one or more elements of a method described in or related to any of examples above, or any other method or process described herein.

Examples can include a method, technique, or process as described in or related to any of examples above, or portions or parts thereof.

Examples can include an apparatus comprising: one or more processors and one or more computer readable media comprising instructions that, when executed by the one or more processors, cause the one or more processors to perform the method, techniques, or process as described in or related to any of examples above, or portions thereof.

Examples can include a method of communicating in a wireless network as shown and described herein.

Examples can include a system for providing wireless communication as shown and described herein.

Examples can include a device for providing wireless communication as shown and described herein.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated mobile or personal computing devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques, such as millimeter wave bands in the range of 30 GHz to 300 GHz, for example.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a customer premise equipment (CPE), comprising:
a physical access point (pAP) comprising one or more processors configured to:
enable a community WiFi network for communication with a user equipment (UE);
initiate a WiFi protected access 2 (WPA2) pass-through interface through the pAP by connecting the community WiFi network associated with an SP network at a virtual access point (vAP) to transparently communicate packet data on packet frames;
provide at least one of: a first packet frame to the vAP of the SP network, or a second packet frame from the vAP, via the WPA2 pass-through interface; and
determine at least one of: whether to fragment the first packet frame based on a packet size threshold, or whether to defragment the second packet frame based on one or more fragmentation criteria;
a communication interface, coupled to the one or more processors, configured to receive or transmit the packet data with the vAP of the SP network.

2. The apparatus of claim 1, wherein the one or more processors are further configured to receive the first packet frame, and fragment the first packet frame in response to the first packet frame being greater than the packet size threshold.

3. The apparatus of claim 2, wherein the one or more processors are further configured to fragment the first packet frame by splitting the first packet frame into two segments comprising a first fragment and a last fragment that are less than a size of the packet size threshold, respectively, wherein at least one fragment of the first fragment and the last fragment is larger than an other fragment of the first fragment and the last fragment.

4. The apparatus of claim 1, wherein the one or more processors are further configured to configure in the first packet frame, or determine in the second packet frame, the one or more fragmentation criteria in a bit field comprising a fragmentation indicator that indicates whether a vAP payload is fragmented, a first fragment indicator or a last fragment indicator that indicates a first fragment or a last fragment, and a sequence number that indicates whether the first fragment and the last fragment belong to the first packet frame or the second packet frame.

5. The apparatus of claim 4, wherein the one or more processors are further configured to:
defragment the first fragment and the last fragment by a re-assembly into the second packet frame in response to the first fragment and the last fragment being identified as belonging to a same packet frame; and
drop the first fragment and the last fragment in response to the first fragment and the last fragment being identified as belonging to different packet frames.

6. The apparatus of claim 1, wherein the one or more processors are further configured to process, or drop, one or more fragments of the second packet frame based on a fragmentation indicator and an associated sequence number derived from a sequence counter.

7. The apparatus of claim 1, wherein the packet size threshold comprises a maximum signal frame size/length that the vAP is configured to process, and wherein the pAP is configured to communicate UDP traffic with the WPA2 pass-through interface in a packet frame that is larger than the maximum signal frame size/length to and from the vAP.

8. An apparatus configured to be employed in a service provider (SP) network device of an SP network, comprising:
one or more processors configured to:
receive a first packet frame, and form a second packet frame, associated with a community WiFi network through a WiFi protected access 2 (WPA2) pass-through interface, wherein the WPA 2 pass-through interface is coupled to a data virtual network function (D-VNF) at a virtual access point (vAP) of the SP network device based on a virtual network function (VNF) of a physical access point (pAP) at a customer premise equipment (CPE); and
generate a determination of whether the first packet frame received through the WPA2 pass-through interface is fragmented, and whether a length of the second packet frame formed is greater than a packet size threshold;
a communication interface, coupled to the one or more processors, configured to receive or transmit communication transmissions based on the determination.

9. The apparatus of claim 8, wherein the one or more processors are further configured to:
in response to the first packet frame through the WPA2 pass-through interface being fragmented, and a first fragment and a last fragment belonging to a same packet frame, re-assembling the first fragment and the last fragment into a vAP payload of the packet frame.

10. The apparatus of claim 9, wherein the one or more processors are further configured to drop a queued fragment in response to a fragment of the first packet frame being received corresponding to a different packet frame based on a sequence number value of the received fragment and the queued fragment, and replacing the queued fragment in a client queue with the received fragment.

11. The apparatus of claim 8, wherein the one or more processors are further configured to determine the length of the second packet frame by determining whether a payload of the second packet frame is greater than the packet size threshold, wherein the packet size threshold comprises a maximum signal frame size that the vAP is configured to process for any one packet frame, and, in response to being greater than the packet size threshold, fragment the second packet frame into no more than two fragments before forwarding via the WPA2 pass-through interface.

12. The apparatus of claim 11, wherein the two fragments comprise a first fragment and a last fragment of the second packet frame, with one fragment of the two fragments comprising a larger size than an other fragment, and wherein the first fragment and the last fragment comprise sizes less than or equal to the packet size threshold.

13. The apparatus of claim 12, wherein the one or more processors are further configured to pre-pend a vAP header to the first fragment and the last fragment of the two fragments, and provide in the vAP header a fragmentation indicator that indicates fragmentation of the second packet frame and an associated sequence number derived from a sequence counter that indicates an association with the second packet frame for the first fragment and the last fragment.

14. The apparatus of claim 8, wherein the one or more processors are further configured to:
  receive one of a first fragment or a last fragment of at least one packet frame;
  store the one of the first fragment or the last fragment based on a traffic identifier (TID) associated with the pAP in a client queue;
  receive another one of the first fragment or the last fragment;
  determine whether the first fragment and the last fragment belong to a same packet frame based on a sequence number of a sequence counter;
  in response to the first fragment and the last fragment belonging to the same packet frame, defragmenting the first fragment and the last fragment into the same packet frame; and
  in response to the first fragment and the last fragment belonging to different packet frames based on associated sequence numbers, replacing the one of the first fragment or the last fragment in the client queue with the another one of the first fragment or the last fragment.

15. The apparatus of claim 8, wherein the one or more processors are further configured to determine whether the fragments of the packet frame are from a same packet frame by referencing a client queue corresponding to the pAP according to a TID and determine whether a first sequence number of a first fragment corresponds to a last sequence number of a last fragment of the first packet frame.

16. The apparatus of claim 8, wherein the one or more processors are further configured to:
  in response to the length of the second packet frame through the WPA2 pass-through interface comprising a length that is greater than a packet size threshold, fragment the packet frame or another packet frame into two fragments.

17. A non-transitory computer-readable storage medium storing executable instructions that, in response to execution, cause one or more processors of a service provider (SP) network device to perform operations comprising:
  providing a WiFi protected access 2 (WPA2) pass-through interface via a customer premise equipment (CPE) to a user equipment (UE) and between a virtual access point (vAP) of an SP network and a physical access point (pAP) of a customer premise equipment (CPE) transparently to the pAP and the vAP; and
  receiving, via the WPA2 pass-through interface, at least a portion of a packet frame, wherein the packet frame is associated with a community WiFi network of the CPE;
  generating a determination of whether the packet frame in the WPA2 pass-through interface is fragmented based on a fragmentation indicator; and
  re-assembling the packet frame with the at least the portion of the packet frame based on one or more fragmentation criteria in response to the packet frame being fragmented.

18. The non-transitory computer-readable storage medium of claim 17, wherein the operations further comprise:
  determining whether a size or length of another packet frame being formed is greater than a packet size threshold comprising a maximum signal frame size that the vAP is configured to process for any one packet frame.

19. The non-transitory computer-readable storage medium of claim 18, wherein the operations further comprise:
  in response to the another packet frame being greater than the packet size threshold, fragmenting the another packet into a first fragment and a last fragment before forwarding via the WPA2 pass-through interface; and
  associating the first fragment and the last fragment to a same packet frame based on a sequence number of a vAP sequence number counter that is identified with a client identifier (ID) associated specifically with the CPE coupled to the WPA2 pass-through interface.

20. The non-transitory computer-readable storage medium of claim 18, wherein the at least the portion of the packet frame is received from the pAP and the another packet frame is formed for the WPA2 pass-through interface with payload data received at least in part from a wireless access gateway (WAG).

21. A system configured to be employed in a service provider (SP) network, comprising:
  a customer premise equipment (CPE) comprising a physical access point (pAP) configured to provide a community WiFi network for communication with a user equipment (UE); and
  a data virtual network function (D-VNF) at a virtual access point (vAP) of the SP network based on a virtual network function (VNF) of the physical access point (pAP), wherein the D-VNF is coupled to the pAP by a WiFi protected access 2 (WPA2) pass-through interface configured to transparently communicate packet data on packet frames therebetween;
  wherein the CPE and the D-VNF are configured to enable communication of different sizes of packet frames through the WPA2 pass-through interface, including packet frames comprising a size that is larger than a packet size threshold that the vAP is configured to process.

22. The system of claim 21, wherein the CPE and the D-VNF are configured to separately determine whether a packet frame being received threat is to be re-assembled from different fragments, and whether another packet frame being formed for the WPA2 pass-through interface is to be fragmented based on the packet size threshold.

* * * * *